United States Patent
Beshai

(10) Patent No.: US 10,003,865 B2
(45) Date of Patent: Jun. 19, 2018

(54) SPECTRAL-TEMPORAL CONNECTOR FOR FULL-MESH NETWORKING

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 0 days. days.

(21) Appl. No.: 15/588,728

(22) Filed: May 8, 2017

(65) Prior Publication Data

US 2017/0245029 A1 Aug. 24, 2017

Related U.S. Application Data

(63) Continuation of application No. 14/741,475, filed on Jun. 17, 2015, now Pat. No. 9,647,792.

(51) Int. Cl.
*H04J 14/00* (2006.01)
*H04Q 11/00* (2006.01)
*H04J 14/02* (2006.01)

(52) U.S. Cl.
CPC ...... *H04Q 11/0005* (2013.01); *H04J 14/0238* (2013.01); *H04J 14/0282* (2013.01); *H04Q 2011/006* (2013.01); *H04Q 2011/0016* (2013.01); *H04Q 2011/0032* (2013.01); *H04Q 2011/0033* (2013.01)

(58) Field of Classification Search
CPC ........... H04Q 11/0005; H04Q 11/0066; H04Q 11/0062; H04Q 2011/0016; H04Q 2011/0086; H04Q 2011/006; H04J 14/0284; H04J 14/0227; H04J 14/0298; H04J 14/0282; H04J 14/0238; H04J 14/0241
USPC .......................................... 398/47
See application file for complete search history.

(56) References Cited

U.S. PATENT DOCUMENTS

| 6,626,590 B1 * | 9/2003 | Nagatsu | H04J 14/0205 398/45 |
| 7,433,385 B1 * | 10/2008 | Wu | H04J 13/0074 375/146 |
| 2006/0051094 A1 * | 3/2006 | Moriwaki | H04J 14/0209 398/84 |

* cited by examiner

*Primary Examiner* — Don N Vo

(57) ABSTRACT

A spectral-temporal connector interconnects a large number of nodes in a full-mesh structure. Each node connects to the spectral-temporal connector through a dual link. Signals occupying multiple spectral bands carried by a link from a node are de-multiplexed into separate spectral bands individually directed to different connector modules. Each connector module has a set temporal rotators and a set of spectral multiplexers. A temporal rotator cyclically distributes segments of each signal at each inlet of the rotator to each outlet of the rotator. Each spectral multiplexer combines signals occupying different spectral bands at outlets of the set of temporal rotators onto a respective output link. Several arrangements for time-aligning all the nodes to the connector modules are disclosed.

12 Claims, 45 Drawing Sheets

SPECTRAL-TEMPORAL CONNECTOR FOR FULL-MESH NETWORKING

CROSS-REFERENCE TO RELATED APPLICATIONS

The present application claims the benefit of U.S. patent application Ser. No. 14/741,475 filed Jun. 17, 2015 which claims the benefit of provisional application 62/013,549 filed Jun. 18, 2014; the entire contents of both applications are incorporated herein by reference.

FIELD OF THE INVENTION

The present invention relates to communication networks and in particular to methods and apparatus for constructing large-scale meshed networks.

BACKGROUND

The advantages and disadvantages of a fully-meshed network are well known. The advantages include structural simplicity, ease of control, and high performance. A major disadvantage is the limited coverage in terms of the number of switching nodes that can be interconnected in a full-mesh structure. The total number of switching nodes of a fully-meshed network is decided by the dimension of each switching node. With switching nodes each having a number L of dual ports connecting to data sources and sinks and a number $\Lambda$ dual ports connecting to other switching nodes, $L \geq 1$, $\Lambda > 1$, the maximum number of switching nodes that may be interconnected in a full-mesh structure, according to prior-art methods, is $(\Lambda+1)$. An objective of the present invention is to increase the coverage of full-meshed networks given an upper bound of the dimension of each switching node.

SUMMARY

A spectral-temporal connector interconnects a large number of switching nodes in a full-mesh structure. Each switching node has a dual link carrying signals occupying multiple spectral bands to the spectral-temporal connector.

In accordance with an aspect, the present invention provides a method of routing signals among switching nodes using a spectral-temporal connector connecting multiple input links to multiple output links where each input link carries signals occupying multiple spectral bands and each output link carries signals occupying multiple spectral bands. The method is based on using spectral demultiplexers to separate the spectral bands of each input link, temporal rotators to distribute segments of signal occupying each spectral band of each input link to spectral multiplexers to be combined onto output links. The temporal rotators are arranged into rotator groups and each spectral demultiplexer directs individual spectral bands of a respective input link to respective temporal rotators of different rotator groups. Each spectral multiplexer combines output channels from different temporal rotators of a respective rotator group onto respective output links. Timing circuits are used to ensure conflict-free distribution of time-slotted signals through the temporal rotators.

In one embodiment, each timing circuit receives timing data from a respective input link originating from an external switching node and sends corresponding reference time indications to an output link terminating on the same switching node. Each rotator has a control output port and a control input port. The control output port communicates upstream timing data embedded in upstream signals carried by input links to a timing circuit. The control input port distributes downstream timing from a timing circuit to downstream links. Each spectral band of an input link carries a time-slotted signal. At least one time-slot of a cyclic time frame is dedicated for communicating control signals over at least one spectral band of an input link. A timing circuit receives upstream timing data including an indication of a sending time of a data segment from a switching node, compares the sending time indication with a corresponding reading of a master time indicator, and returns an indication of the deviation of the sending time from the corresponding reading of a master time indicator. A timing circuit may, instead, return both the sending time and corresponding reference time.

Alternatively, according to another embodiment, an entire spectral band in each input link may be dedicated as a control spectral band to communicate control signals directed to each output link. The control signals would then occupy time slots of a repetitive time frame to be cyclically distributed by a control module having a number of inlets at least equal to the number of input links and a number of outlets at least equal to the number of output links. Likewise, an entire spectral band of each output link would be dedicated to carry control signals from each input link which include timing data inserted by a timing circuit coupled to the control module.

A temporal rotator may be configured as a star coupler having multiple inlets and a single outlet, an array of spectral translators performing spectral translation of input spectral bands, and an arrayed-waveguide grating demultiplexer separating the translated spectral bands of the signals received at the single output of the star coupler.

In accordance with another aspect, the present invention provides a method of connecting input channels, each carrying signals occupying a single spectral band, to output links, each output link carrying signals occupying a number of spectral bands. The method comprises arranging the input channels into input-channel groups and cyclically interleaving, using a temporal rotator, segments of signals of each input-channel group onto a respective set of output channels. Signals from different sets of output channels are spectrally multiplexed onto a respective output link.

In accordance with a further aspect, the present invention provides a spectral-temporal connector, connecting a plurality of multichannel input links to a plurality of output links. The spectral-temporal connector comprises spectral demultiplexers distributing constituent channels of each multichannel input link to a number of connector modules. Each connector module comprises a set of temporal rotators and a set of spectral multiplexers. Each spectral demultiplexer connects each channel of a respective multichannel input link to an inlet of a respective temporal rotator within each connector module.

Each temporal rotator has multiple inlets and configured to cyclically connect each inlet to each output channel of a respective set of output channels during each predefined time frame. Each spectral multiplexer combines an output channel of each rotator of the set of temporal rotators onto a respective output link of the plurality of output links.

In accordance with a further aspect, the present invention provides a spectral-temporal connector for interconnecting input links to output links, each input link and each output link carrying signals of multiple spectral bands. The spectral-temporal connector comprises: multiple spectral demultiplexers, each connecting to a respective input link; multiple spectral multiplexers, each connecting to a respective output link; and multiple temporal rotators arranged into a number of rotator groups. A spectral demultiplexer directs each spectral band of a respective input link to a respective temporal rotator in each rotator group. A spectral multiplexer connecting to an output link combines signals of selected output ports of temporal rotators of a same rotator group. To facilitate control, the input links may be arranged into input-link groups. Each temporal rotator from each rotator group connects to a respective set of channels comprising one input channel from each input link of one input-link group.

To enable temporal alignment of signals at inputs of each rotator, a set of timing circuits is provided. Each timing circuit is coupled to a master time indicator and connected to an outlet of a respective first rotator to an inlet of a respective second rotator. This arrangement enables exchange of timing data between the spectral-temporal connector and data sources (switching nodes) connecting to the input links.

In accordance with a further aspect, the present invention provides a spectral-temporal connector comprising a control module and multiple data rotators arranged into a number of rotator groups. The spectral-temporal connector connects input links, each carrying an input control channel and a number of input data channels, to output links, each carrying an output control channel and a number of output data channels.

Each input link connects to the input of a respective spectral demultiplexer and each output link connects to the output of a spectral multiplexer. A spectral demultiplexer directs an input control channel of an input link to the control module and directs individual input data channels of the same input link to a data rotator in each rotator group. A spectral multiplexer combines data channels from data rotators of a same rotator group and a control channel from the control module.

The control module employs a control rotator having a significantly large dimension in comparison with a data rotator and may be implemented either as a large-scale electronic rotator or a two-stage optical rotator. A two-stage optical rotator comprises two interlaced arrays of optical-rotator units.

In accordance with a further aspect, the present invention provides a spectral-temporal connector comprising an array of spectral demultiplexers, an array of spectral multiplexers, and an array of star couplers, each star coupler having one outlet and a number of inlets, each inlet having a respective spectral translator. The array of star couplers is arranged into groups of star couplers.

The spectral-temporal connector connects multichannel input links to multichannel output links so that each output link receives a signal from each input link. The number of output links is an integer multiple of the number of channels per input link. More specifically, the maximum number of output links equals the number of channels per input link times the number of inlets per star coupler. To enable full-mesh connectivity, each spectral demultiplexer directs individual signals of different channels of a respective input link to spectral translators of different groups of star couplers. Each spectral translator cyclically shifts a spectral band of a signal received from a respective input spectral demultiplexer so that, at any instant of time, spectral bands of signals at inlets of any star coupler are non-overlapping. The combined signals at the outlet of a star coupler occupy multiple spectral bands. The outlets of a group of star couplers connect to a spectral router which distributes the spectral bands of each star-coupler outlet to a respective set of output links.

A spectral-translation controller coupled to a master time indicator periodically prompts each spectral translator to shift a current spectral band in order to connect to a different output link. Timing coordination is needed in order to enable aligning time-slotted signals received at a star coupler from input links originating from geographically distributed external network elements, hence experiencing different propagation delays.

According to one time-coordination scheme, upstream timing data originating from external network elements and carried by the input links are directed to a selected output link coupled to a timing circuit. The timing circuit associates timing data from each input link with corresponding reference time instants read from a master time indicator to form downstream timing data. The timing circuit directs the downstream timing data to a selected input link to be distributed to the output links through the star couplers and the spectral routers. Instead of connecting the timing circuit to a selected input link, the timing circuit may direct the downstream timing data to channels connecting directly to selected spectral translators. Also, instead of connecting the timing circuit to a selected output link, the timing circuit may receive the upstream timing data through a channel from each inner spectral demultiplexer of one of the spectral routers, where the spectral router is configured as an array of inner spectral demultiplexers and an array of spectral multiplexers.

In accordance with a further aspect, the present invention provides a spectral-temporal connector comprising a group of connector modules and an array of input spectral demultiplexers. Each connector module has a number of input ports and each input spectral demultiplexer connects channels of a respective multichannel input link to respective input ports of different connector modules. Each connector module comprises a set of star couplers, each star coupler having inlets connecting to a respective set of spectral translators. Each spectral translator connects to an inlet of a star coupler and is configured to cyclically shift a spectral band of a signal received from a respective channel so that, at any instant of time, spectral bands at inlets of each star coupler are non-overlapping. A spectral demultiplexer connecting to an outlet of a star coupler separates spectral bands of signals combined at the star coupler and directs individual spectral bands to a set of spectral multiplexers. Each spectral multiplexer combines spectral bands from the inner spectral demultiplexers of the star couplers onto an output link.

A master time indicator provides a time reference for all connector modules. Each connector module has a timing circuit having channels to spectral translators of selected star couplers of different connector modules and channels from spectral demultiplexers of one connector module. The timing circuit exchanges timing data with external nodes connecting to the spectral-temporal connector in order to time-align signals originating from each external node to the master time indicator. Alternatively, a separate timing circuit may be dedicated to each star coupler where each timing circuit connects to a spectral translator and a channel from an inner spectral demultiplexer. The connectivity of the timing circuits is set up so that a set of timing circuits connecting to inner spectral demultiplexers of a same connector module connects to spectral translators of different connector modules. The connectivity of the timing circuits may also be set up so that a set of timing circuits within a connector module connects to spectral translators of different star couplers of the same connector module and inner spectral demultiplexers of different connector modules.

In accordance with a further aspect, the present invention provides a method of routing signals from a plurality of input links, each input link carrying signals of multiple spectral bands, to a plurality of output links. The method comprises arranging a plurality of star couplers into sets of star couplers, where each star coupler has a respective number of inlets and one outlet, connecting each inlet of each star coupler to a respective spectral translator of a plurality of spectral translators, and directing each signal of each input link to a respective spectral translator in each set of star couplers. Each spectral translator is cyclically prompted to shift a spectral band of a signal received from a respective input link so that, at any instant of time, spectral bands of signals at inlets of each star coupler are non-overlapping. Spectral bands at outlets of each set of star couplers are distributed to a respective set of output links.

The method further comprises arranging the input links into input-link groups; and selecting the connectivity of input-link channels to spectral translators so that each star coupler receives a signal from each input link of one input-link group. The process of cyclically prompting the spectral translators to shift current spectral bands may be implemented using a spectral-translation controller coupled to a master time indicator.

To enable temporal alignment of signals at inputs of the star couplers, the method further comprises processes of extracting sending-time data from signals carried by each input link and comparing the sending-time data to corresponding reference-time indications of a master time indicator. Discrepancies of the sending-time data and the corresponding reference-time indications are communicated to respective sources of the sending-time data to enable the sources to adjust data sending times accordingly.

BRIEF DESCRIPTION OF THE DRAWINGS

Embodiments of the present invention will be further described with reference to the accompanying exemplary drawings, in which.

REFERENCE NUMERALS

Figure 1:
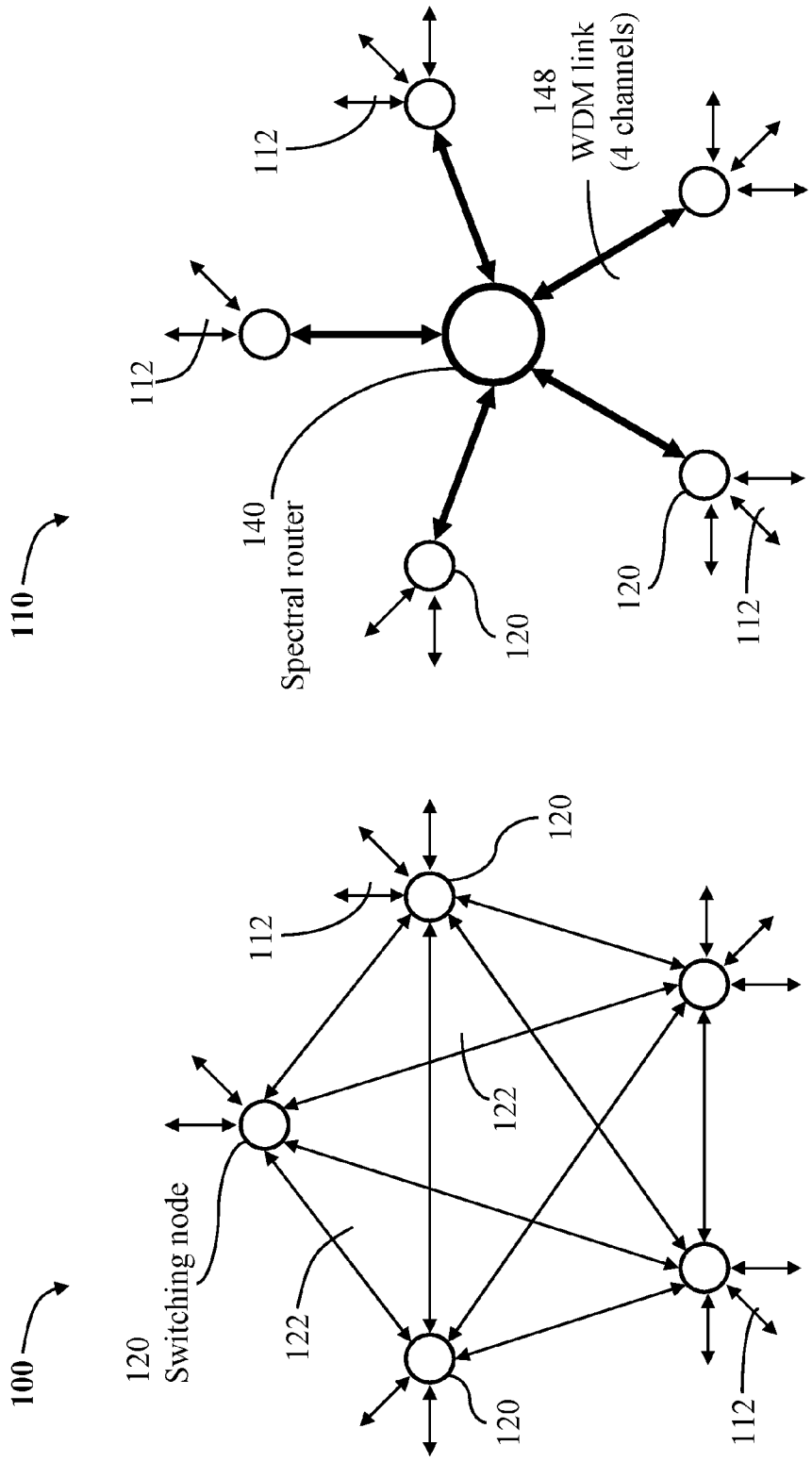
FIG. 1 illustrates a prior-art full-mesh network using direct pair-wise nodes interconnection or a spectral router.

A reference numeral may individually or collectively refer to items of a same type. A reference numeral may further be indexed to distinguish individual items of a same type.

100: A conventional network of a full-mesh structure
110: A full-mesh network structure using a spectral router
112: A dual link connecting to data sources and sinks in network 100 or network 110
120: A switching node in network 100 or network 110
122: Communication link from one switch node 120 to another switching node 120 in network 100
140: A spectral router interconnecting switching nodes 120
148: A dual link connecting a switching node 120 to spectral router 140
200: A network of a full mesh structure employing a spectral-temporal connector
212: A dual link connecting to data sources and sinks in network 200
220: A switching node in network 200
240: A spectral-temporal connector interconnecting nodes 220
248: A dual link connecting a switching node 220 to spectral-temporal connector 240
300: Spectral-temporal connector
310: WDM input links
316: Optical channel from a spectral demultiplexer 2320 to a connector module 2000
320: Spectral demultiplexers
350: Connector module
380: WDM output links
400: Connector module of a first type
416: Input channels of connector module 400
425: Group of input channels 416
440: Temporal data rotator
450: Spectral multiplexers
455: Channels connecting temporal rotators 440 to spectral multiplexers 450
480: WDM output links of connector module 400
500: Spectral-temporal connector based on connector module 400
510: WDM input links
520: Spectral demultiplexers
525: Group of WDM input links 510
600: Interconnection of control channels of temporal rotators 440 of the spectral-temporal connector 500
612: Control channel carrying timing signals
641: An inlet, dedicated for receiving timing data, of a temporal rotator
642: An outlet, dedicated for sending timing data, of a temporal rotator
685: Timing circuits coupled to rotators 440
690: Master time indicator
692: Channels from master time indicator 690 to timing circuits 685

700: Spectral-temporal connector based on connector module 400 with a separate module for distributing control messages
710: WDM input links
716: A data channel from a spectral demultiplexer 720 to a rotator
720: Spectral demultiplexers
725: Temporal control rotator for distributing time-slotted control signals from WDM input links 710 to WDM output links 780
735: Control module
740: Control channels from spectral demultiplexers 720 to control module 735
750: Spectral multiplexer
755: Channels connecting temporal rotators 440 to spectral multiplexers 750
760: Control channels from control module 735 to spectral multiplexers 750
770: Connector module similar to connector module 400
780: WDM output links
785: Timing circuit
910: Rotation period of a temporal data rotator 440
920: Rotation period of temporal control rotator 725
930: Control time slots in first organization of control channels 740 or 760
932: Control time slots in second organization of control channels 740 or 760
940: Time slot for data transfer
1016: Input channels carrying input signals to an optical rotator 440A
1020: Spectral translator
1025: Spectral-translation controller
1028: Control channels from spectral-translation controller 1025 to spectral translators 1020
1030: Star coupler
1040: Spectral demultiplexer
1055: output channels of optical rotator 440A
1116: Input channels carrying input signals to an optical rotator 440B
1120: Spectral translator
1125: Spectral-translation controller
1128: Control channels from spectral-translation controller to spectral translators
1130: Star coupler receiving signals from a timing circuit 1185 and spectral translators 1120 connecting to channels 1116
1140: Spectral demultiplexer
1155: output channels of optical rotator 440B
1162: Control channel from spectral demultiplexer 1140 to optical-electrical converter 1163 preceding timing circuit 1185
1163: optical-electrical converter
1164: electrical-optical converter
1165: Control channel from a spectral translator 1120 to an inlet of star coupler 1130
1185: Timing circuit
1190: Time indictor coupled to timing circuit 1185 and spectral-translation controller 1125
1212: Input channels (input spectral bands) of a star coupler
1213: Control channel directed to star coupler 1130
1214: Time slots of a rotation cycle
1216: Output channels (output spectral bands) of optical rotator comprising star coupler 1130 and spectral demultiplexer 1140
1217: Control channel directed to timing circuit 1185
1220: Spectral translator
1250: Table indicating spectral bands at input ports of star coupler 1130 during time slots of a rotation cycle
1260: Table indicating contents of spectral bands at output of spectral demultiplexer 1140
1282: Optical-to-electrical converter
1284: Electrical-to-optical converter
1300: Two-stage optical temporal rotator
1310: Input channels
1320: Primary spectral translators
1330: Primary star coupler of two-stage optical temporal rotator 1300
1340: Primary spectral demultiplexers
1350: Secondary spectral translators
1352: Internal channels from primary spectral demultiplexers 1340 to secondary spectral translators 1350
1360: Secondary star coupler
1370: Secondary spectral demultiplexers
1380: Output channels
1400: Two-stage temporal rotator
1485: Timing circuit
1494: Optical-electrical converter
1496: Electrical-optical converter
1510: Array indicating input channels' access time to a timing circuit
1512: Indices of input channels
1520: Primary rotation period of a primary rotator comprising elements {1320, 1330, 1340}
1530: Secondary rotation period of a secondary rotator comprising elements {1350, 1360, 1370}
1540: A time slot
1550: Array indicating timing-circuit's access time to output channels
1552: Indices of output channels
1620: Indices of input primary spectral translators 1320
1630: Spectral-band index at output of a primary spectral translator
1730: Indices of spectral bands
1750: Indices of secondary spectral translators
1900: Basic processes implemented by the optical rotator of FIG. 14
1910: primary spectral-translation process
1920: primary combining process
1930: primary demultiplexing process
1940: secondary spectral-translation process
1950: secondary combining process
1960: secondary demultiplexing process
2000: connector module of a second type
2016: Input channels
2020: Spectral translators
2025: Input-channel group
2026: channel from a spectral translator 2020 to an input of a star coupler 2030
2030: Star coupler
2032: WDM links from star couplers 2030 to spectral router 2050
2050: Spectral router
2080: WDM output links
2110: rotation cycle
2112: Time slot
2120: Spectral bands of signals at input of a star coupler 2030
2130: Signals from input channels
2140: Output signals of star couplers
2160: Content of WDM output links
2180: Spectral bands of individual WDM output links
2200: Spectral-temporal connector based on connector module 2000

2210: WDM input links
2216: Channels from spectral demultiplexers 2420 to connector modules
2220: Spectral demultiplexers
2280: WDM output links
2325: Spectral-translation controller
2390: Master time indicator
2400: Spectral router
2410: WDM input links
2440: Spectral demultiplexer
2443: Inner channels
2450: Spectral multiplexer
2470: Control channels
2480: WDM output links of spectral router
2500: Connector module of a third type coupled to a timing circuit
2525: Spectral-translation controller
2540: Spectral demultiplexer
2541: Optical-to-electrical (O/E) converter
2543: Channel from a spectral demultiplexer 2540 to a spectral multiplexer 2550
2550: Spectral multiplexer
2552: Electrical-to-optical (E/O) converter
2555: Channel from a spectral demultiplexer 2540 to an optical-electrical converter 2541 connecting to timing circuit 2585
2561: Timing channel from timing circuit 2585 to a first connector module
2562: Timing channel from timing circuit 2585 to a second connector module
2563: Timing channel from timing circuit 2585 to a third connector module
2580: WDM output links
2585: Timing circuit
2590: Master time indicator
2600: Connector modules connecting to timing channels from connector module 2500
2640: Spectral demultiplexer
2650: Spectral multiplexer
2680: WDM output links
2700: Spectral-temporal connector
2710: WDM input links
2716: Channels from a spectral demultiplexer 2720 to a connector module 2750
2720: Spectral demultiplexers
2725: A group of WDM input links 2710
2740: Control channels between connector modules 2750
2750: Connector modules
2780: WDM output links
2800: Spectral-temporal connector with timing circuitry
2810: WDM input links
2816: A channel from spectral demultiplexer 2820 to a connector module 2860
2817: A channel from a timing circuit 2885 to a connector module 2860
2820: Spectral demultiplexer
2825: A group of WDM input links
2860: Connector module
2880: WDM output links
2885: Timing circuit
2892: Optical-electrical converters
2894: Electrical-optical converters
2900: A first connector module of a third type
2916: Input channels
2920: Spectral translator
2925: Group of input channels 2916
2930: Star coupler
2932: WDM link from output of star coupler to a spectral demultiplexer 2940
2940: Spectral demultiplexer
2941: Optical-electrical converter
2943: Output channel from spectral demultiplexer 2940 to a spectral multiplexer 2950
2945: Control channel from a spectral demultiplexer 2940 to timing circuit 2985
2950: Spectral multiplexer
2952: Electrical-optical converter
2961: Control channel from timing circuit 2985 (through an electrical-optical converter) to a spectral translator 2920
2962: Control channel from timing circuit 2985 (through an electrical-optical converter) to a spectral translator of a second connector module
2963: Control channel from timing circuit 2985 (through an electrical-optical converter) to a spectral translator of a third connector module
2980: WDM output link
2985: Timing circuit
3000: A second connector module of a third type
3016: Input channels
3020: Spectral translator
3025: Group of input channels 3016
3030: Star coupler
3032: WDM link from output of star coupler to a spectral demultiplexer 3040
3040: Spectral demultiplexer
3041: Optical-electrical converter
3043: Output channel of spectral demultiplexer 3040 connecting to a spectral multiplexer 3050
3045: Control channel from a spectral demultiplexer 3032 to timing circuit 3085
3050: Spectral multiplexer
3052: Electrical-optical converter
3061: Control channel from timing circuit 3085 (through an electrical-optical converter) to a spectral translator of first connector module
3062: Control channel from timing circuit 3085 (through an electrical-optical converter) to a spectral translator 3020
3063: Control channel from timing circuit 3085 (through an electrical-optical converter) to a spectral translator of third connector module
3080: WDM output link
3085: Timing circuit
3100: A third connector module of a third type
3116: Input channels
3120: Spectral translator
3125: Group of input channels 3116
3130: Star coupler
3132: WDM link from output of star coupler to a spectral demultiplexer 3140
3140: Spectral demultiplexer
3141: Optical-electrical converter
3143: Output channel of spectral demultiplexer 3140 connecting to a spectral multiplexer
3145: Control channel from a spectral demultiplexer 3140 to timing circuit 3185
3150: Spectral multiplexer
3152: Electrical-optical converter
3161: Control channel from timing circuit 3185 (through an electrical-optical converter) to a spectral translator of first connector module
3162: Control channel from timing circuit 3185 (through an electrical-optical converter) to a spectral translator of second connector module 3163: Control channel from timing circuit 3185 (through an electrical-optical converter) to a spectral translator 3120
3180: WDM output link
3185: Timing circuit
3210: Input link
3216: Input channel
3218: Spectral demultiplexer
3220: Spectral translator
3225: group of input channels 3216
3230: Star coupler
3240: Spectral demultiplexer
3243: Channel from a spectral demultiplexer 3240 to a spectral multiplexer
3245: Channel from a spectral demultiplexer 3240 to a timing circuit 3285
3241: Optical-electrical converter
3250: spectral multiplexer
3252: Electrical-optical converter
3280: WDM output link
3285: Timing circuit
3300: A connector module of a fourth type with a first arrangement of timing-circuits
3325: Spectral-translation controller
3390: Master time indicator
3400: Connector module of a fourth type similar to connector module 3300
3425: Spectral-translation controller
3500: Connector module of a fourth type similar to connector module 3300
3525: Spectral-translation controller
3700-3780: Tables indicating cyclic connectivity of optical rotators based on fourth-type connector modules
3800: A fourth-type connector module with a second arrangement of timing-circuits
3825: Spectral-translation controller
3890: Master time indicator
3900-3980: Tables indicating cyclic connectivity of optical rotators based on connector modules 3800
4000: A spectral-temporal connector with a temporal-alignment module
4010: Input links
4016: Channels from spectral demultiplexers to connector modules 350
4020: Spectral demultiplexers
4080: Output links
4090: Master time indicator
4095: Temporal-alignment module
4100: A connector module similar to connector module 2000 of the second type but with a larger number of spectral bands per output link
4116: Input channels
4120: Spectral translator
4130: Star coupler
4132: WDM link from a star coupler 4130 to a spectral demultiplexer 4140
4140: Spectral demultiplexer
4143: Channels from a spectral demultiplexer 4140 to different spectral multiplexers 4150
4150: Spectral multiplexers
4180: A WDM link from a spectral multiplexer 4150 to an external network element
4210: Rotation cycle
4212: Signal segment
4220: Matrix indicating indices 4286 of input channels 4116 sending signal segments to output spectral bands (output channels)
4282: Output spectral bands
4286: Index of an input channel 4116 of connector module 4100
4300: Spectral-temporal connector based on connector modules 4100
4310: WDM input links
4316: Channels from spectral demultiplexers 4320 to connector modules
4320: Spectral demultiplexers
4380: WDM output links
4400: A network of a full mesh structure employing a spectral-temporal connector interconnecting switching nodes of different dimensions
4420: Switch node having at least two WDM links 248 connecting to a spectral-temporal connector
4480: Optional central controller of network 4400
4500: Exemplary implementation of switching node 220
4502: Channels from data sources and/or other nodes
4504: Channels to data sinks and/or other nodes
4510: WDM input link from other switching nodes 220 connecting to spectral demultiplexer 320
4520: Spectral demultiplexer
4525: Optical-electrical converter
4530: Switching mechanism
4531: Data Channel from optical-electrical converter 4525 to switching mechanism 4530
4532: Data Channel from switching mechanism 4530 to electrical-optical converter 4585
4535: Node controller
4538: Control channel from switching mechanism 4530 to node controller 4535
4539: Control channel from node controller 4535 to switching mechanism 4530
4540: network controller
4541: Control channel from optical-electrical converter 4525 of spectral demultiplexer 4520 to network controller 4540
4542: Control channel from network controller 4540 to electrical-optical converter 4585 of spectral multiplexer 4580
4543: Optional dual channel interconnecting node controller 4535 and network controller 4540
4580: Spectral multiplexer
4585: Electrical-optical converter
4590: WDM output link to other switching nodes 220

TERMINOLOGY

Spectral multiplexer: A device which combines signals of different spectral bands is referenced as a spectral multiplexer.

Spectral demultiplexer: A device which separates signals occupying different spectral bands within a communications link is referenced as a spectral demultiplexer.

Spectral router (wavelength router): A spectral router, also known as a "wavelength router", has multiple input ports and multiple output ports and is configured to receive wavelength-division-multiplexed (WDM) signals (signals occupying multiple spectral bands) at each input port and direct each signal occupying a single spectral band to a respective output port. Each output port receives a signal from each input port.

Temporal rotator: A temporal rotator has multiple input ports and multiple output ports and is configured to direct successive segments of a signal received at an input port to respective output ports during successive time slots.

Thus, each output port receives a signal segment from each input port. For brevity, a temporal rotator may be referenced as a "rotator".

Rotator unit: A temporal rotator may be configured in two or more stages, each stage comprising an array of temporal-rotator units (also called "rotator units") of smaller dimensions.

Rotation cycle: The sequence of connecting each input port to each output port of a temporal rotator is referenced as a "rotation cycle".

Spectral translator: A spectral translator shifts a spectral band of a first signal to produce a second signal occupying a new spectral band but carrying the same modulating information.

Wavelength channel: A medium carrying a signal occupying a spectral band is termed a wavelength channel; the term "wavelength" refers to the wavelength of the centre of the spectral band. A "wavelength channel" is also referenced as a "channel".

Link: A medium carrying signals occupying multiple spectral bands (i.e., carrying multiple channels) is referenced as a "link".

Disjoint spectral bands: Any two spectral bands that are not overlapping are said to be "disjoint spectral bands"; disjoint spectral bands may be adjacent.

Electrical-optical converter (E/O): A device which receives a signal in the electrical domain and modulates an optical carrier to carry the information of the electrical signal is colloquially referenced as an "electrical-optical converter".

Optical-electrical converter (O/E): A device which demodulates an optical signal to detect a modulating signal and produce the modulating signal in the electrical domain is colloquially referenced as an "optical-electrical converter".

Signal segment: A signal may be divided in the time domain into "segments". A signal segment is the smallest recognizable signal division in a system under consideration.

Signal block: A number of signal segments may be aggregated into a "signal block" for processing purposes.

Dual channel: A dual channel comprises two directed channels of opposite directions connecting two network elements, such as two nodes.

Dual link: A dual link is a communication medium supporting at least one dual channel.

$\lfloor \alpha \rfloor : \lfloor \alpha \rfloor$ denotes the nearest integer lower than or equal to $\alpha$ if $\alpha$ is a real number; $\lfloor \alpha \rfloor = \alpha$ if $\alpha$ is an integer $\lceil \alpha \rceil : \lceil \alpha \rceil$ denotes the nearest integer higher than or equal to $\alpha$ if $\alpha$ is a real number; $\lceil \alpha \rceil = \alpha$ if $\alpha$ is an integer Modulo operation: The notation X modulo W, also denoted $X_{modulo\ W}$, or $|X|_W$, where X is an integer and W is a positive integer is a remainder determined as: $X_{modulo\ W} = X - W \times \lfloor X/W \rfloor$,

DETAILED DESCRIPTION

FIG. 1 illustrates a prior-art full-mesh network 100 using direct pair-wise interconnection of switching nodes 120, and a full-mesh network 110 using a spectral router 140 to interconnect each switching node 120 to each other switching node 120. For brevity, a switching node is referenced as a "node".

In the full-mesh network 100, each node 120 connects to a respective set of data sources and data sinks through at least one dual link 112 comprising at least one dual channel. Data from a data source connecting to a first node 120 and directed to a data sink connecting to a second node 120 may be transferred through a link 122 connecting the first node 120 to the second node 120, or may be transferred through any intermediate node 120, other than the first node and the second node, traversing two links 122.

In network 110, each node 120 has at least one wavelength channel to each other node 120 through a spectral router (also called a wavelength router) 140 well known in the art. A dual link 148 connecting a node 120 to the spectral router 140 contains a number of dual wavelength channels to be individually directed to other nodes 120 through the spectral router 140.

The number of nodes 120 in the full-mesh network 100 or 110 is limited by the dimension of a node 120. A node 120 connects to external data sources and data sinks through a number of access dual channels, and connects to other nodes 120 through a number of inner dual channels. With each wavelength-division multiplexed (WDM) link 148 comprising $\Lambda$ channels, $\Lambda>1$, the total number of nodes 120 in network 110 would be limited to $\Lambda$ if each node connects to each other node and to itself through the spectral router 140 or ($\Lambda+1$) if none of the nodes connects to itself through the spectral router 140. With $\Lambda=64$, for example, the total number of nodes 120 would be at most 64 with a return path from each node to itself, or 65 otherwise. Each link 148 is a dual link carrying $\Lambda$ upstream channels to the spectral router 140 and $\Lambda$ downstream channels from the spectral router 140.

Figure 2:
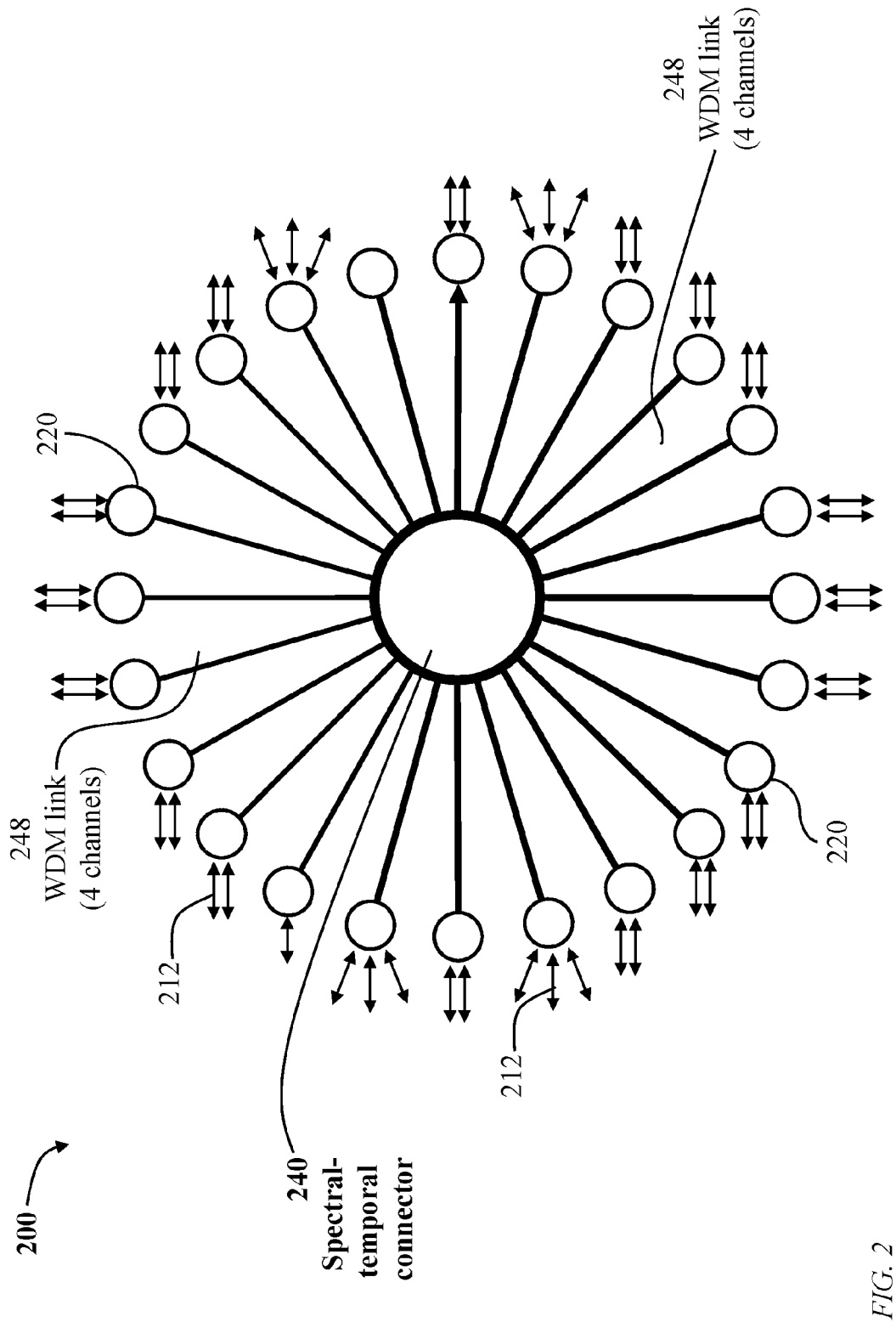
FIG. 2 illustrates a spectral-temporal connector interconnecting a large number of switching nodes, in accordance with an embodiment of the present invention.

It may be desirable, however, to create a network of a dimension much larger than the number $\Lambda$ of inner channels connecting a node to the network, with each node having a permanent path to each other node. FIG. 2 illustrates a spectral-temporal connector 240 interconnecting a large number of switching nodes 220 to form a full-mesh network 200, Each switching node 220 has at least one dual link 212 connecting to data sources and sinks and a dual link 248 connecting to spectral-temporal connector 240. Each dual WDM link 248 carries $\Lambda$ upstream channels and $\Lambda$ downstream channels. With each channel carrying m time-multiplexed signals directed to m destination nodes 220, m>2, network 200 may include $\Lambda \times m$ nodes 220, if each node 220 has a path to itself through the spectral-temporal connector 240. With $\Lambda=4$ and m=6 the number of nodes 220 is limited to 24 as illustrated in FIG. 2. In an envisaged network where $\Lambda=64$ and m=128, for example, the number of nodes would be limited to 8192 with each node having a return path to itself and a permanent path through the spectral-temporal connector to each other node 220. A return path from a node to itself through the spectral-temporal connector facilitates continuity testing and timing processes.

Figure 3:
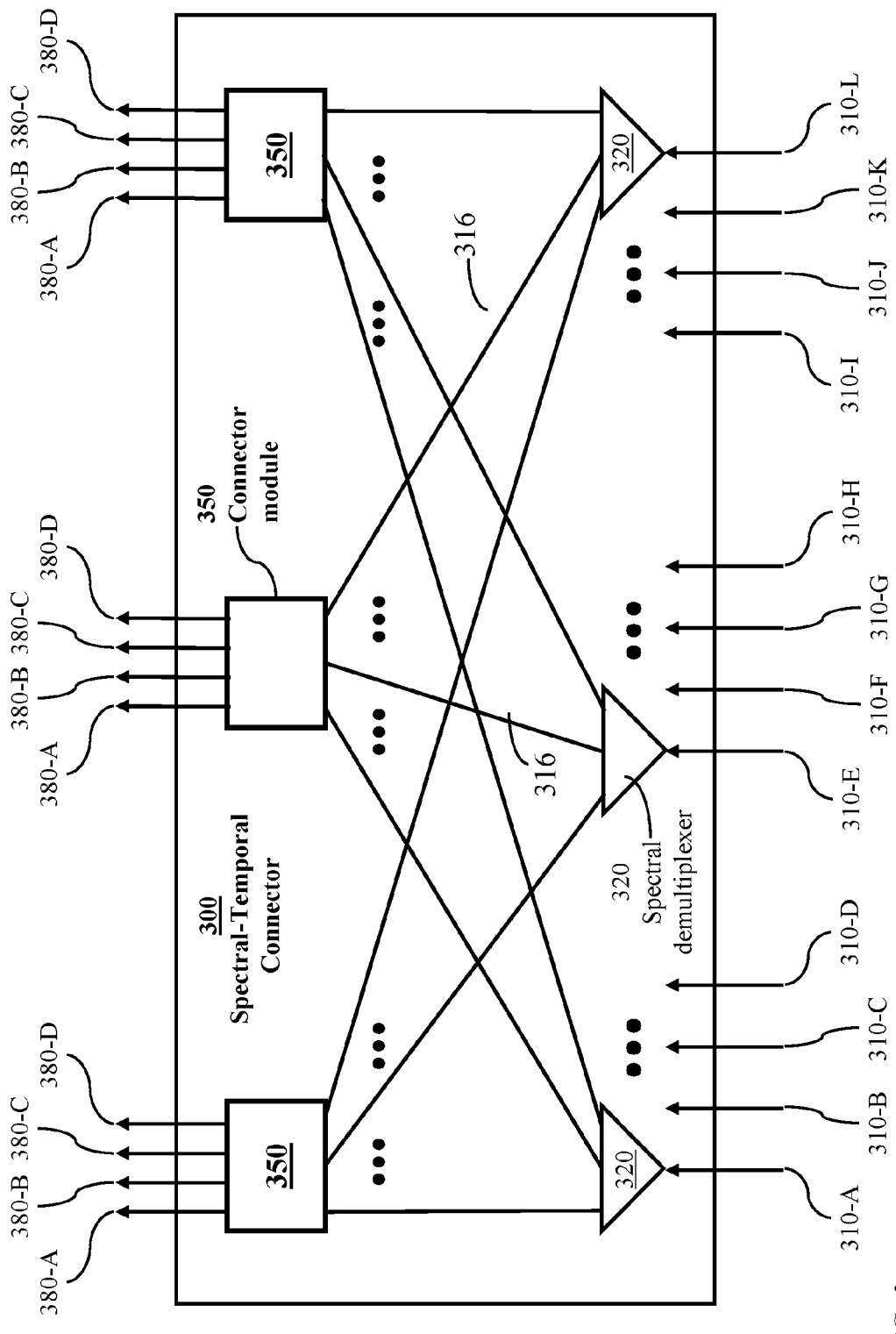
FIG. 3 illustrates a configuration of a spectral-temporal connector, in accordance with an embodiment of the present invention.

FIG. 3 illustrates a spectral-temporal connector 300 connecting a set of WDM input links 310 to a set of WDM output links 380. Each WDM input link 310 carries $\Lambda$ channels, i.e., carries $\Lambda$ signals each occupying a respective channel band (spectral band), and connects to a spectral demultiplexer 320 of a set of m×$\Lambda$ spectral demultiplexers. Input links 310 are individually identified as 310-A to 310-L and output links 380 are individually identified as 380-A to 380-L. Each spectral demultiplexer 320 separates signals of $\Lambda$ spectral bands and places the separated signals on $\Lambda$ optical channels 316 connecting to different connector modules 350. Thus, the number of connector modules 350 of the spectral-temporal connector 300 is determined by the number of spectral bands per input channel 310.

Figure 4:
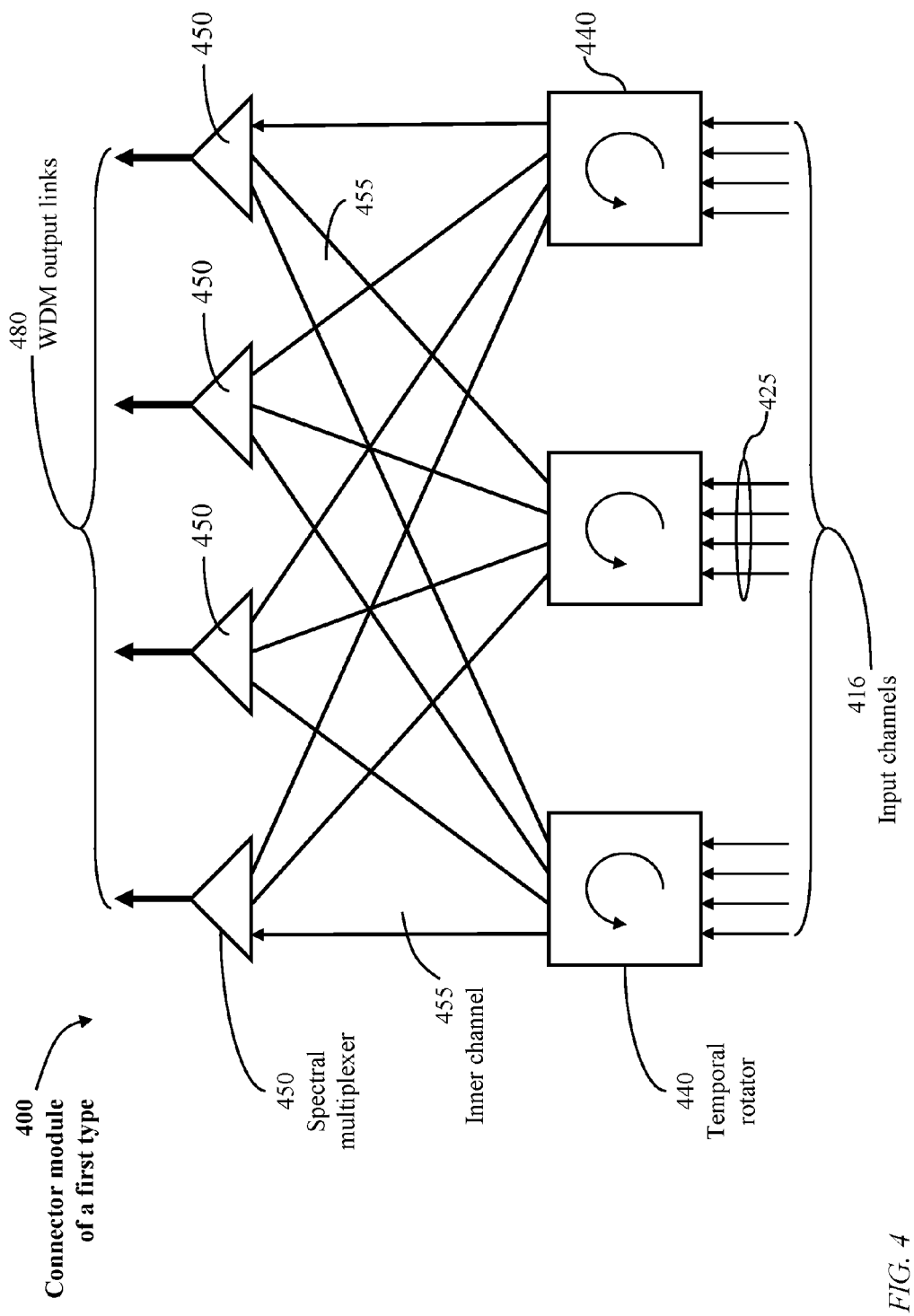
FIG. 4 illustrates a connector module of a first type, in accordance with an embodiment of the present invention.

FIG. 4 illustrates an implementation of a connector module 400 of a first type configured as a number $\Lambda$ of temporal rotators 440 interlacing with a number m of spectral multiplexers 450, Λ>1, m>2. A temporal rotator 440 is preferably implemented in the optical domain. Each temporal rotator 440 connects a group 425 of m input channels 416 to m inner channels 455. Each inner channel 455 connects to a respective spectral multiplexer 450. Each spectral multiplexer 450 receives Λ signals, each occupying a respective spectral band, from each of the Λ rotators. Thus, a WDM output link 480 carries Λ spectral bands, one from each temporal rotator 440. A signal occupying a spectral band of an inner channel 455 from a rotator 440 is formed as m successive segments of signals from input channels 416 of the rotator. The Λ inner channels 455 at input of a spectral multiplexer 450 carry signals occupying disjoint spectral bands and each WDM output link 480 carries m×Λ signal segments, one signal segment from each of the input channels 416.

Thus, the present invention provides a method of connecting a plurality of input channels 416, where each input channel carries a signal occupying a single spectral band, to a plurality of output links 480, where each output link carries signals occupying a number of spectral bands. The input channels 416 are arranged into a number Λ of input-channel groups 425, each input-channel group 425 comprising at most a number m of input channels 416. Signal segments of each input-channel group 425 are cyclically interleaved onto a respective set of inner channels 455. Thus, each inner channel 455 carries signal segments of each input channel 416 of a respective channel group 425. Signals carried by inner channels 455 from different groups 425 of input channels 416 are spectrally multiplexed onto a respective output link 480. A temporal rotator 440 may be used to cyclically interleave signal segments of each input-channel group 425 onto inner channels 455.

Figure 5:
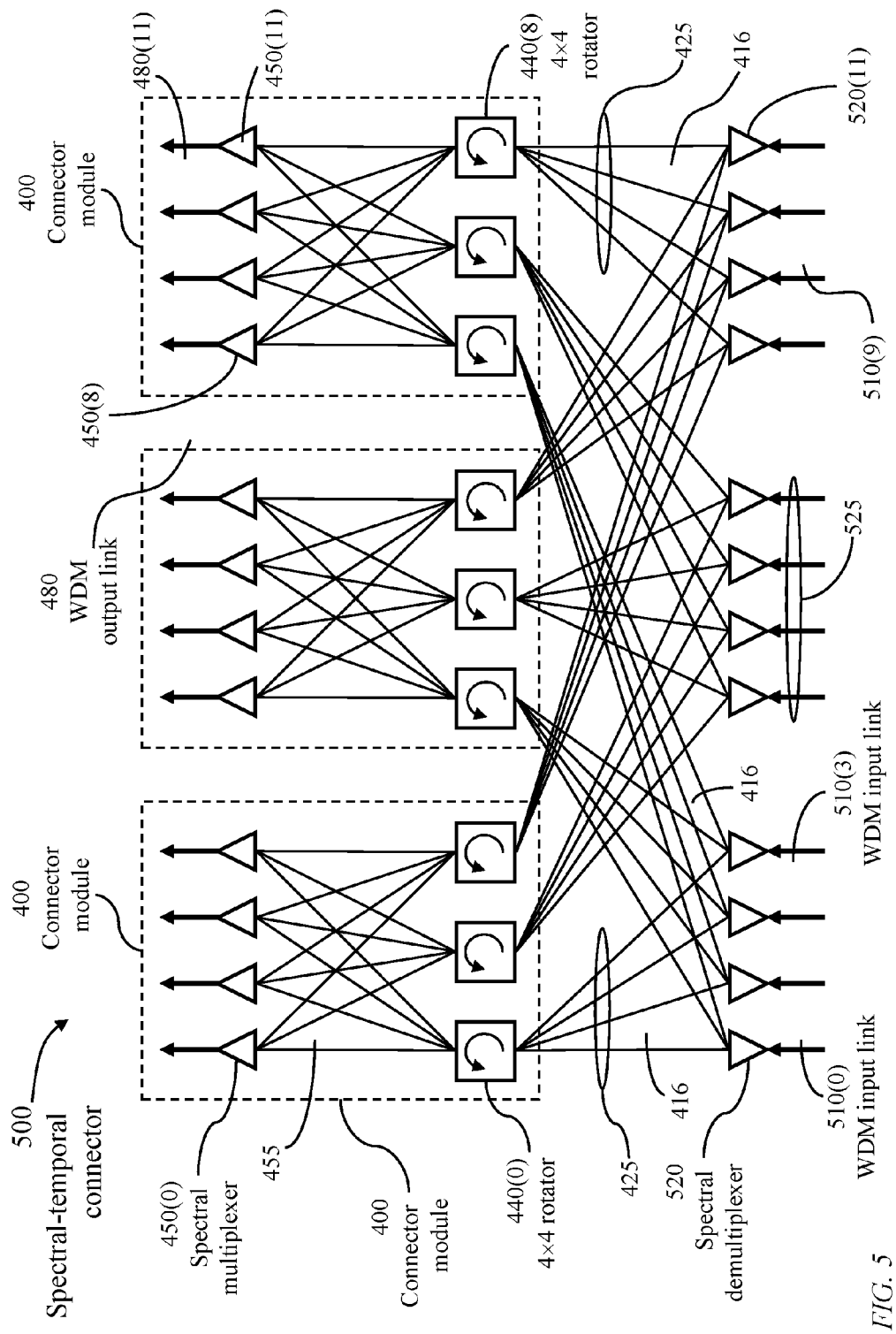
FIG. 5 illustrates a spectral-temporal connector employing an array of temporal rotators for transferring signals from each wavelength-division-multiplexed (WDM) input link of a plurality of WDM input links to each WDM output link of a plurality of WDM output links, in accordance with an embodiment of the present invention.

FIG. 5 illustrates a spectral-temporal connector 500 based on connector modules 400 for connecting each wavelength-division-multiplexed (WDM) input link 510 of a plurality of WDM input links to each WDM output link 480 of a plurality of WDM output links. With each WDM input link carrying signals occupying Λ spectral bands, the number of temporal rotators per control module 400 is preferably selected to equal Λ. An array of $\Lambda^2$ temporal rotators 440 and an array of Λ×m spectral multiplexers 450 are arranged into Λ connector modules 400, each having Λ temporal rotators and m spectral multiplexers. Each input link 510 carries optical signals occupying multiple spectral bands. Each of spectral demultiplexers 520 directs individual signals, each occupying one of Λ spectral bands, of a respective WDM input link 510 to rotators 440 of different connector modules 400. The input links 510 are arranged into input-link groups 525 and a set of input channels 416 comprising one channel from each input link 510 of an input-link group 525 connects to one temporal rotator 440 in each connector module 400.

In order to facilitate temporal alignment of signals received at a temporal rotator 440, each temporal rotator may dedicate a dual port for communicating timing signals. Thus, a temporal rotator 440 may have m data inlets and m data outlets, and at least one timing inlet receiving timing data from a timing circuit and at least one timing outlet transmitting timing data to a timing circuit as illustrated in FIG. 6.

Figure 6:
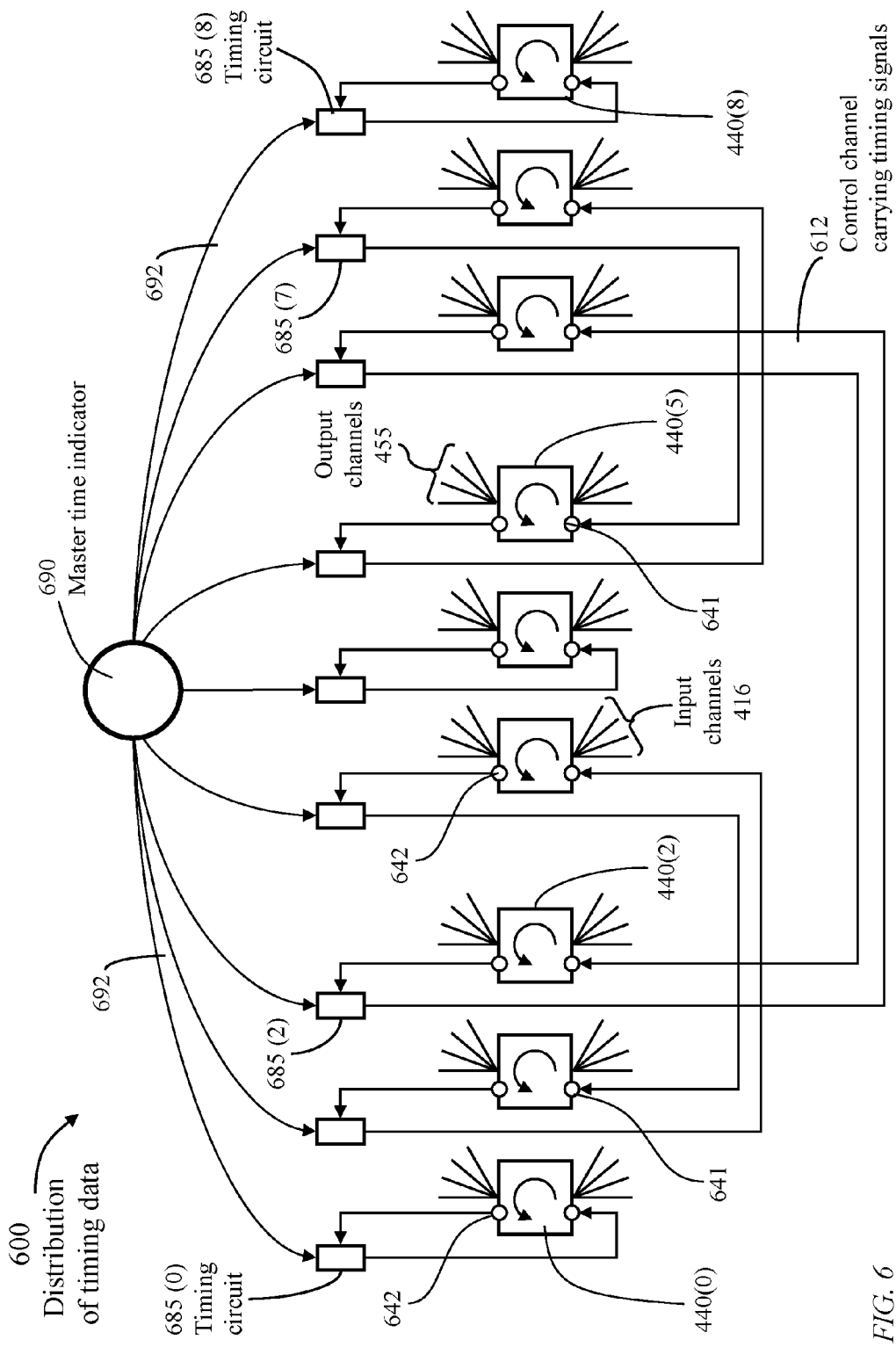
FIG. 6 illustrates a set of timing circuits individually coupled to respective temporal rotators of the spectral-temporal connector of FIG. 5, all timing circuits obeying a single master time indicator, in accordance with an embodiment of the present invention.

FIG. 6 illustrates an arrangement 600 for coupling a set of timing circuits 685 to respective temporal rotators 440 of the apparatus of FIG. 5 in order to ensure time alignment of signals arriving at the temporal rotators 440. Each timing circuit 685 receives timing data from a master time indicator 690 through a respective channel 692. Each temporal rotator 440 dedicates a control inlet 641 and a control outlet 642 for communicating timing data. A control inlet 641 of a temporal rotator 440 receives downstream timing data through a channel 612 from a timing circuit 685 to be distributed to respective output links 480 directed to switching nodes 220. A control outlet 642 of the temporal rotator sends upstream timing data from respective input channels 416 to a timing circuit 685.

Thus, the present invention provides a spectral-temporal connector 500 comprising a plurality of spectral demultiplexers 520, a plurality of temporal rotators 440, and a plurality of spectral multiplexers 450. The temporal rotators 440 are arranged into a number Λ of rotator groups and the spectral multiplexers 450 are arranged into Λ groups. Each group of rotators is coupled to a respective group of spectral multiplexers to form a connector module 400. Each input link 510 of a plurality of input links 510 carries a respective set of input channels 416 originating from a respective switching node 220. The channels of an input link are separated using a respective spectral demultiplexer 520 and directed to respective temporal rotators 440 of different rotator groups. Each spectral multiplexer combines inner channels 455 from temporal rotators 440 of a same rotator group into a respective output link 480.

The input links 510 are arranged into input-link groups 525. Λ sets of input channels 416, each set including one channel from each input link 510 of an input-link group 525, connect to temporal rotators 440 of different temporal-rotator groups.

The input signals of input channels 416 need be time aligned. A plurality of timing circuits 685 is provided for this purpose. Each timing circuit 685 connects to a control outlet 642 of a respective first temporal rotator 440 and to a control inlet 641 of a respective second temporal rotator 440. Each timing circuit 685 is configured to retrieve an incoming time indication from each channel 416 connected to an inlet of the first temporal rotator, receive a corresponding reference time indication from a master time indicator 690, and transmit the incoming time indication and corresponding reference time indication to the control inlet 641 of the respective second temporal rotator. A timing circuit 685 may transmit an indication of discrepancy between the incoming time indication and the corresponding reference time indication.

To realize a spectral-temporal connector 500 having at least a specified number, N, of WDM input links and at least N WDM output links 480, where each WDM input link comprises Λ channels (i.e., carries signals occupying Λ spectral bands), Λ>1, N>Λ, each temporal rotator 440 is configured to have at least (m+1) inlets and at least (m+1) outlets, where m is determined as m=⌈N/Λ⌉ and ⌈x⌉ denoting a nearest integer greater than or equal to a number x.

The Λ channels (spectral bands) of an input link 510 are routed to temporal rotators 440 of different connector modules. In one implementation, the Λ channels of an input link of index j, 0≤j<N, connect to Λ temporal rotators of indices:

(⌊j/m⌋+Q×Λ), 0≤Q<Λ.

The input links 510 are indexed sequentially between 0 and (N−1), 1<N<(m×Λ) and the temporal rotators are indexed sequentially between 0 and ($\Lambda^2$−1).

Inner channels 455 connect outlets of a temporal rotator 440 of index k, 0≤k<$\Lambda^2$, to spectral multiplexers connecting to output links of indices:

(m×⌊k/Λ⌋+q), 0≤q<m.

The temporal rotators are indexed sequentially between 0 and ($\Lambda^2$−1) and the output WDM links are indexed sequentially between 0 and (N−1), where ⌊x⌋ denotes an integer part of a number (generally a real number) x.

FIG. 6 illustrates connectivity of timing circuits 685 to control inlets 641 and control outlets 642 of temporal rotators 440 for a spectral-temporal connector where each WDM input link carries three spectral bands (Λ=3), and each temporal rotator 440 has one control inlet 641, one control outlet 642, four inlets connecting to input channels 416 and four outlets connecting spectral multiplexers 450 (m=4). For an arbitrary value of Λ, Λ>1, according to an embodiment, a timing circuit 685 of index k, 0≤k<Λ², connects to a control outlet 642 of a temporal rotator of index k and to a control inlet 641 of a temporal rotator of index:

$\lfloor k/\Lambda \rfloor + \Lambda \times (k)_{modulo\ \Lambda}$.

The temporal rotators are indexed sequentially between 0 and (Λ²−1), and the timing circuits are indexed sequentially between 0 and (Λ²−1).

It is noted that the index $\{\lfloor k/\Lambda \rfloor + \Lambda \times (k)_{modulo\ \Lambda}\}$ may also be written as:

$\{k \times \Lambda + \lfloor k/\Lambda \rfloor\} modulo\ \Lambda^2$.

Figure 7:
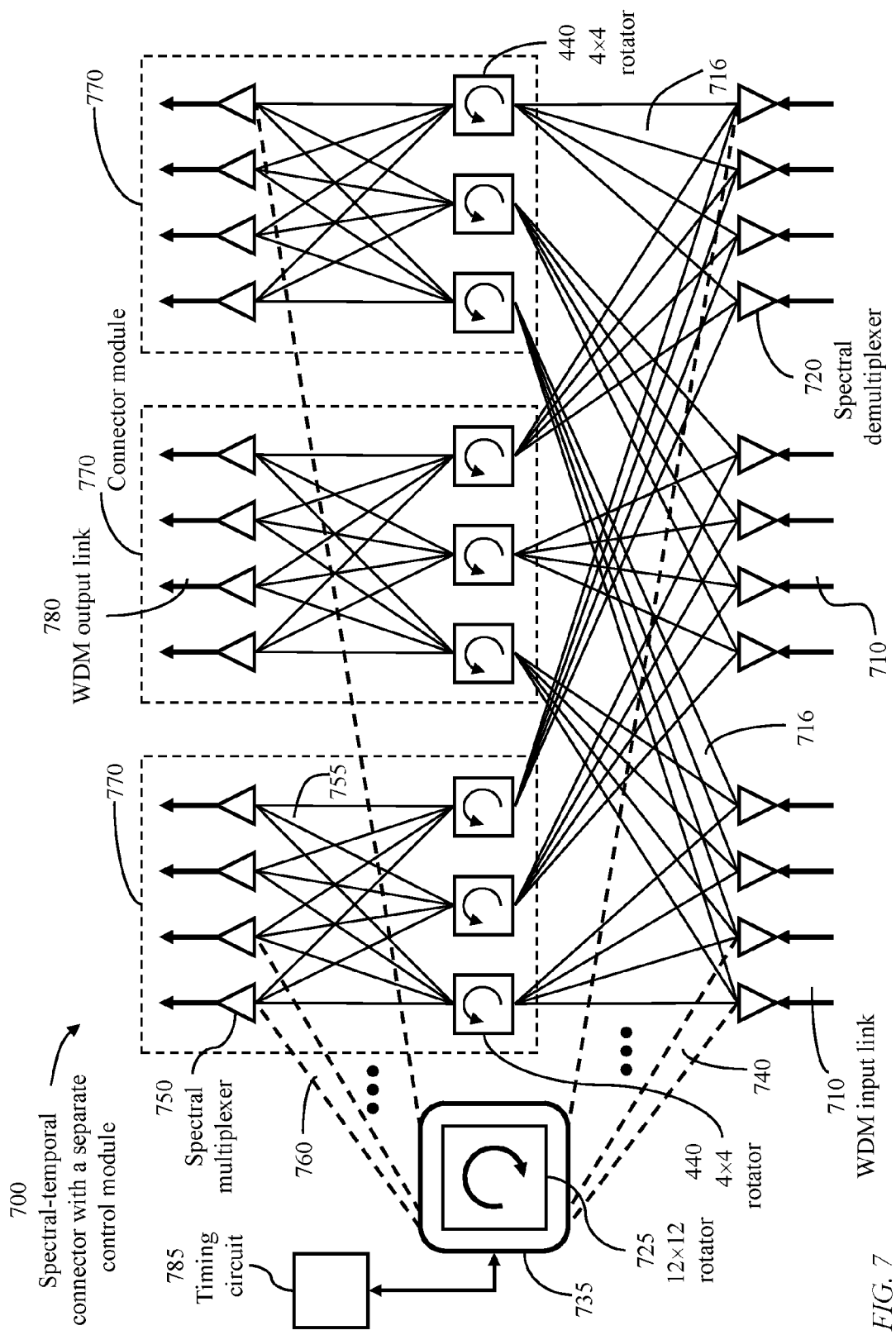
FIG. 7 illustrates a spectral-temporal connector similar to the spectral-temporal connector of FIG. 5 but with a separate control module distributing control messages, in accordance with an embodiment of the present invention.

FIG. 7 illustrates a spectral-temporal connector 700, similar to the spectral-temporal connector of FIG. 5, based on connector modules 770 for connecting each wavelength-division-multiplexed (WDM) input link 710 of a plurality of WDM input links to each WDM output link 780 of a plurality of WDM output links. A separate control module 735 is provided for distributing control messages. Control module 735 may employ a temporal rotator 725, for distributing time-slotted control signals from WDM input links 710 to WDM output links 780. Each WDM input link 710 carries (Λ+1) signals, occupying different spectral bands including Λ signals directed to respective temporal rotators and one signal directed to the control module 735. Each spectral demultiplexer 720 separates the (Λ+1) signals of a respective WDM input link 710 into data channels 716 and a control channel 740. Channels 716 carry the Λ data signals to respective temporal rotators 440 and channel 740 carries the control signal to control module 735. Each spectral multiplexer 750 combines Λ signals, received over inner channels 755 from temporal rotators, occupying different spectral bands and a signal from control module 735, received over channel 760, to be transmitted over a WDM output link 780. A timing circuit 785 is coupled to a master time indicator (not illustrated) and reports discrepancy between sending-time indications from input links 710 and corresponding readings of the master time indicator.

Figure 8:
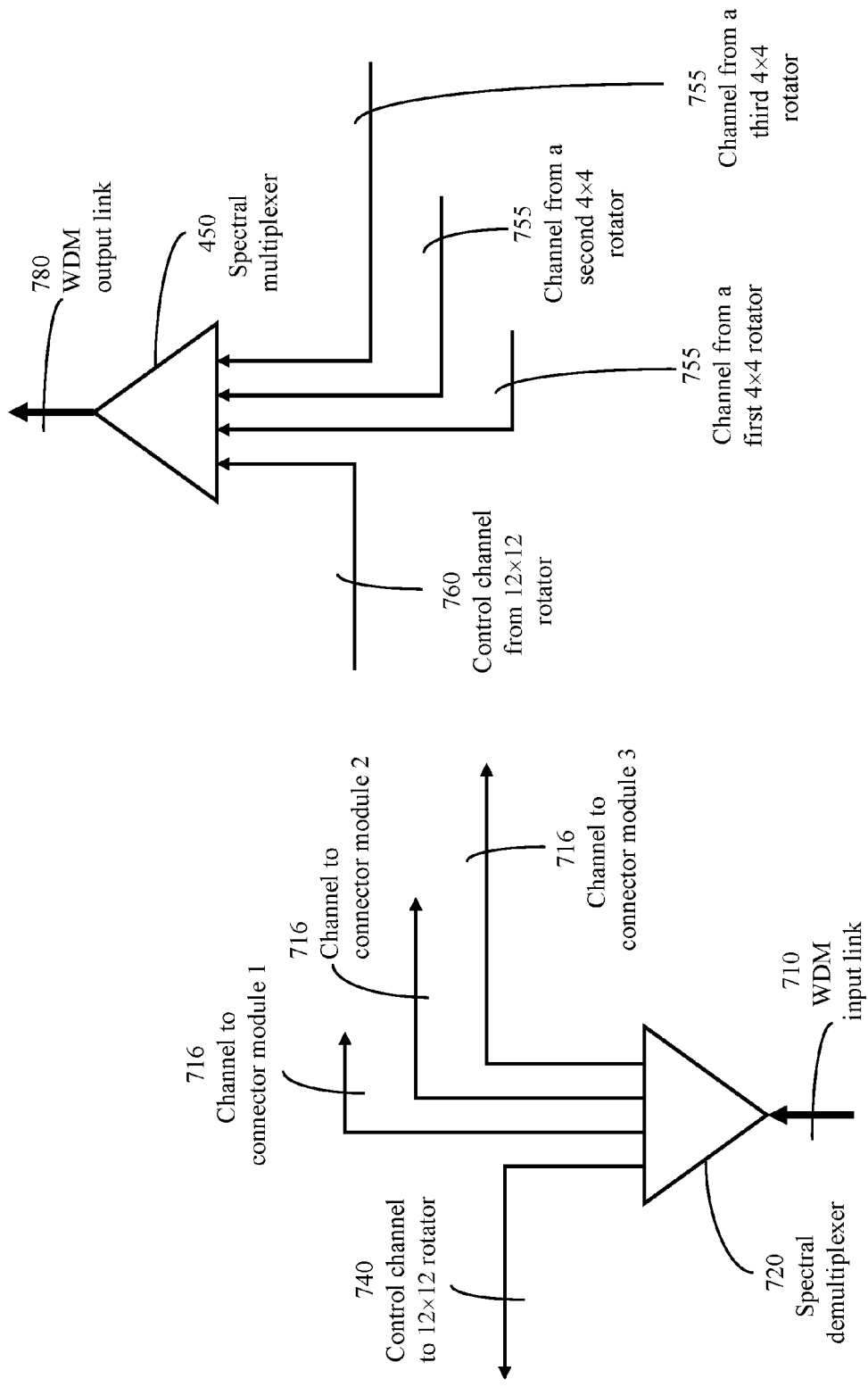
FIG. 8 illustrates spectral demultiplexing of a control channel and payload data channels carried by an input WDM link and spectral multiplexing of payload data channels and a control channel onto an output WDM link in the spectral-temporal connector of FIG. 7, in accordance with an embodiment of the present invention.

FIG. 8 illustrates spectral demultiplexing of a WDM input link 710 to a control channel 740 and data channels 716, and spectral multiplexing of a control channel 760 and data channels 755 of the spectral-temporal connector of FIG. 7. A spectral demultiplexer 720 separates Λ signals of different spectral bands to be directed to different connector modules over channels 716 and a control signal to be directed to control module 735 over a channel 740. A spectral multiplexer 750 combines channels 755 from a set of Λ temporal rotators 440 and channel 760 from the control module 735 onto a WDM output link 780. Thus, the WDM output link 780 carries signals received from the set of Λ temporal rotators 440 and control signals from the control module 735.

Figure 9:
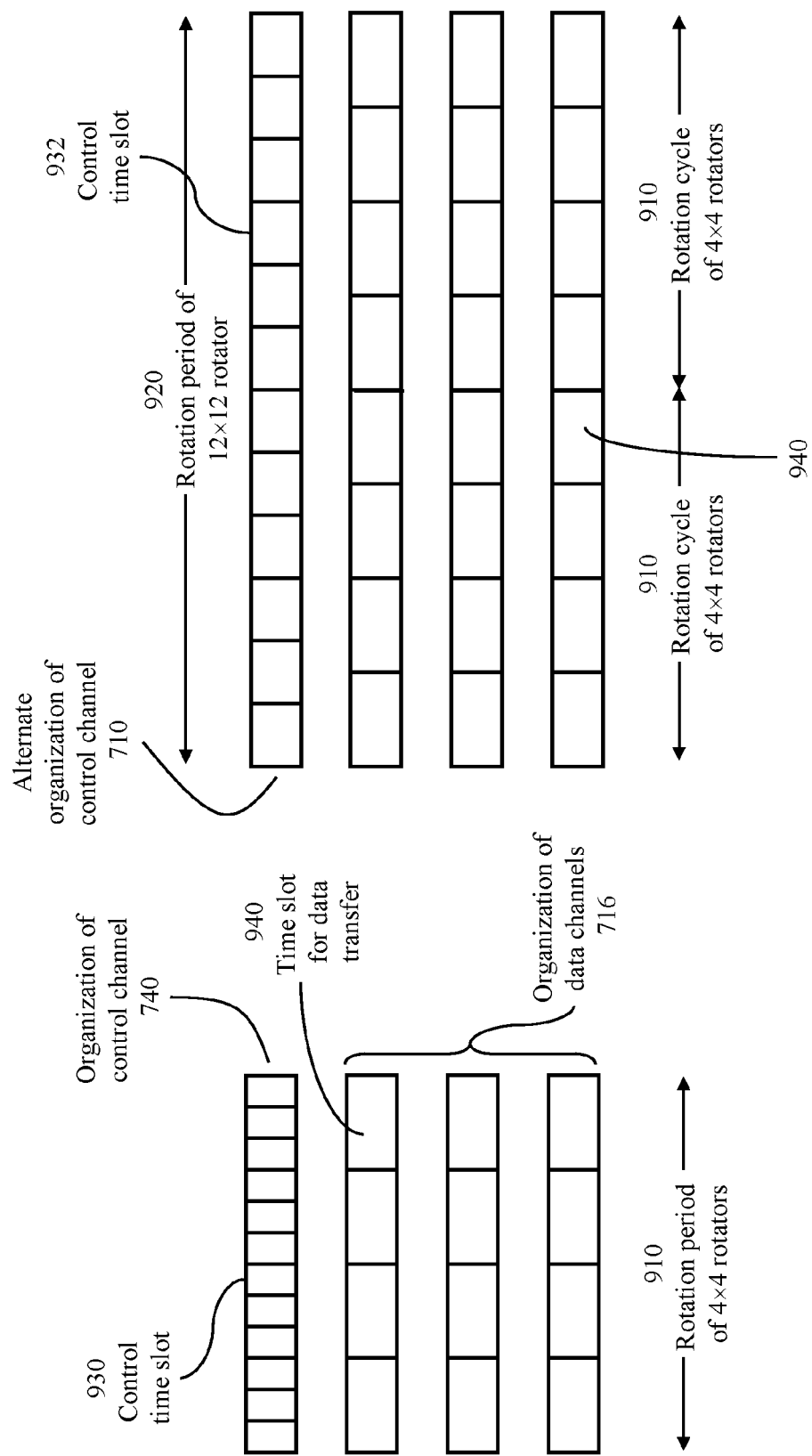
FIG. 9 illustrates temporal organization of a control channel and data channels in the spectral-temporal connector of FIG. 7, in accordance with an embodiment of the present invention.

FIG. 9 illustrates temporal organization of a control channel and a data channel in the spectral-temporal connector of FIG. 7.

According to one embodiment, each of data channels 716 carries data organized into m successive data blocks occupying m data time slots 940 during a rotation period 910.

Likewise, each of inner channels 755 carries data organized into m successive data blocks occupying m data time slots 940 during a rotation period 910. Each of control channels 740 and 760 carries control signals organized into Λ×m control time slots 930 during the same rotation period 910.

According to another embodiment, each of data channels 716 and inner channels 755 carries data organized into m successive data blocks occupying m data time slots 940 during a rotation period 910. However, each of control channels 740 and 760 carries control signals organized into Λ×m control time slots 932 during the a rotation period 920 of a duration equal to an integer multiple of the rotation period 910. Thus the duration of a control time slot 932 is an integer multiple of the duration of control time slot 930. In the exemplary organization of FIG. 9, the rotation period 920 is double the rotation period 910.

Figure 10:
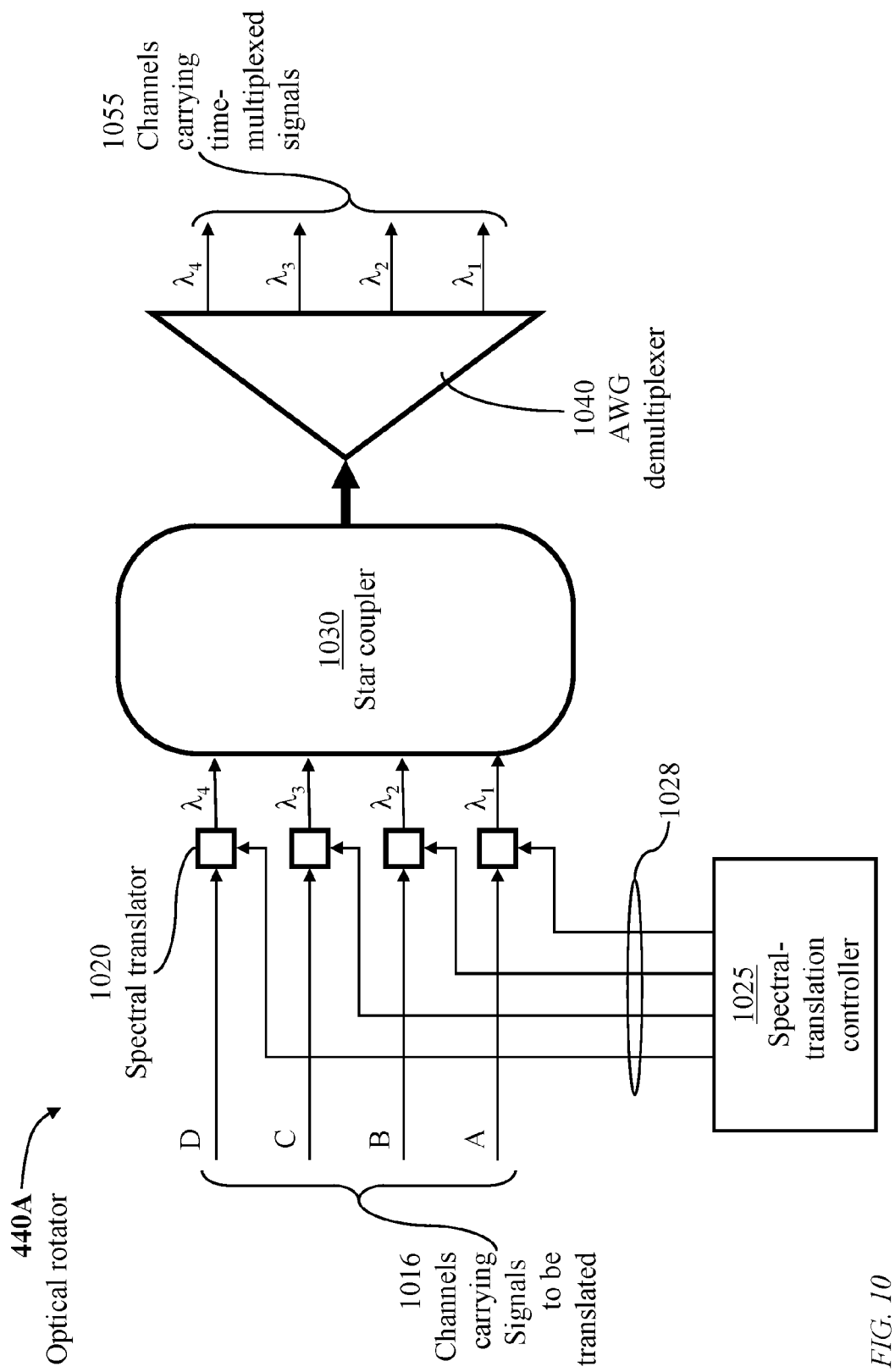
FIG. 10 illustrates a first implementation of an optical rotator used in the spectral-temporal connector of FIG. 5 or the spectral-temporal connector of FIG. 7, to connect each input channel of a set of input channels to each output channel of a set of output channels during a rotation cycle, in accordance with an embodiment of the present invention.

FIG. 10 illustrates a first optical temporal rotator 440A connecting each input of a set of input channels 1016 to each output of a set of output channels 1055 during a rotation cycle. An outlet of a star coupler 1030 connects to an Arrayed Waveguide Grating (AWG) demultiplexer 1040 having m output channels each assigned one of a predefined set of spectral bands of central wavelengths $\lambda_1$, $\lambda_2$, $\lambda_3$, and $\lambda_4$. Input channels 1016, individually identified as 1016-A, 1016-B, 1016-C, and 1016-D, connect to respective spectral translators (wavelength translators) 1020, individually identified as 1020-A, 1020-B, 1020-C, and 1020-D. A spectral-translation controller 1025 connects to spectral translators 1020 through control channels 1028 and causes the spectral translators to translate respective optical signals received from input channels 1016 so that during each time slot of a cyclic rotation cycle of m time slots, the outputs of the spectral translators 1020 occupy non-overlapping spectral bands of the predefined set of spectral bands. During each rotation cycle, each spectral translator produces optical signals occupying each of the predefined set of spectral bands.

For example, during a first time slot of the rotation cycle, spectral controller 1025 sets spectral translators 1020-A, 1020-B, 1020-C, and 1020-D to translate spectral bands of input channels 1016-A, 1016-B, 1016-C, and 1016-D so that the output signals of the spectral translators occupy spectral bands of central wavelengths $\lambda_1$, $\lambda_2$, $\lambda_3$, and $\lambda_4$, respectively. During subsequent time slots of the rotation cycle, the output signals of the spectral translators occupy spectral bands of central wavelengths $\{\lambda_2, \lambda_3, \lambda_4, \lambda_1\}$, $\{\lambda_3, \lambda_4, \lambda_1, \lambda_2\}$, and $\{\lambda_4, \lambda_1, \lambda_2, \lambda_3\}$. Other patterns may be selected. For example, the spectral bands at inputs of star coupler 1030 during the m time slots of the rotation cycle may be $\{\lambda_2, \lambda_1, \lambda_4, \lambda_3\}$, $\{\lambda_1, \lambda_3, \lambda_2, \lambda_4\}$, $\{\lambda_3, \lambda_4, \lambda_1, \lambda_2\}$, and $\{\lambda_4, \lambda_2, \lambda_3, \lambda_1\}$.

Figure 11:
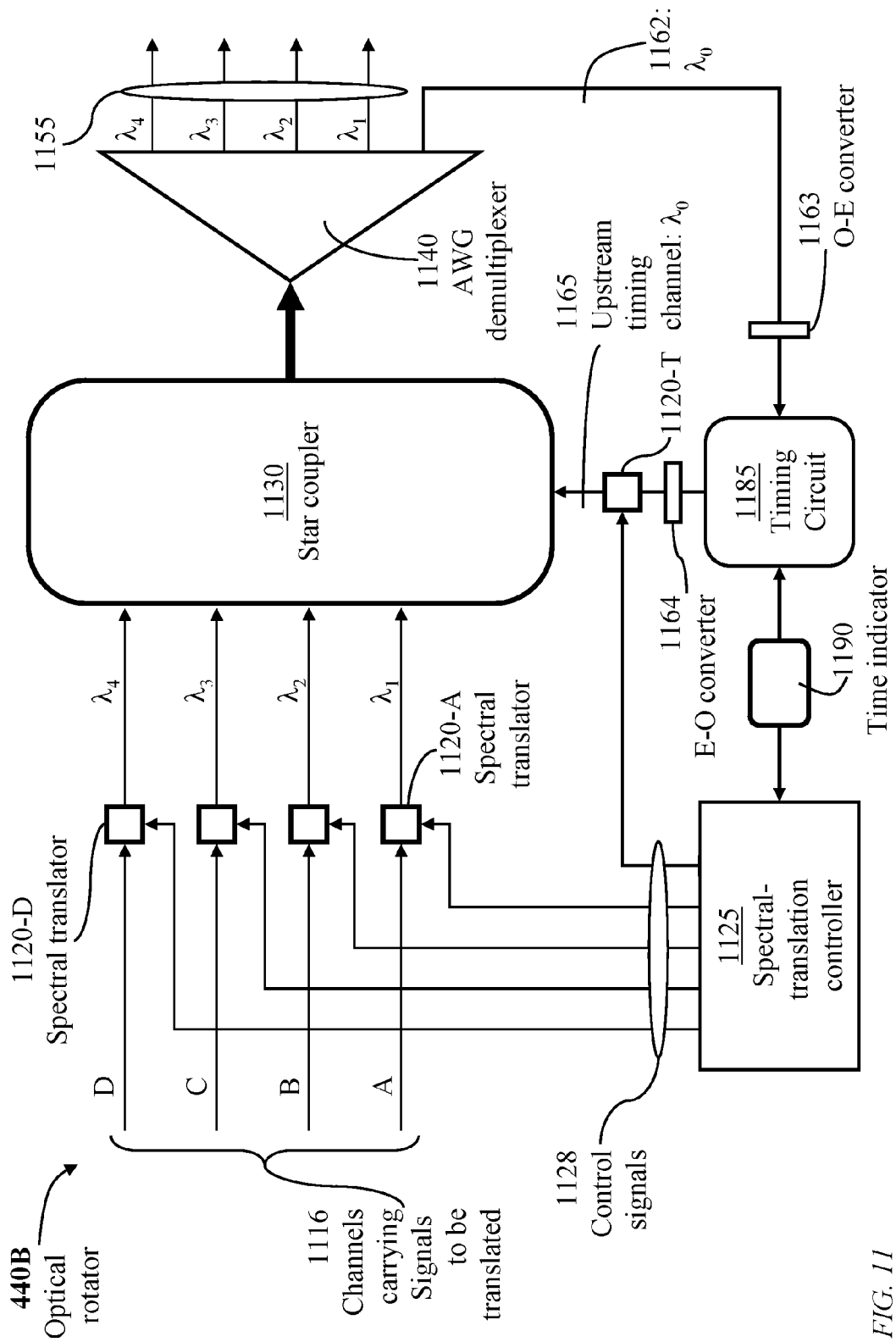
FIG. 11 illustrates a second implementation of an optical rotator used in the spectral-temporal connector of FIG. 5 or the spectral-temporal connector of FIG. 7, to connect each input channel of a set of input channels to each output channel of a set of output channels during each rotation cycle, in accordance with an embodiment of the present invention.

FIG. 11 illustrates a second temporal optical rotator 440B for use in the spectral-temporal connector of FIG. 5 or the spectral-temporal connector of FIG. 7. The temporal optical rotator 440B receives signals from an upstream control channel 1165 and a set of input channels 1116 to be directed to a control channel 1162 and a set of output channels 1155 during each rotation cycle. An outlet of a star coupler 1130 connects to an Arrayed Waveguide Grating (AWG) demultiplexer 1140 connecting to output control channel 1162 and m output channels 1155 each assigned one of a predefined set of spectral bands of central wavelengths $\lambda_0$, $\lambda_1$, $\lambda_2$, $\lambda_3$, and $\lambda_4$. Output control channel 1162 is directed to a timing circuit 1185 through an optical-to-electrical converter 1163. Control channel 1165, connecting spectral translator 1120-T at output of timing circuit 1185 to an inlet of star coupler 1130 carries downstream timing information to be delivered through output channels 1155 to external destination nodes. A time indictor 1190 is coupled to timing circuit 1185 and spectral-translation controller 1125.

As in the configuration of FIG. 10, input channels 1116, individually identified as 1116-A, 1116-B, 1116-C, and 1116-D, connect to respective spectral translators (wavelength translators) 1120, individually identified as 1120-A, 1120-B, 1120-C, and 1120-D. An electrical-optical converter 1164 converts timing data from timing circuit 1185 to an optical signal to be supplied to spectral translator 1120-T connecting to an input of the star coupler 1130. Spectral-translation controller 1125 connects to spectral translators 1120 through control channels 1128 and causes the spectral translators to translate an optical signal carried by timing channel 1165 as well as optical signals received from input channels 1116 so that during each time slot of a cyclic rotation cycle of (m+1) time slots, the outputs of the spectral translators 1120 occupy non-overlapping spectral bands of the predefined set of spectral bands. During each rotation cycle, each spectral translator produces optical signals occupying each of the predefined set of spectral bands.

According to one rotation scheme, a rotation cycle includes a number of time slots equal to the total number of inlets of the star coupler. During a first time slot of the rotation cycle, spectral controller 1125 sets spectral translators 1120-T, 1120-A, 1120-B, 1120-C, and 1120-D to translate spectral bands of channels 1165, 1116-A, 1116-B, 1116-C, and 1116-D so that the output signals of the spectral translators occupy spectral bands of centre wavelengths $\lambda_0$, $\lambda_1$, $\lambda_2$, $\lambda_3$, and $\lambda_4$, respectively. During subsequent time slots of the rotation cycle, the output signals of the spectral translators occupy spectral bands of centre wavelengths $\{\lambda_1, \lambda_2, \lambda_3, \lambda_4, \lambda_0\}$, $\{\lambda_2, \lambda_3, \lambda_4, \lambda_0, \lambda_1\}$, $\{\lambda_3, \lambda_4, \lambda_0, \lambda_1, \lambda_2\}$ and $\{\lambda_4, \lambda_0, \lambda_1, \lambda_2, \lambda_3\}$. Other patterns may be selected.

Figure 12:
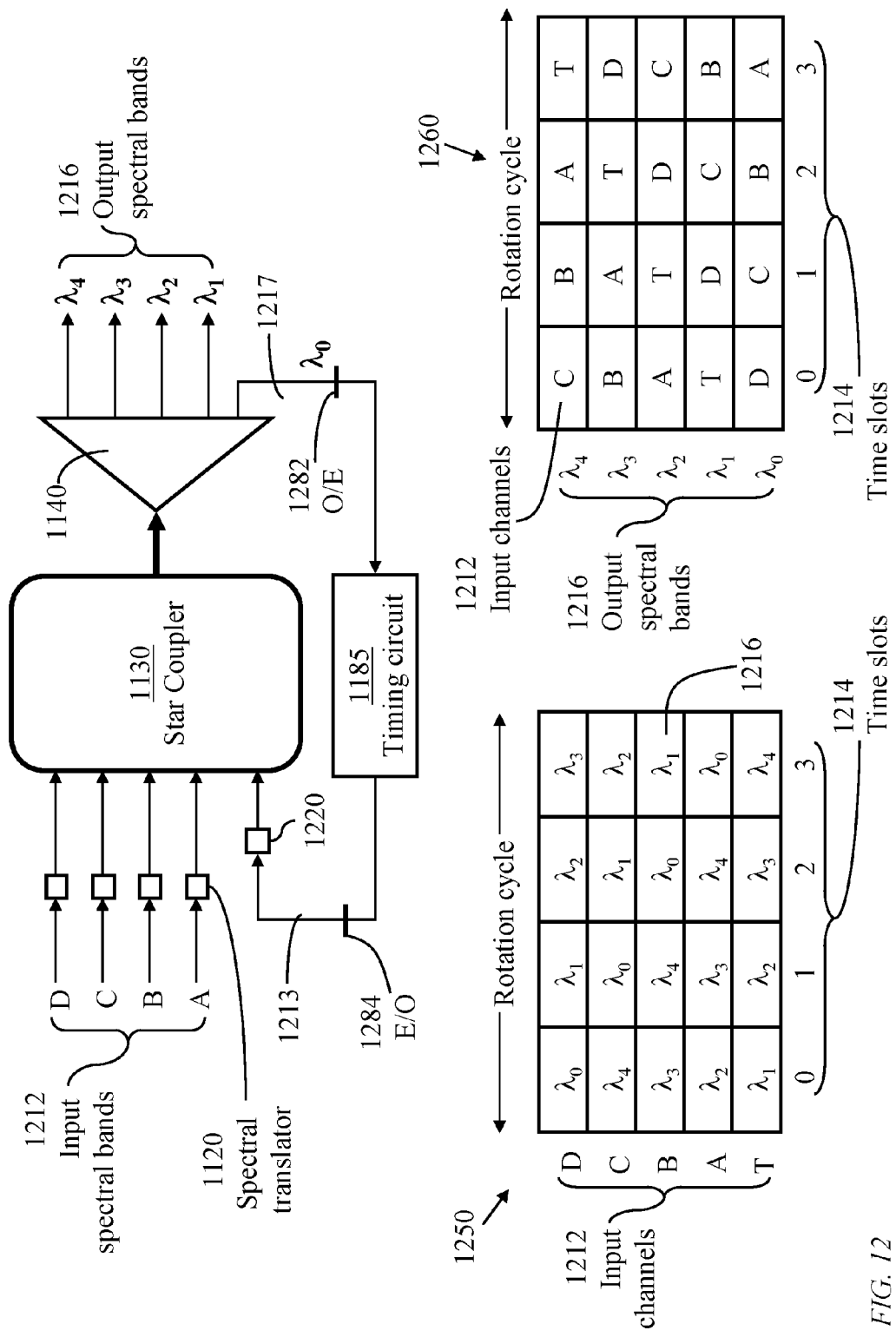
FIG. 12 illustrates an optical rotator configured so that each input skips one output during each rotation cycle, in accordance with an embodiment of the present invention.

According to another rotation scheme, a rotation cycle includes a number of time slots equal to the total number of inlets of the star coupler minus one. FIG. 12 illustrates an optical rotator similar to the optical rotator of FIG. 11 but configured so that each input skips one output during each rotation cycle. The optical rotator connects four input channels (spectral bands) 1212 individually labelled as "A", "B", "C", and "D", and an internal control channel 1213 from electrical-optical converter 1284, at output of timing circuit 1185, to four output channels 1216 and internal control channel 1217 to optical-electrical converter 1282 preceding timing circuit 1185.

Optical-electrical converter 1282 converts optical signals, transferred from the four input channels 1212 to internal control channel 1217 through the star coupler 1130 and spectral demultiplexer 1140, to electrical signals to be processed by timing circuit 1185. Electrical-optical converter 1284 converts electrical signals from the timing circuit 1185 to optical signals which may occupy different spectral bands at the output of spectral translator 1220 connecting to an input of the star coupler.

During a rotation cycle of 4 time slots 1214, spectral translators 1120 (1120-A to 1120-D) translate spectral bands of signals carried on input channels 1212-A, 1212-B, 1212-C, and 1212-D to spectral bands $\{\lambda_2, \lambda_3, \lambda_4, \lambda_0\}$, $\{\lambda_3, \lambda_4, \lambda_0, \lambda_1\}$, $\{\lambda_4, \lambda_0, \lambda_1, \lambda_2\}$, and $\{\lambda_0, \lambda_1, \lambda_2, \lambda_3\}$, respectively, as illustrated in table 1250. Spectral translator 1220 produces optical signals occupying spectral bands $\{\lambda_1, \lambda_2, \lambda_3, \lambda_4\}$ during the rotation cycle. Thus, a spectral band of central wavelength $\lambda_0$ at output of the spectral demultiplexer contains signal segments from input channels 1212 of indices D, C, B, and A, respectively. The signal segments are dedicated to carry control information generated at respective originating nodes 220. A spectral band of central wavelengths $\lambda_1$ at output of the spectral demultiplexer contains signal segments from timing circuit 1185 and input channels 1212 of indices D, C, and B, respectively. The contents of spectral bands of central wavelengths $\lambda_0$, $\lambda_1$, $\lambda_2$, $\lambda_3$, and $\lambda_4$ at output of the spectral demultiplexer 1140 are listed in Table 1260 of FIG. 12.

Figure 13:
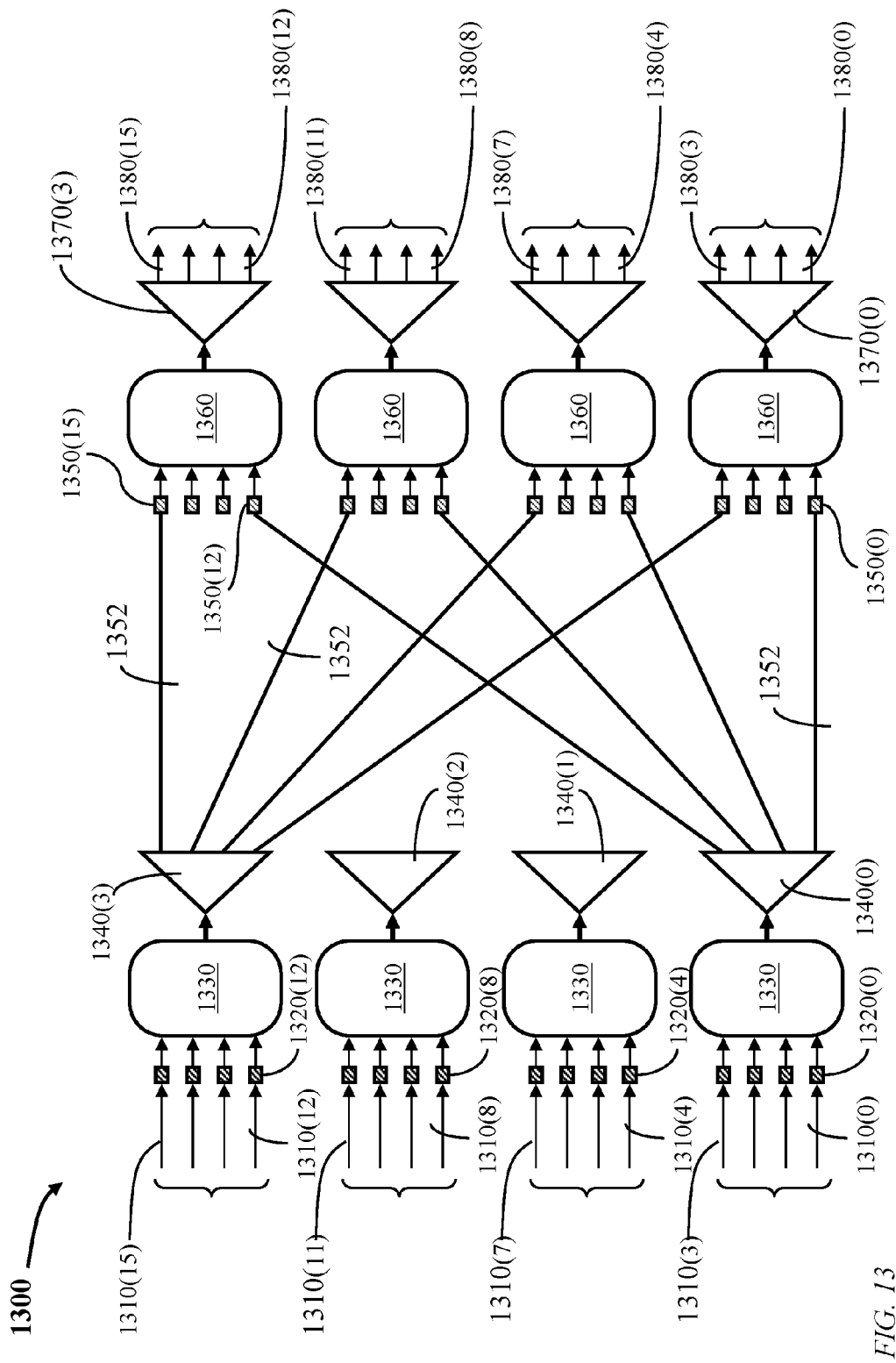
FIG. 13 illustrates an optical rotator comprising an array of primary star couplers and an array of secondary star couplers, in accordance with an embodiment of the present invention.

FIG. 13 illustrates an optical rotator 1300 comprising an array of primary star couplers 1330 and an array of secondary star couplers 1360. Optical rotator 1300 may serve as an implementation of the temporal rotator of control module 735. Optical rotator 1300 may also be used as a temporal rotator 440 of the connector module 400.

With each primary star coupler 1330 having m inputs, and each secondary star coupler 1360 having m inputs, optical rotator 1300 cyclically connects each of $m^2$ input channels 1310, to each of $m^2$ output channels 1380. The input channels 1310 are individually identified as 1310(0) to 1310($m^2$–1) and the output channels 1380 are individually identified as 1380(0) to 1380($m^2$–1).

Each input channel 1310 connects to a respective primary star coupler 1330 through a respective primary spectral translator 1320. The primary spectral translators are individually identified as 1320(0) to 1320($m^2$–1). Each primary star coupler 1330 has an output connecting to a spectral demultiplexer 1340 having m output channels 1352 each channel 1352 connecting to a secondary spectral translator 1350 of a respective secondary star coupler 1360. The spectral demultiplexers 1340 are individually identified as 1340(0) to 1340(m–1). The secondary spectral translators 1350 are individually identified as 1360(0) to 1360($m^2$–1).

Each spectral translator of an array of secondary spectral translators 1350 connects to a respective input of a secondary star coupler 1360. Each secondary star coupler 1360 has an outlet connecting to a respective secondary demultiplexer 1370 having m output channels 1380.

Figure 14:
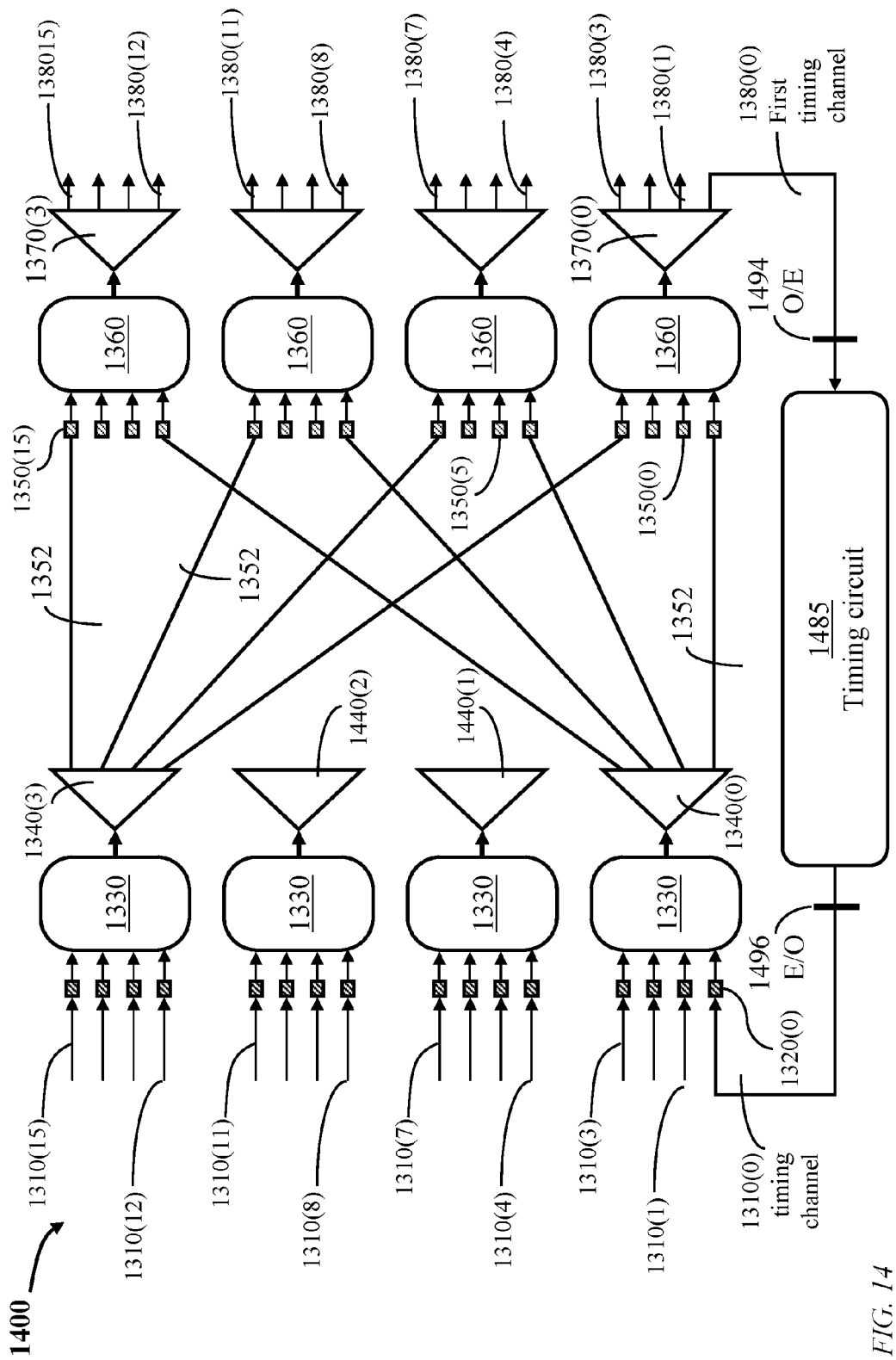
FIG. 14 illustrates an optical rotator, similar to the optical rotator of FIG. 13 but equipped with a timing circuit for exchange of timing information with external nodes, the optical rotator comprising an array of primary star couplers and an array of secondary star couplers, in accordance with an embodiment of the present invention.

FIG. 14 illustrates an optical rotator 1400 similar to the optical rotator 1300 of FIG. 13 but equipped with a timing circuit 1485 for exchange of timing information with external nodes. Optical rotator 1400 comprises an array of primary star couplers 1330 and an array of secondary star couplers 1360. In the exemplary configuration of FIG. 14, timing circuit 1485 connects to output channel 1380(0) through an optical-to-electrical converter 1494 and connects to input channel 1310(0) through an electrical-to-optical converter 1496. The timing circuit 1485 receives timing data from each of input channels 1310(1) to 1310($m^2$–1) and returns corresponding timing data from a master time indicator (not illustrated) to output channels 1380(1) to 1380 ($m^2$–1). Output channel 1380(0) carries control data to timing circuit 1485 through optical-to-electrical converter 1494 and input channel 1310(0) carries control signals from timing circuit 1485 through Electrical-to-Optical converter 1496.

Figure 15:
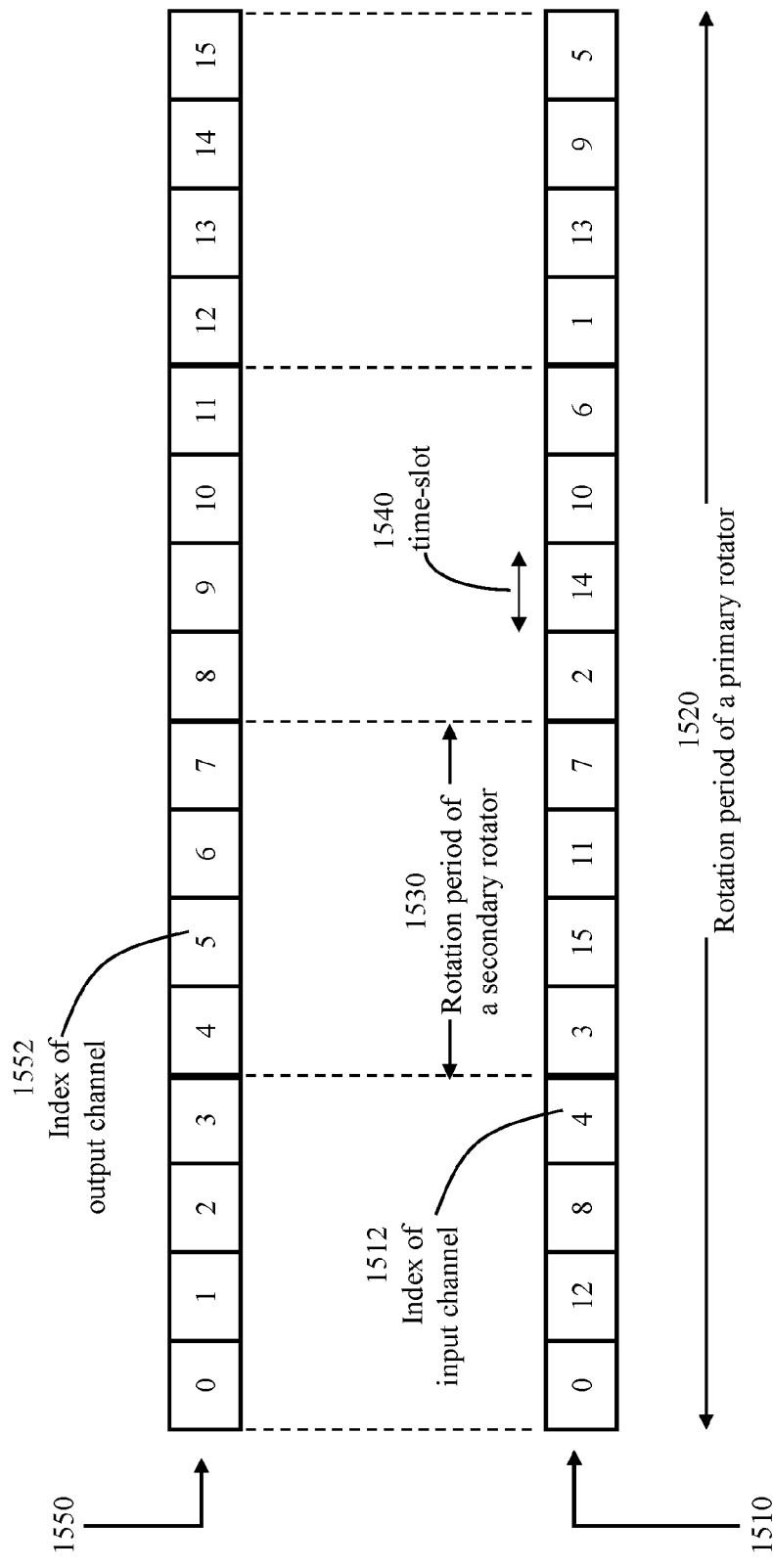
FIG. 15 illustrates allocation of control time slots for input channels and output channels of the optical rotator of FIG. 14, in accordance with an embodiment of the present invention.

FIG. 15 illustrates allocations of control time slots for input channels and output channels of the optical rotator of FIG. 14. An array 1510 contains indices 1512 of input channels sending control signals (timing signals) to timing circuit 1485 during $m^2$ consecutive time slots, indexed as 0 to ($m^2$–1), of a rotation cycle of optical rotator 1400, where m=4. An array 1550 contains indices 1552 of output channels receiving control signals (timing signals) from timing circuit 1485 during $m^2$ consecutive time slots of the rotation cycle.

A primary rotator comprises m spectral translators 1320, a star coupler 1330, and a spectral demultiplexer 1340. A primary rotation period, 1520, of a primary rotator includes m² time slots 1540. A secondary rotator comprises m spectral translators 1350, a star coupler 1360, and a spectral demultiplexer 1370. A secondary rotation period 1530 of a secondary rotator includes m time slots 1540.

Figure 16:
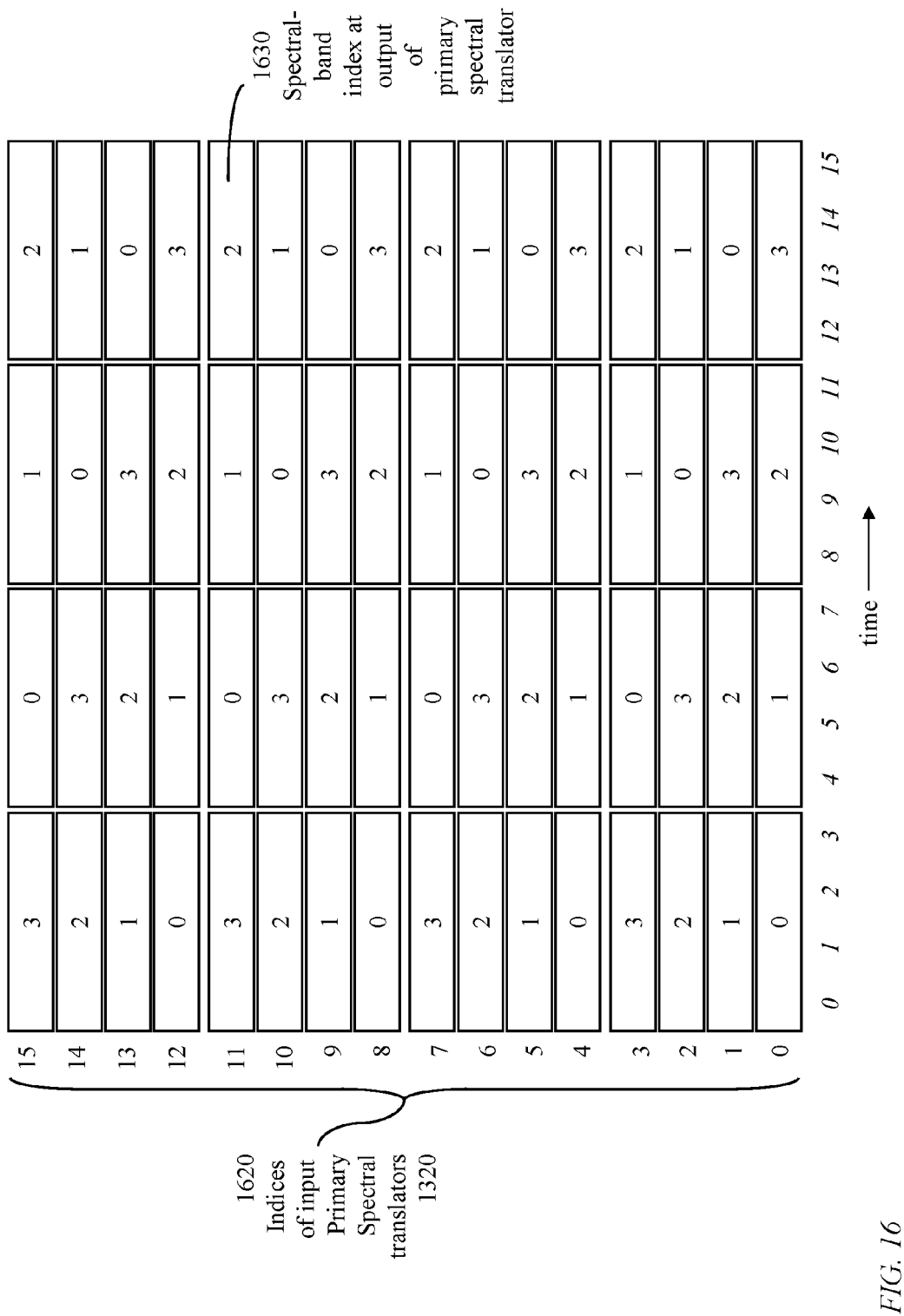
FIG. 16 lists indices of spectral bands at inputs of primary star couplers of the optical rotator of FIG. 13 or FIG. 14 during time slots of a primary rotation cycle.

FIG. 16 lists indices 1630 of spectral bands at output of m² primary spectral translators 1320 of indices 1620 during m² time slots of a primary rotation cycle. An output optical signal of a primary spectral translator 1320 occupies a same spectral band during m successive time slots (m=4 in the exemplary temporal rotator 1300). For example, the optical signal at the output of any of spectral translators 1320(0), 1320(4), 1320(8), or 1320(12) occupies spectral band $\Omega_0$ during time slots 0 to 3, spectral band $\Omega_1$ during time slots 4 to 7, and so on. The optical signal at the output of any of spectral translators 1320(2), 1320(6), 1320(10), or 1320(14) occupies spectral band $\Omega_2$ during time slots 0 to 3, spectral band $\Omega_3$ during time slots 4 to 7, and so on. During any time slot, the m optical signals at inputs of each primary star coupler 1330 occupy the same set of m spectral bands.

Figure 17:
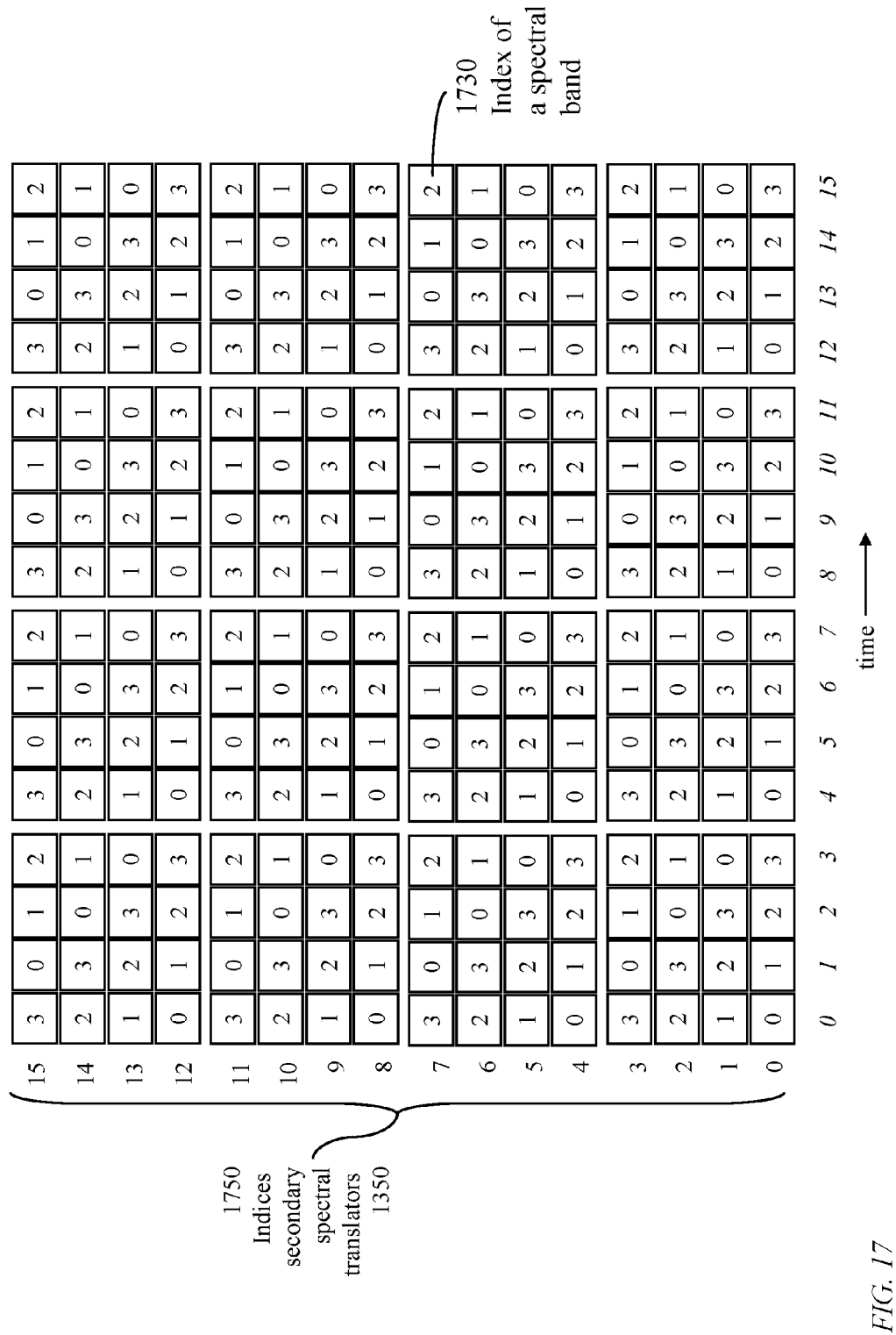
FIG. 17 lists indices of spectral bands at inputs of secondary star couplers of the optical rotator of FIG. 13 or FIG. 14 during time slots of a primary rotation cycle.

FIG. 17 lists indices 1730 of spectral bands at output of m² secondary spectral translators 1350, of indices 1750, during m² time slots of a primary rotation cycle. The output optical signals of a secondary spectral translator 1350 occupy m different spectral bands during m successive time slots. During any time slot, the m optical signals at inputs of each secondary star coupler 1360 occupy the same set of m spectral bands.

Figure 18:
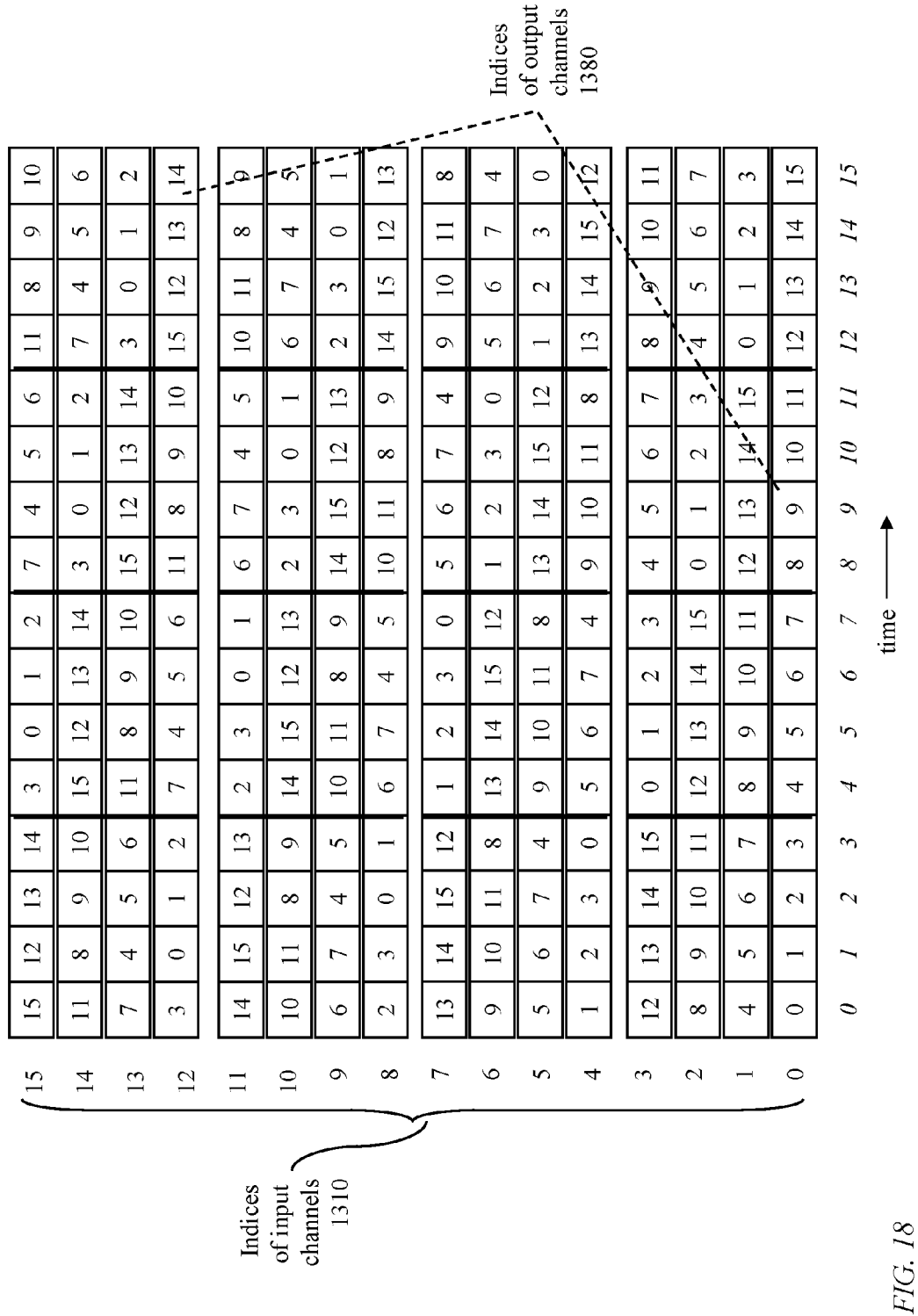
FIG. 18 illustrates connectivity of the optical rotator of FIG. 13 or FIG. 14 indicating an index of an output channel to which each input channel connects during each time slot of a rotation cycle.

FIG. 18 illustrates connectivity of temporal rotator 1300 indicating, for each input channel 1310, indices of output channels 1380 connecting to the input channel during each time slot of a rotation cycle. For example, input channel 1310(2) connects to output channels 1380 of indices {8, 9, 10, 11, 12, 13, 14, 15, 0, 1, 2, 3, 4, 5, 6, 7} during time slots 0 to 15, respectively.

The first stage of optical temporal rotator 1300 includes m² spectral translators 1320, m star couplers 1330, and m spectral demultiplexers 1340. The second stage of optical temporal rotator 1300 includes m² spectral translators 1350, m star couplers 1360, and m spectral demultiplexers 1380.

According to one rotation discipline, each temporal rotator unit of the first stage is an ascending rotator unit. Thus, with j denoting an index of an input port of the first stage of optical temporal rotator 1300, k denoting an index of an output port of the first stage of optical temporal rotator 1300, p denoting an index of an input port of the second-stage, and q denoting an index of an output port of the second stage; $0 \le j < N$, $0 \le k < N$, $0 \le p < N$, $0 \le q < N$ $N = m^2$, $m > 2$:

$$k = m \times \lfloor j/m \rfloor + (j + \lfloor t/m \rfloor)_{modulo\ m},\ m > 2.$$

According to the connectivity discipline of FIG. 13 and FIG. 14:

$$p = m \times k_{modulo\ m} + \lfloor k/m \rfloor.$$

With each rotator unit of the second stage operated as an ascending rotator unit:

$$q = m \times k_{modulo\ m} + \{t + \lfloor k/m \rfloor\}_{modulo\ m}.$$

Figure 19:
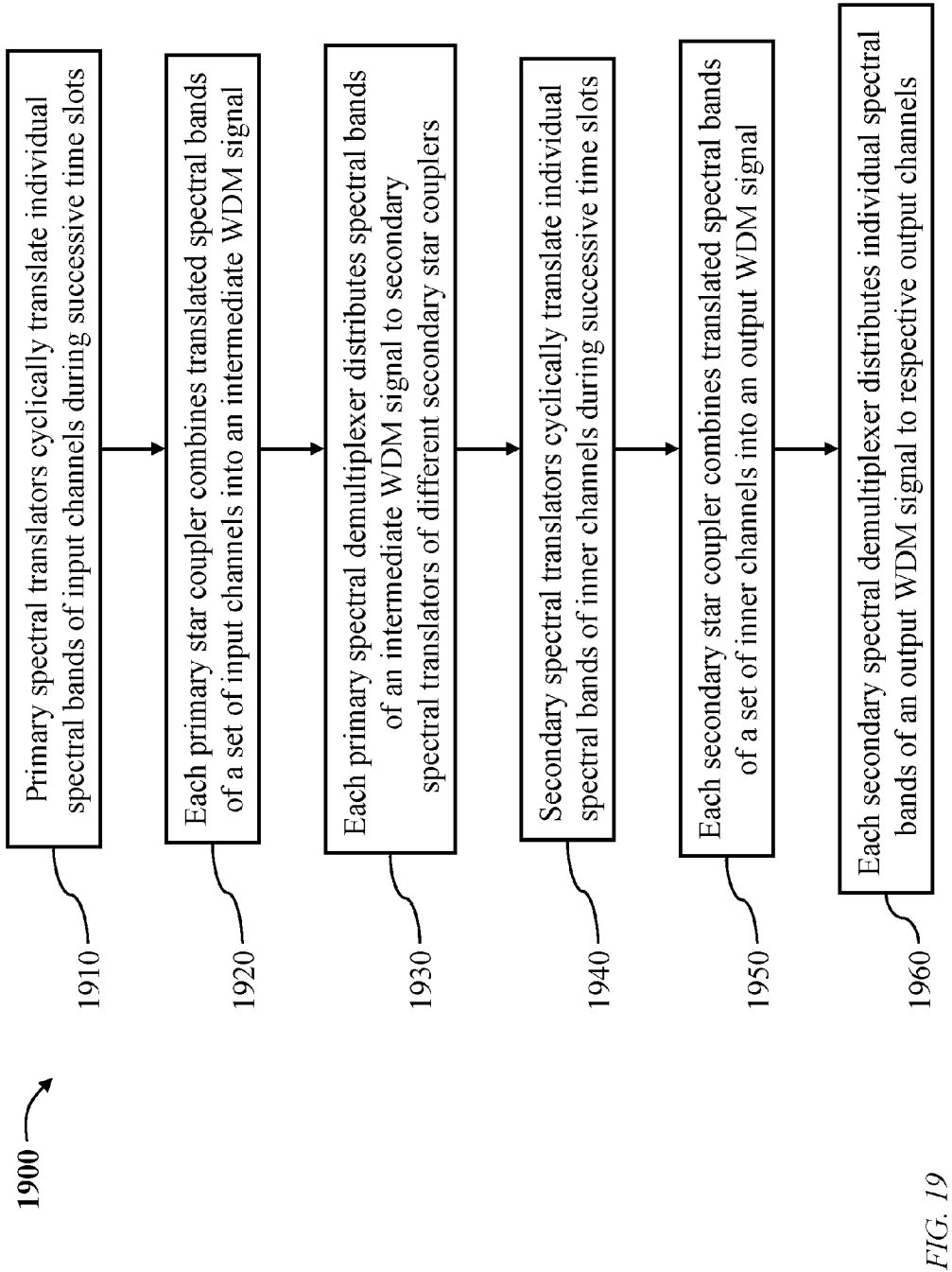
FIG. 19 is a flow chart depicting basic processes implemented by the optical rotator of FIG. 14, in accordance with an embodiment of the present invention.

FIG. 19 is a flow chart outlining basic processes 1900 implemented by the optical rotator of FIG. 13 or FIG. 14. Each secondary spectral demultiplexer has m output channels 1380 of predefined spectral bands. The number, N, of input channels 1310 equal m², and the number of output channels 1380 equals the number of input channels. An input channel 1310 carries N successive segments of optical signals, during a cyclic time frame of N time slots, to be sequentially directed to the N output channels 1380. The successive segments of optical signals occupy a spectral band (colloquially called a "wavelength").

A spectral translator 1320 associated with an input channel 1310 successively shifts a set of optical signal blocks occupying m successive time slots to m predefined spectral bands in order to direct the set of optical signal blocks to secondary spectral translators connecting to m secondary star couplers 1360. Each secondary spectral translator 1350 shifts signals of a set of m signal segments of a signal block received from a respective primary spectral demultiplexer 1340 to direct a signal segment occupying each time slot to a designated output channel 1380. Data segments of an input channels 1310 are directed to the output channels 1380(0) to 1380(N−1) during each primary rotation cycle. The organization of signals received from the N input channels 1310 is illustrated in FIG. 18.

During a time frame of m time slots, each of the primary spectral translators 1320 successively translates a spectral band of a signal of a respective input channel 1310 to each of m spectral bands corresponding to predefined spectral bands of a spectral demultiplexer 1340 (process 1910). Each primary star coupler 1330 combines signals of translated spectral bands of a respective set of primary translators 1320 to be transferred to an input of a primary spectral demultiplexer 1340 (process 1920). Each primary spectral demultiplexer 1340 separates signals of different spectral bands to be transferred over respective channels 1352 to secondary spectral translators 1350 of different secondary star couplers 1360 (process 1930). Each secondary spectral translator shifts a spectral band of a signal of a respective channel 1352 to another spectral band corresponding to an output channel 1380 (process 1940). Each secondary star coupler 1360 combines signals of translated spectral bands of a respective set of secondary translators 1350 to be transferred to an input of a secondary spectral demultiplexer 1370 (process 1950). Each secondary spectral demultiplexer 1370 separates signals of different spectral bands (process 1960) to be transferred over respective output channels 1380 to external network elements, such as nodes 220 (FIG. 2).

Figure 20:
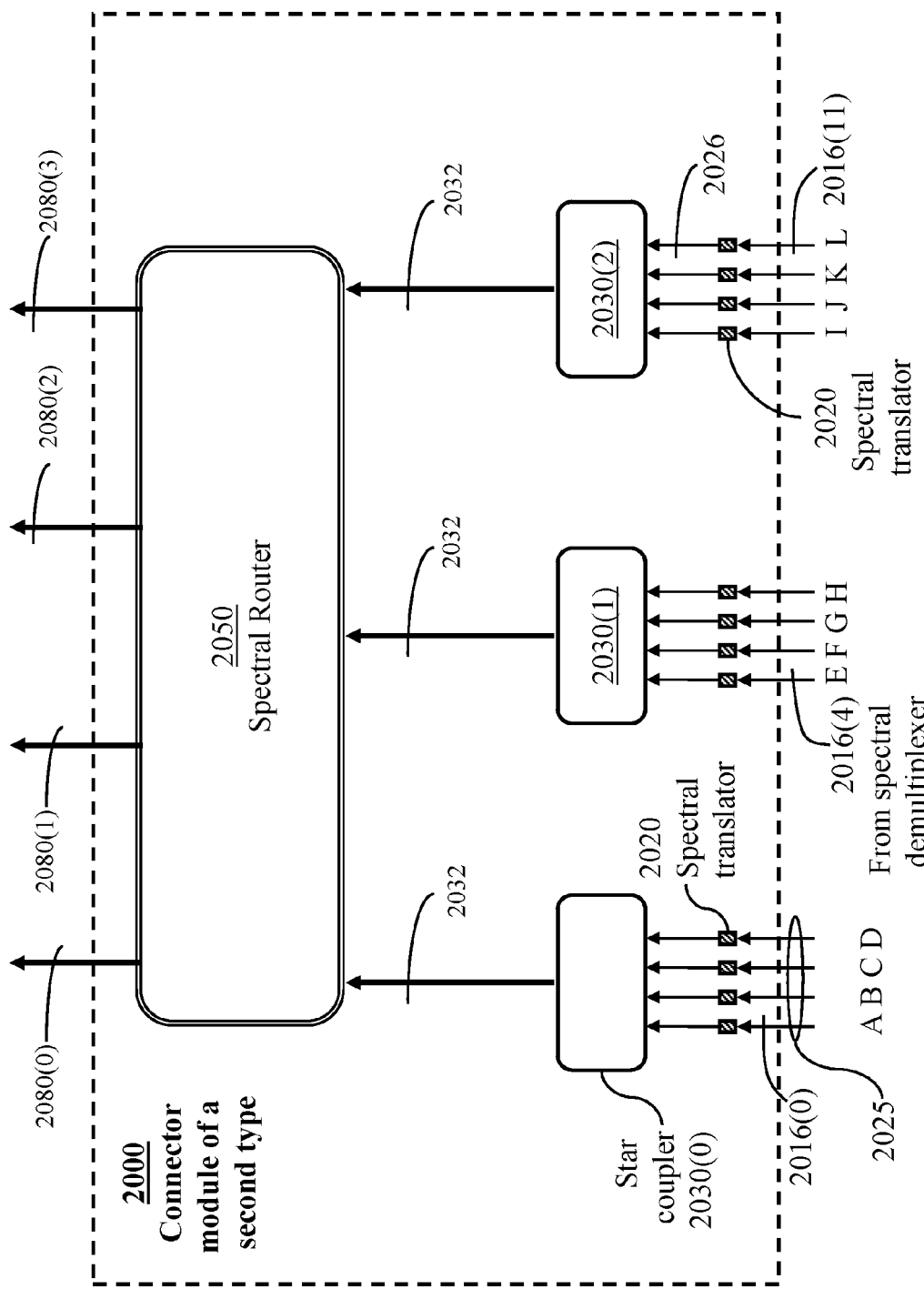
FIG. 20 illustrates an implementation of a connector module of a second type employing star couplers for distributing signals from a plurality of input channels to a plurality of WDM output links where the number of spectral bands per WDM output link does not exceed a number of inlets per star coupler, in accordance with an embodiment of the present invention.

FIG. 20 illustrates an implementation of a first configuration of a connector module 2000 of a second type employing star couplers 2030 and a spectral router 2050 for distributing signals from a plurality of input channels 2016 to a plurality of WDM output links 2080 where the number of spectral bands per WDM output link does not exceed a number of inlets per star coupler.

Each input channel 2016 carries an optical signal occupying a respective spectral band and connects to a respective spectral translator 2020 of a plurality of spectral translators. The input channels 2016 are divided into a number of groups 2025 and the input channels 2016 of each group 2025 are connected to a group of spectral translators 2020 connecting to input ports of a respective star coupler 2030. At any instant of time, the output optical signals of the spectral translators associated with a same star coupler 2030 occupy non-overlapping spectral bands. A star coupler 2030 has an outlet collecting all the output signals of the spectral translators associated with the star coupler. The outlet of each star coupler 2030 connects to a respective WDM link 2032 connecting to an input port of spectral router 2050. A first WDM link 2032 connecting to the output port of the first star coupler 2030(0) carries signals received from input channels 2016(0), 2016(1), 2016(2), and 2013(3). The signals occupy spectral bands $\Omega_0$, $\Omega_1$, $\Omega_2$, and $\Omega_3$, respectively. A second WDM link 2032 connecting to the output port of the second star coupler 2030(1) carries signals received from input channels 2016(4), 2016(5), 2016(6), and 2016(7) occupying spectral bands $\Omega_0$, $\Omega_1$, $\Omega_2$, and $\Omega_3$. A third WDM link 2032 connecting to the output port of the third star coupler 2030(2) carries signals received from input channels 2016(8), 2016(9), 2016(10), and 2016(11) occupying spectral bands $\Omega_0$, $\Omega_1$, $\Omega_2$, and $\Omega_3$.

The spectral router 2050 distributes the signals of each WDM link 2032 to each output link 2080 so that each output link carries an optical signal of each input channel 2016 of each group 2025. Thus, the number of output links 2080 equals the number of input channels per group 2025 of input channels 2016 and the number of signals of different spectral bands carried in each output link 2080 equals the number of groups 2025 of input channels. With m denoting the number of input channels per group 2025 and $\Lambda$ denoting the number of spectral bands per output link 2080, the total number of input channels 2016 is m×$\Lambda$.

Figure 21:
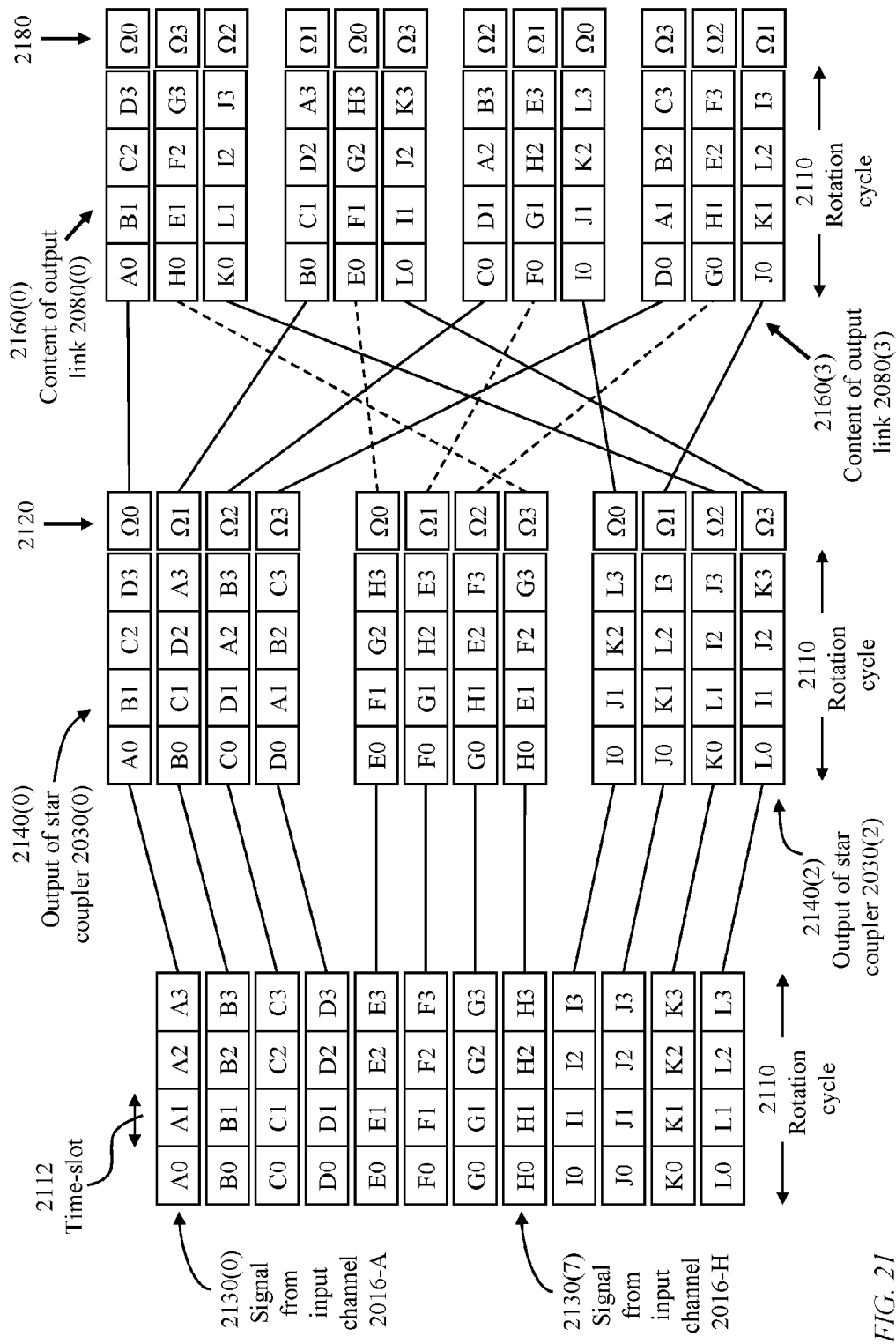
FIG. 21 illustrates temporal interleaving of signal segments of input channels onto different output channels of the WDM output links of the connector module of FIG. 20.

FIG. 21 illustrates temporal interleaving of signal segments of the input channels 2016 onto different output channels of the WDM output links 2080(0), 2080(1), 2080(2), and 2080(3) of the connector module 2000 of FIG. 20. Input channels 2016 are individually identified as 2016-A, 2016-B, ... , 2016-L as indicated in FIG. 20. Each input channel 2016 carries a signal occupying a respective spectral band which is translated at a respective spectral translator 2020 connecting at output to a respective channel 2026. The channels 2026 connecting to a same star coupler 2030 carry signals occupying spectral bands 2120 individually labelled $\Omega_0$ to $\Omega_{(m-1)}$; m=4 in the exemplary connector module 2000. The signal 2130 of each input channel 2016 is organized into cyclic sets of m signal segments where each signal segment is directed to a respective channel of a respective WDM output link 2080. The duration of each signal segment is a predefined time slot 2112 of a rotation cycle 2110.

As illustrated, input channel 2016-carries signal segments identified as A0, A1, A2, and A3 all occupying a same spectral band, input channel 2016-B carries signal segments identified as B0, B1, B2, and B3 all occupying a same spectral band, and so on, with input channel 2016-L carrying signal segments identified as L0, L1, L2, and L3 all occupying a same spectral band. The output channel 2026 of a spectral translator 2020 carries signal segments occupying m different spectral bands during a rotation cycle. Thus, the WDM output link 2032 of a star coupler 2030 carries m signals 2140 of m different spectral bands with the signal of each spectral band structured in m signal segments of different input channels 2016 of the star coupler.

The spectral router 2050 directs signals collected at output of a star coupler to m different output links 2080. Thus, each WDM output link 2080 has $\Lambda$ channels carrying signals occupying respective spectral bands 2180, each channel carrying m signal segments of m input channels; $\Lambda$=3 and m=4 in the exemplary connector module of FIG. 20. The contents, 2160(0), 2160(1), 2160(2), and 2160(3), of WDM links 2080 are indicated in FIG. 21. As illustrated, each WDM output link carries a signal segment from each of input channels 2016-A to 2016-L. For example, a first WDM output link 2080 carries signal segments A0, B1, C2, D3, H0, E1, F2, G3, K0, L1, I2, and J3 where signal segments {A0, B1, C2, D3} occupy a spectral band $\Omega$0, signal segments {H0, E1, F2, G3} occupy a spectral band $\Omega$3, and signal segments {K0, L1, I2, J3} occupy a spectral band $\Omega$2.

Figure 22:
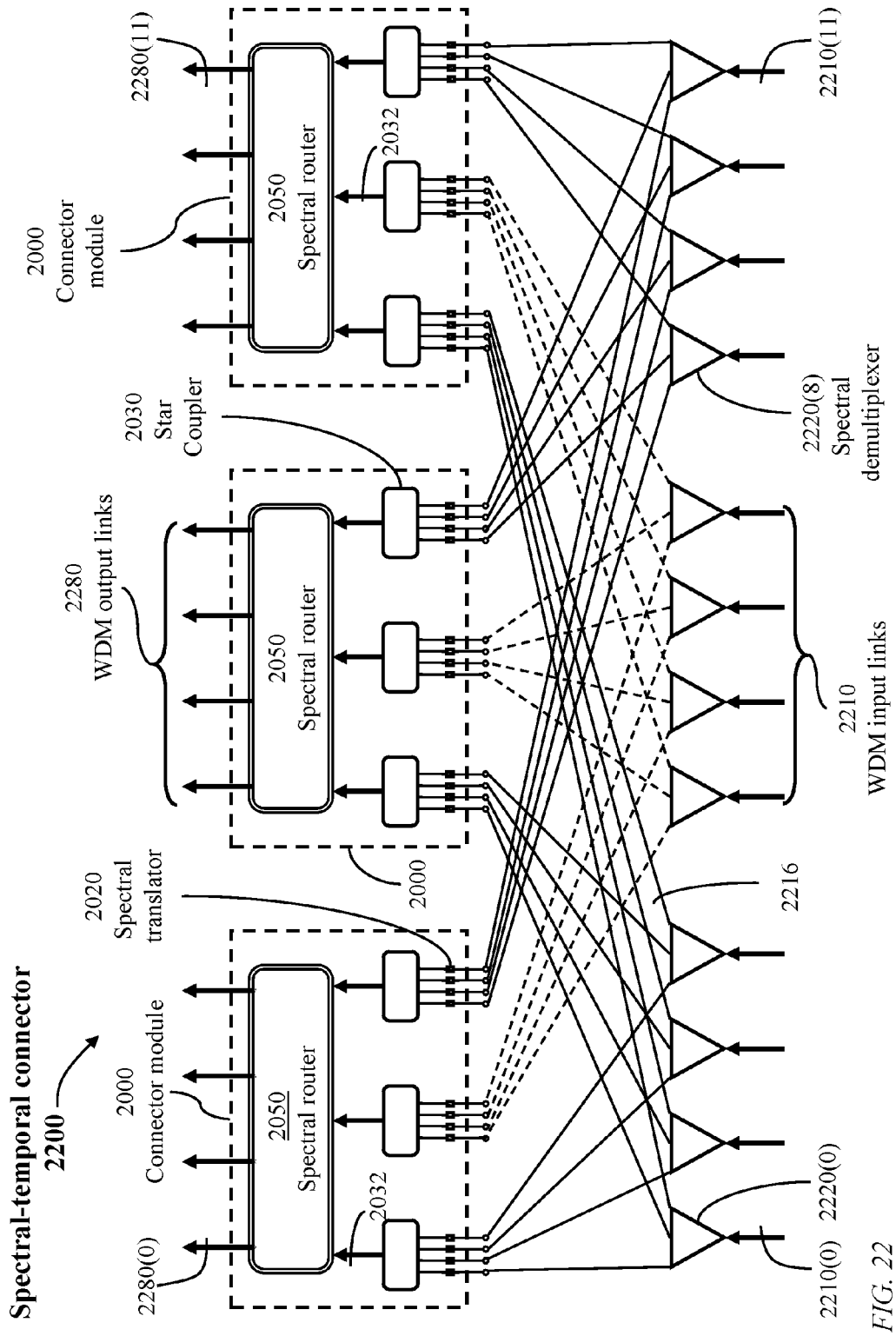
FIG. 22 illustrates a spectral-temporal connector similar to that of FIG. 3, using connector modules of the second type of FIG. 20, connecting a set of WDM input links to a set of WDM output links, in accordance with an embodiment of the present invention.

FIG. 22 illustrates a spectral-temporal connector 2200 similar to the spectral-temporal connector 300 using connector module 2000 of FIG. 20. Spectral-temporal connector 2200 has m×$\Lambda$ WDM input links 2210 and m×$\Lambda$ WDM output links 2280. Each WDM input link connects to a respective spectral demultiplexer 2220. Output channels 2216 of each spectral demultiplexer 2220 connect to star couplers 2030 of different connector modules. Each WDM output link 2280 carries signals from each WDM input link 2210.

The $\Lambda$ channels (spectral bands) of an input link 2210 are routed to star couplers 2030 of different connector modules 2000. Each star coupler 2030 has m inlets for receiving signals from input channels 2216 and at least one inlet for receiving timing data. In one implementation, the $\Lambda$ channels of an input link 2210 of index j, 0≤j<N, connect to $\Lambda$ star couplers of indices:

$(\lfloor j/m \rfloor + Q \times \Lambda)$, $0 \leq Q < \Lambda$.

The input links 2210 are indexed sequentially between 0 and (N−1), 1<N<(m×$\Lambda$) and the star couplers are indexed sequentially between 0 and ($\Lambda^2$−1), where $\lfloor x \rfloor$ denotes an integer part of a number (generally a real number) x.

Figure 23:
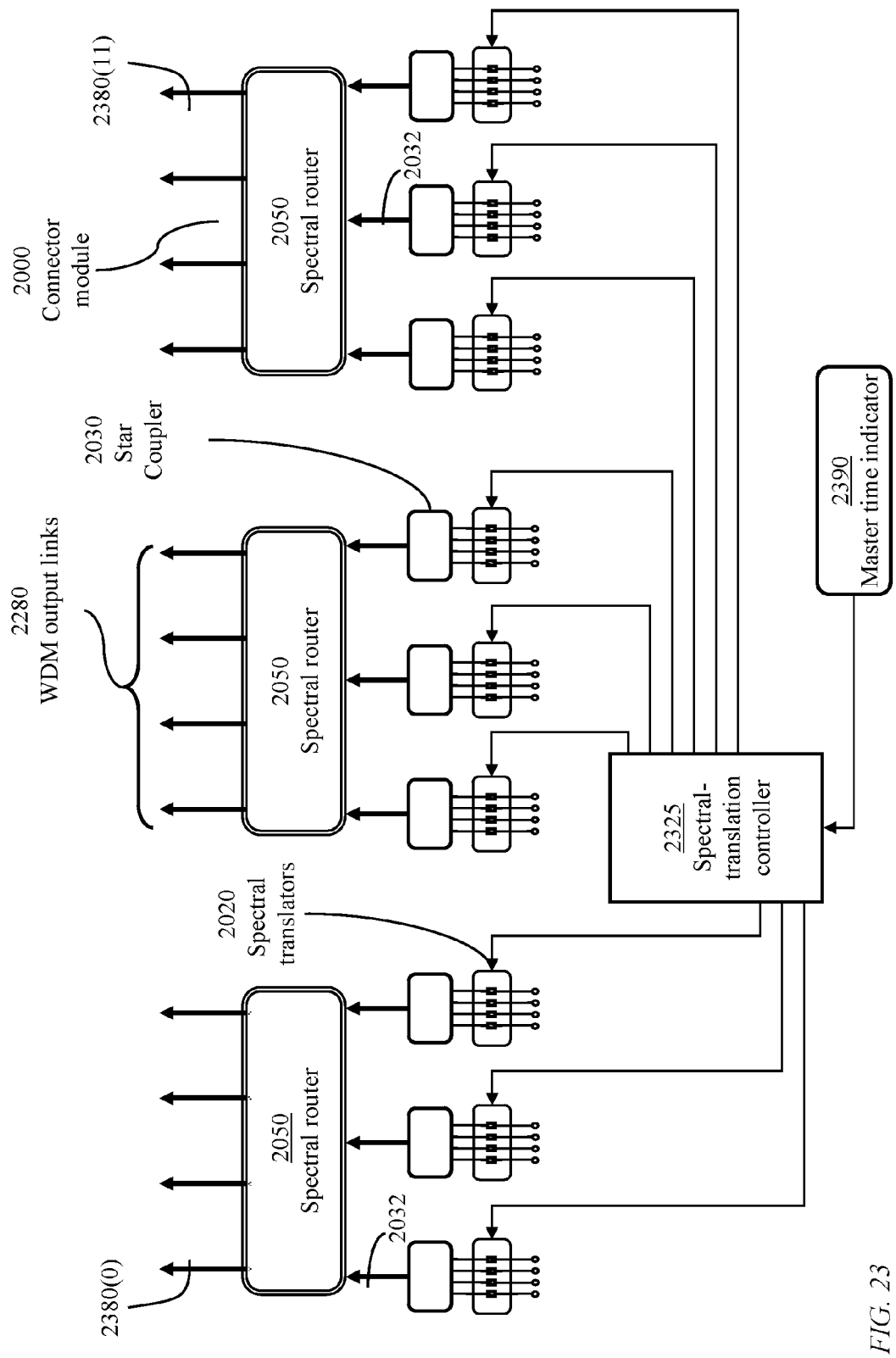
FIG. 23 illustrates a spectral-translation controller coupled to star couplers of the spectral-temporal connector of FIG. 22.

FIG. 23 illustrates a spectral-translation controller 2325 coupled to a master time indicator 2390 and star couplers 2030 of the spectral-temporal connector of FIG. 22. The spectral-translation controller 2325 is configured to prompt each spectral translator 2020 to shift a spectral band of a signal received from a respective input link 2210. Alternatively, each connector module may include a respective spectral-translation module with all spectral-translation modules coupled to the master time indicator 2390.

Figure 24:
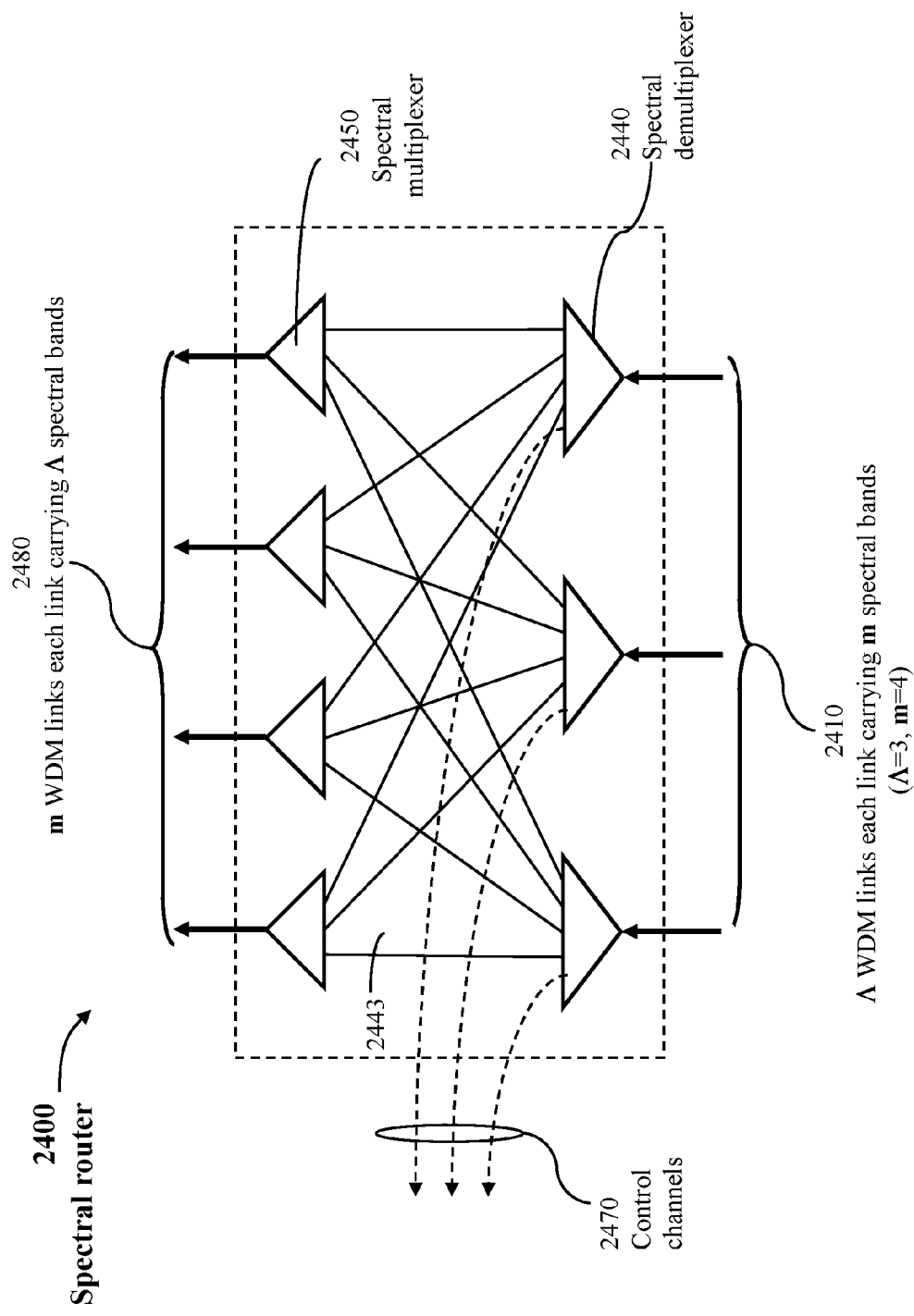
FIG. 24 illustrates a spectral router directing spectral bands carried by input links to output links and inner control channels, each input link carrying signals occupying multiple spectral bands, each output link carrying signals occupying multiple spectral bands, and each inner control channel carrying control signals occupying a spectral band of a respective input link, in accordance with an embodiment of the present invention.

FIG. 24 illustrates a spectral router 2400 connecting $\Lambda$ WDM input links 2410. Each WDM input link 2410 carries (m+1) signals occupying different spectral bands to be routed to m WDM output links 2480 each carrying $\Lambda$ signals of different spectral bands and one inner control channel 2470, $\Lambda$>1, m<2. The spectral router separates spectral bands carrying control signals to be directed through respective inner control channels 2470 to components of a spectral-temporal connector 2200. Each control channel 2470 corresponds to one input link 2410. Each output link 2480 includes a spectral band from each input link 2410.

Spectral router 2400 may be used as spectral router 2050 of connector module 2000 with WDM links 2032 from the star couplers 2030 being the WDM input links 2410 of the spectral router 2400. Spectral router 2400 has $\Lambda$ spectral demultiplexers 2440 and m spectral multiplexers 2450. Each spectral demultiplexer 2440 separates m signals carried by a respective WDM input links 2410 to be transferred to input ports of m spectral multiplexers 2450 through channels 2443. Each spectral multiplexer 2250 combines signals of $\Lambda$ different spectral bands to be transferred to a respective external network element through a respective WDM link 2480.

Thus, the present invention provides a spectral-temporal connector 2200 comprising a plurality of star couplers 2030, a plurality of spectral translators 2020, a plurality of spectral routers 2050, and a plurality of input spectral demultiplexers 2220. The star couplers 2030 are arranged into sets of star couplers and each set of star couplers is coupled to a respective spectral router 2050 to form a connector module 2000. Each star coupler has a respective number of inlets and one outlet and each inlet connects to a respective spectral translator 2020.

Each input spectral demultiplexer 2220 directs individual constituent signals of different spectral bands of a respective input link 2210 of a plurality of input links to spectral translators 2020 of different sets of star couplers 2030. Each spectral translator 2020 is configured to cyclically shift a spectral band of a signal received from a respective input spectral demultiplexer 2220 so that, at any instant of time, spectral bands of signals at inlets of any star coupler 2030 are non-overlapping. Each spectral router 2050 distributes spectral bands at outlets of a respective set of star couplers to a respective set of output links 2280. A spectral-translation controller coupled to a master time indicator is configured to prompt each spectral translator to cyclically shift a spectral band of a received signal from a channel 2216.

Figure 25:
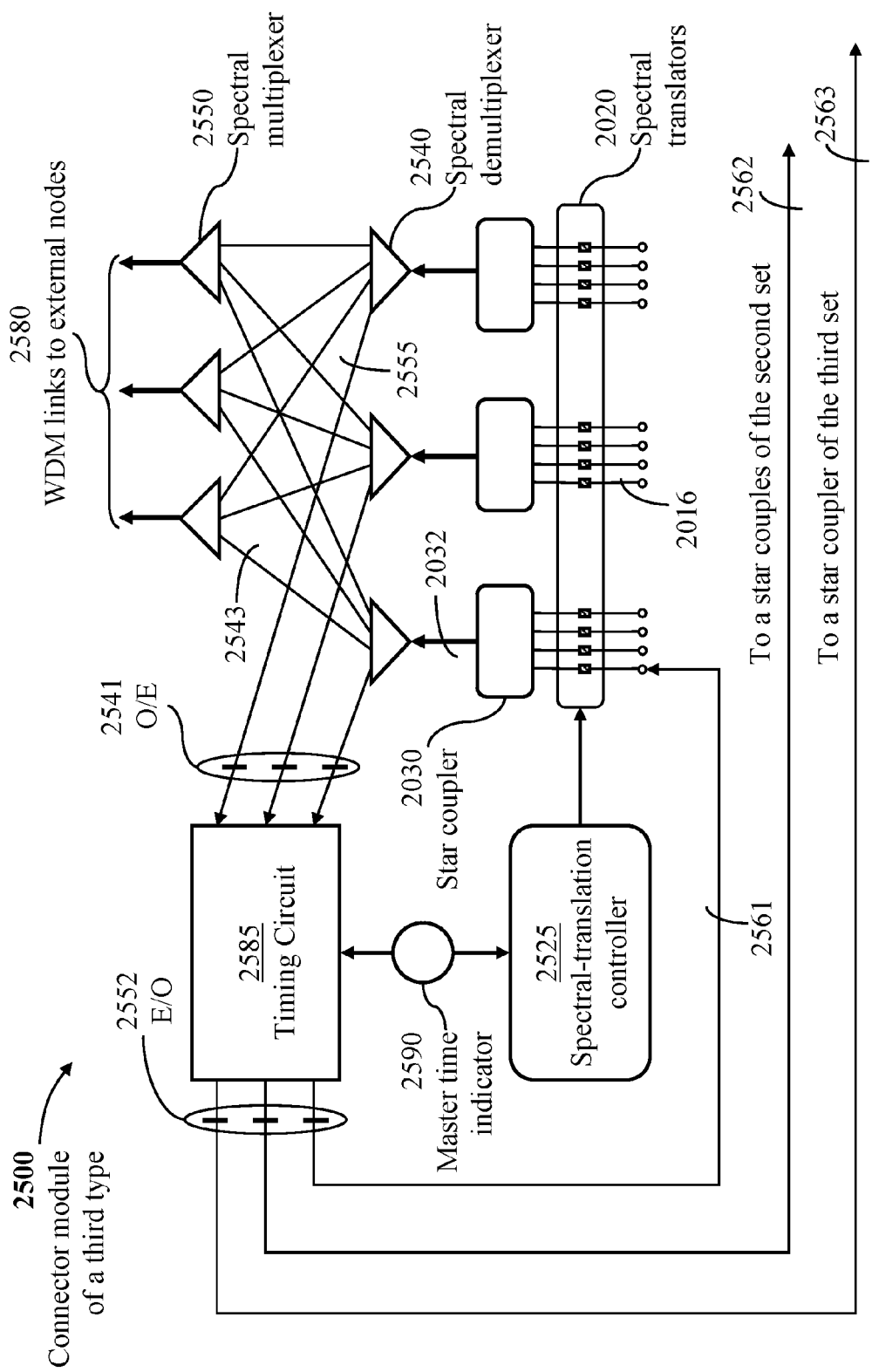
FIG. 25 illustrates a connector module of a third type using timing circuitry connecting to output channels of different spectral demultiplexers and input channels of different connector modules of a spectral-temporal connector, in accordance with an embodiment of the present invention.

FIG. 25 illustrates a connector module 2500 of a third type coupled to a timing circuit 2585 which connects to output channels of different inner spectral demultiplexers 2540 and input channels of different connector modules of a spectral-temporal connector.

Figure 26:
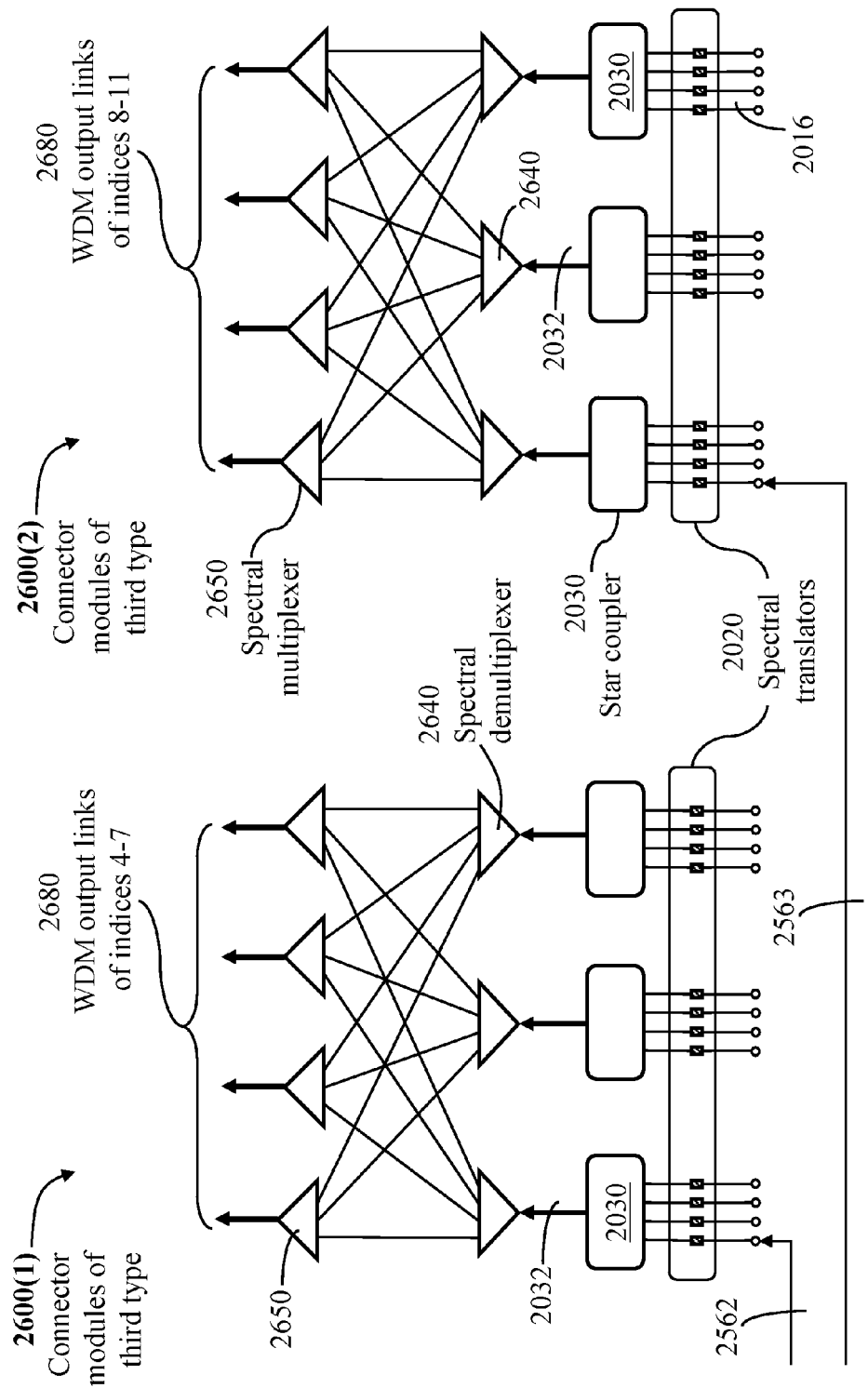
FIG. 26 illustrates connectivity of the timing circuit of FIG. 25 to input channels of connector modules.

A master time indicator 2590 provides time reference for both the timing circuit 2585 and a spectral-translation controller 2525. Optical-to-electrical (O/E) converters 2541 convert optical signals carried on channel 2555 from spectral demultiplexers 2540 to electrical signals. The optical signals include time-multiplexed indications of sending times from external nodes 220 (FIG. 2) connecting to input channels 2016. The sending-time indications are compared in timing circuit 2585 with corresponding time instants of the master time indicator 2590 and discrepancies are reported to respective sending nodes. Electrical-to-optical (E/O) converters 2552 convert electronic signals indicating timing discrepancies to be transferred through channels 2561, 2562, and 2563 to spectral translators of different connector modules. Channel 2561 connects to a spectral translator 2020 of connector module 2500. Channel 2562 connects to a spectral translator 2020 of a second connector module 2600(1). Channel 2563 connects to a spectral translator 2020 of a third connector module 2600(2), as indicated in FIG. 25 and FIG. 26. Channels 2543 from each inner spectral demultiplexer 2540 connect to different spectral multiplexers 2550. Each spectral multiplexer 2550 combines spectral bands from different spectral demultiplexers 2540 onto a respective WDM output link 2580. FIG. 26 illustrates connectivity of the timing circuit 2585 of FIG. 25 to input channels of connector modules 2600(1) and 2600(2).

The time-alignment system of FIG. 25 and FIG. 26 is suitable where the differences between propagation delays of signals occupying different spectral bands within a WDM link from any external node to a spectral-temporal connector are relatively insignificant. Input channels 2016 are arranged into groups where each group of input channels connects to respective star coupler 2030 through spectral translators 2020. Each of WDM links 2032 carries combined signals occupying separate spectral bands at output of a respective star coupler 2030 to a respective spectral demultiplexer 2640 which separates signals occupying different spectral bands and directs each signal to an input of one of spectral multiplexers 2650. The output of each spectral multiplexer 2650 is sent to a respective node 220 through one of WDM links 2680.

Figure 27:
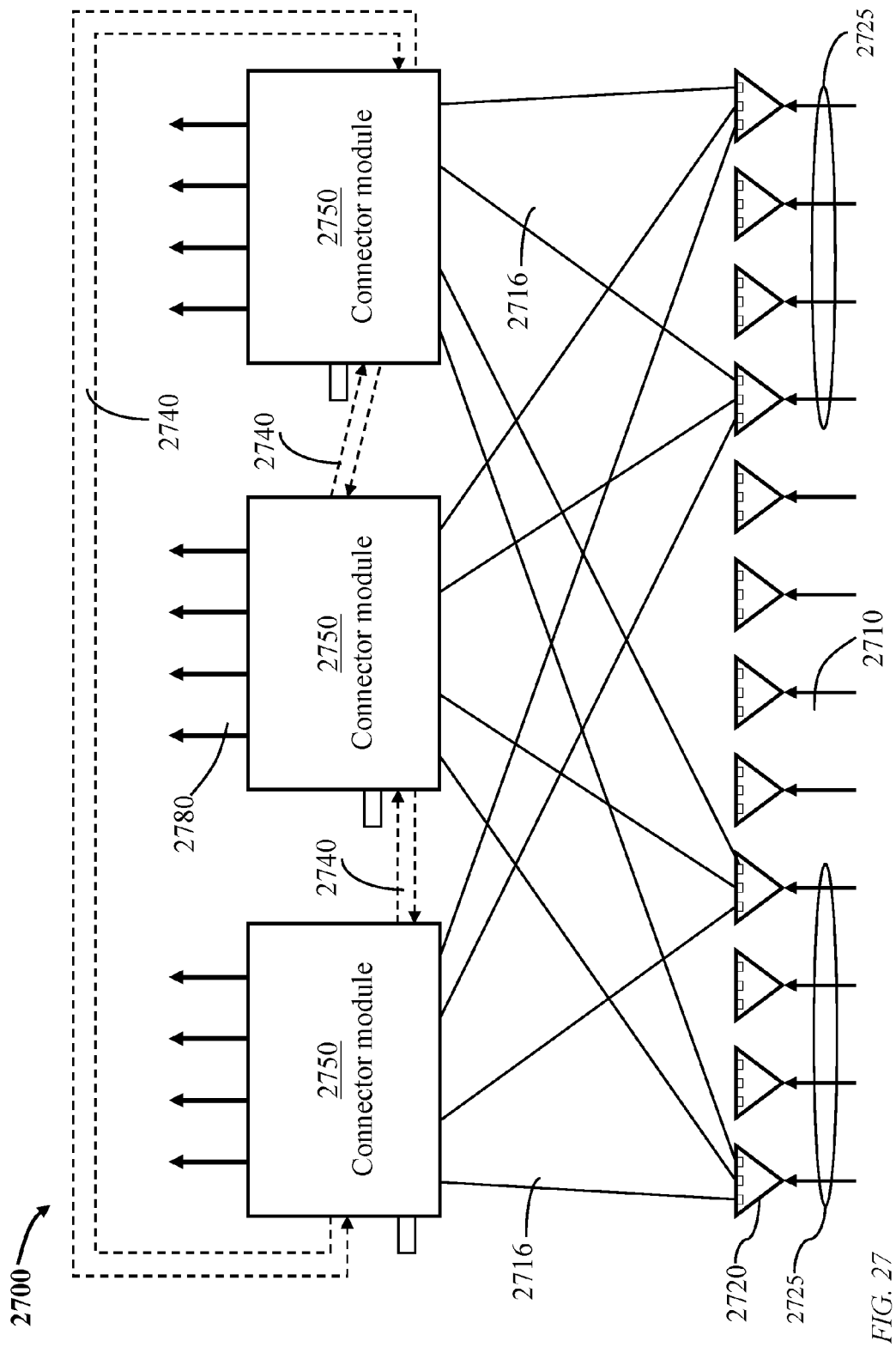
FIG. 27 illustrates a spectral-temporal connector employing connector modules exchanging timing data through control channels, in accordance with an embodiment of the present invention.
Figure 33:
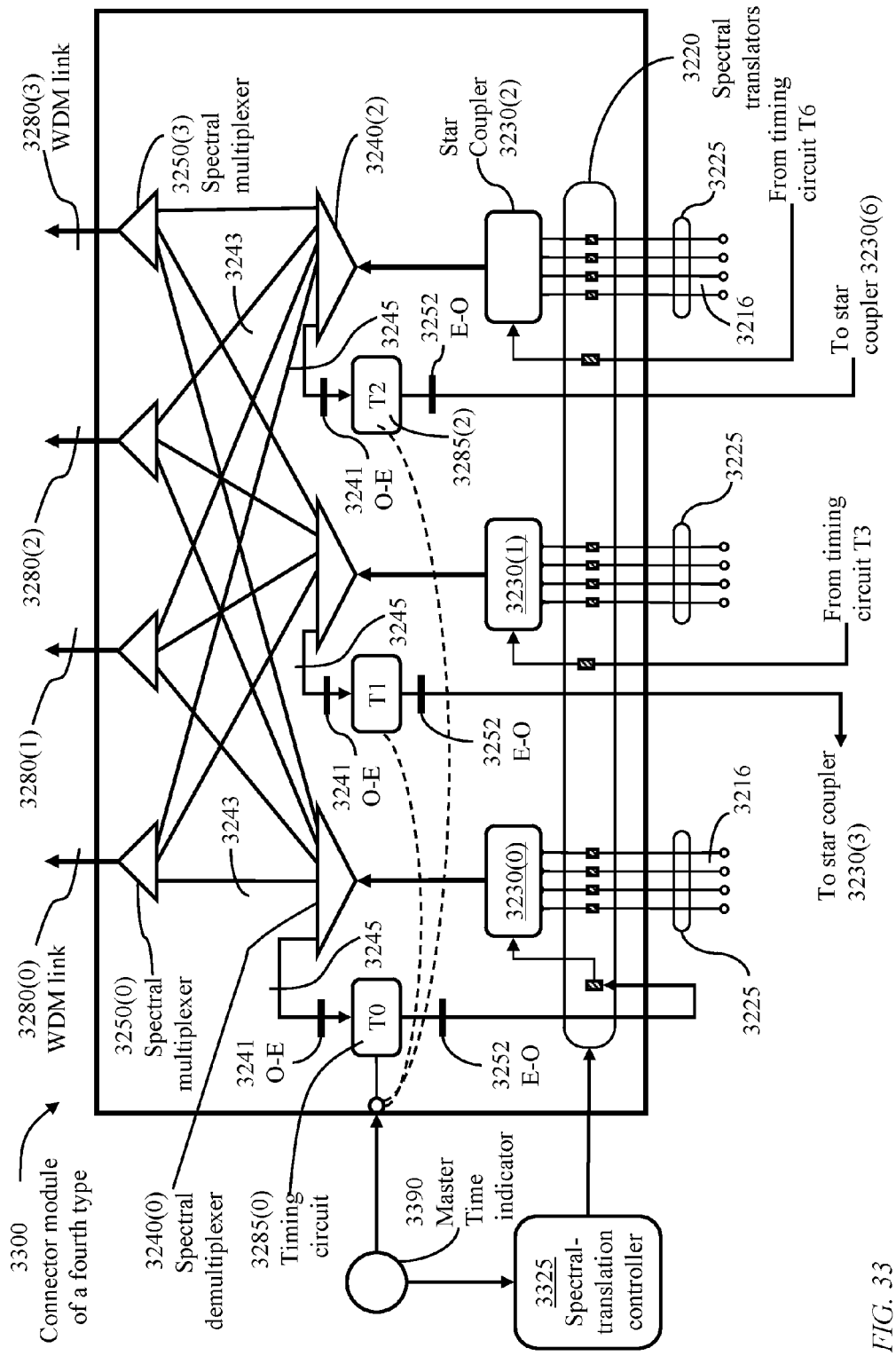
FIG. 33, FIG. 34, and FIG. 35 illustrate connector modules of a fourth type, in accordance with an embodiment of the present invention.
Figure 34:
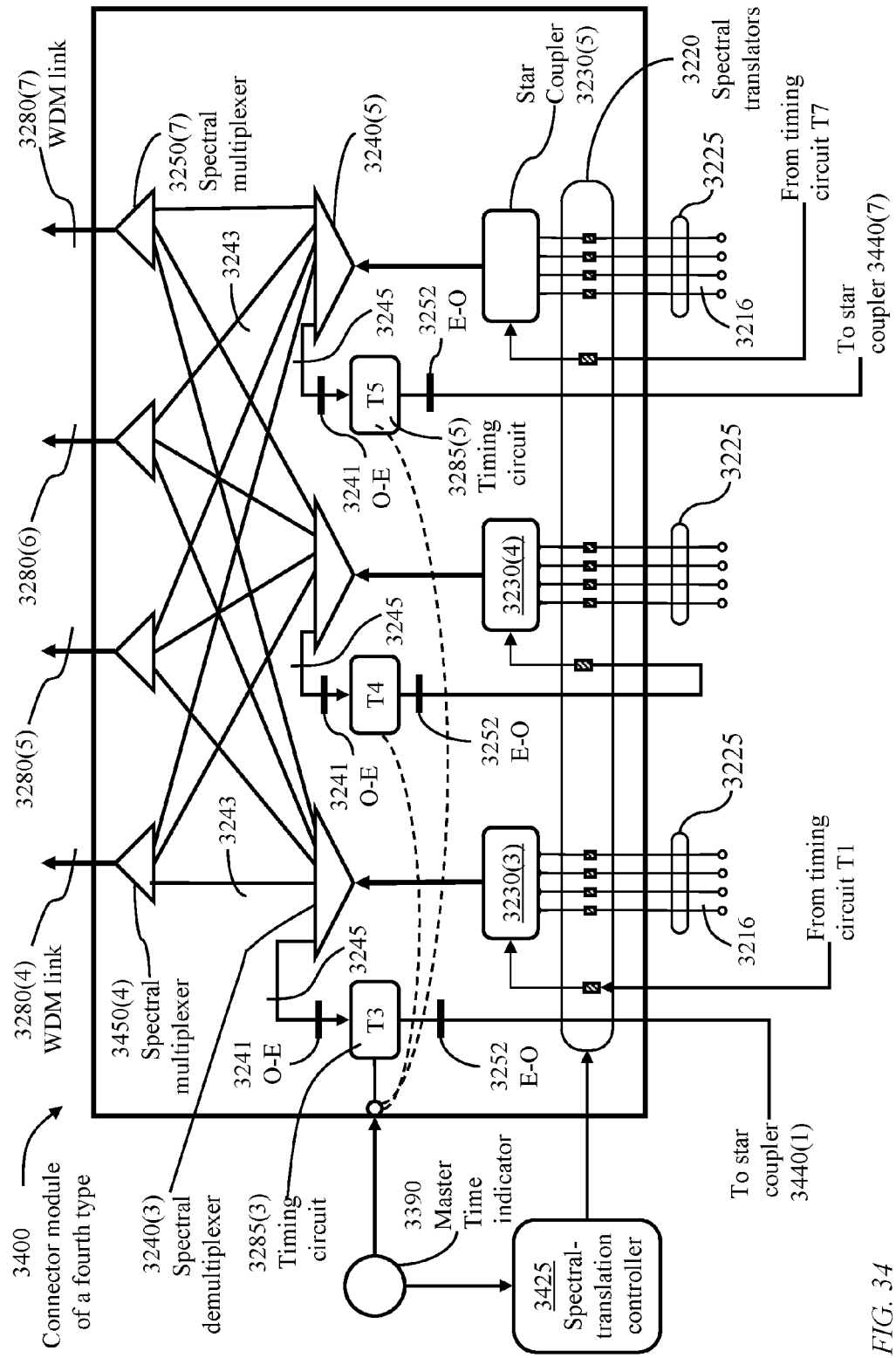
Figure 35:
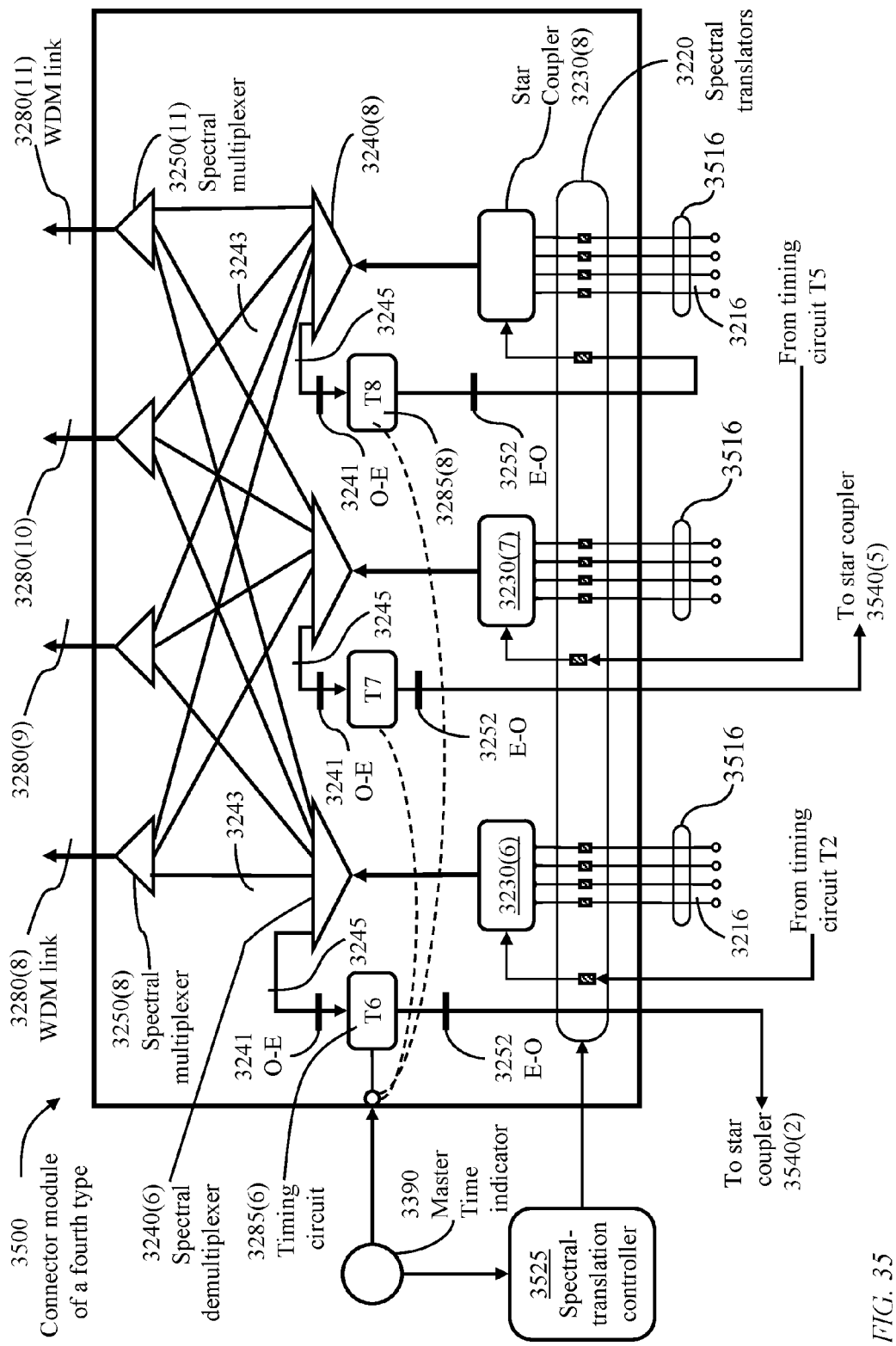

FIG. 27 illustrates a spectral-temporal connector 2700 connecting WDM input links 2710 to WDM output links 2780 through connector modules 2750. The WDM input links are arranged into groups 2725. The connector modules 2750 exchange timing data through control channels 2740. Each connector module has m WDM output ports 2780, m>2. Each WDM input link 2710 carries $\Lambda$ signals occupying different channel bands, $\Lambda>1$, and connects to a respective spectral demultiplexer 2720. Each spectral demultiplexer 2720 has $\Lambda$ channels 2716 to different connector modules 2750. Each output link 2780 carries signals occupying $\Lambda$ channel bands, each signal being organized into a number of signal segments. Thus, each WDM output link carries a signal segment from each WDM input link 2710. FIG. 33, FIG. 34, and FIG. 35 illustrate exemplary implementations of connector modules 2750 forming spectral-temporal connector 2700.

Figure 28:
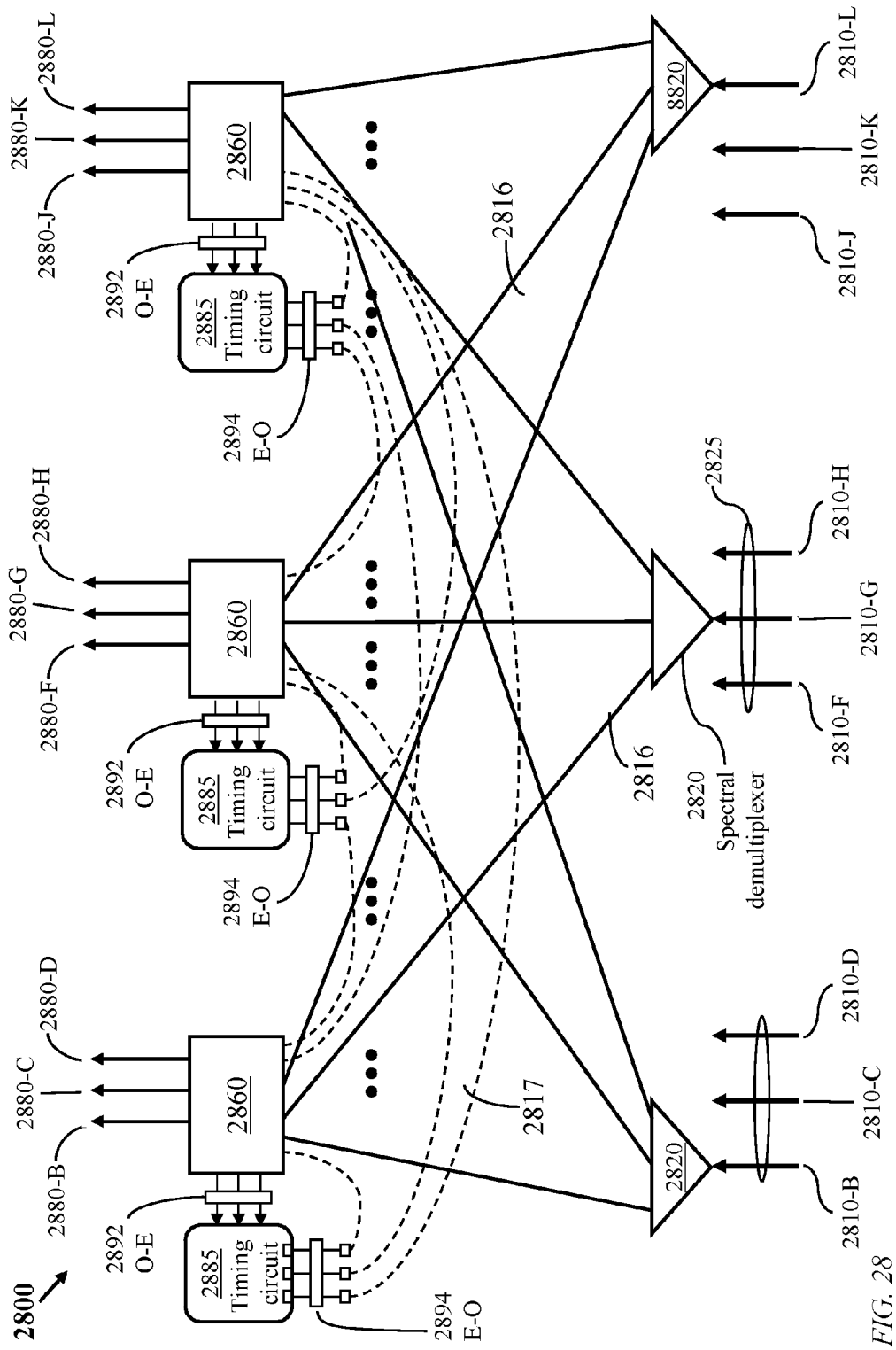
FIG. 28 illustrates an implementation of the spectral-temporal connector of FIG. 27, in accordance with an embodiment of the present invention.

FIG. 28 illustrates a spectral-temporal connector 2800 adapted from the spectral-temporal connectors 2200 and 2700. In spectral-temporal connector 2200, each connector module 2000 employs star couplers of m inlets each. Each group of input links 2210 has m input links and each connector module 2000 has m WDM output links 2280 (m=4 in the exemplary spectral-temporal connector of FIG. 22). In spectral-temporal connector 2800, each connector module 2860 also uses star couplers of m inlets each. Each group 2825 of input links 2810 has (m−1) WDM input links and each connector module 2860 has (m−1) WDM output links 2880. Thus, spectral-temporal connector 2800 connects (m−1)×$\Lambda$ WDM input links to (m−1)×$\Lambda$ WDM output links. Each connector module 2860 has $\Lambda$ channels to $\Lambda$ optical-electrical converters 2892 connecting to a respective timing circuit 2885. Each timing circuit 2885 is coupled to $\Lambda$ electrical-optical converters 2894 connecting to $\Lambda$ connector modules 2860 through channels 2817.

The WDM input links 2810 are divided into $\Lambda$ groups 2825. The WDM input links 2810 of a first group are individually identified as 2810-B, 2810-C, and 2810-D. The WDM input links 2810 of a second group are individually identified as 2810-F, 2810-G, and 2810-H. The WDM input links 2810 of a third group are individually identified as 2810-J, 2810-K, and 2810-L. Each input link 2810 connects to a respective spectral demultiplexer 2820. Each spectral demultiplexer 2820 has a channel 2816 to each connector module 2860.

Figure 29:
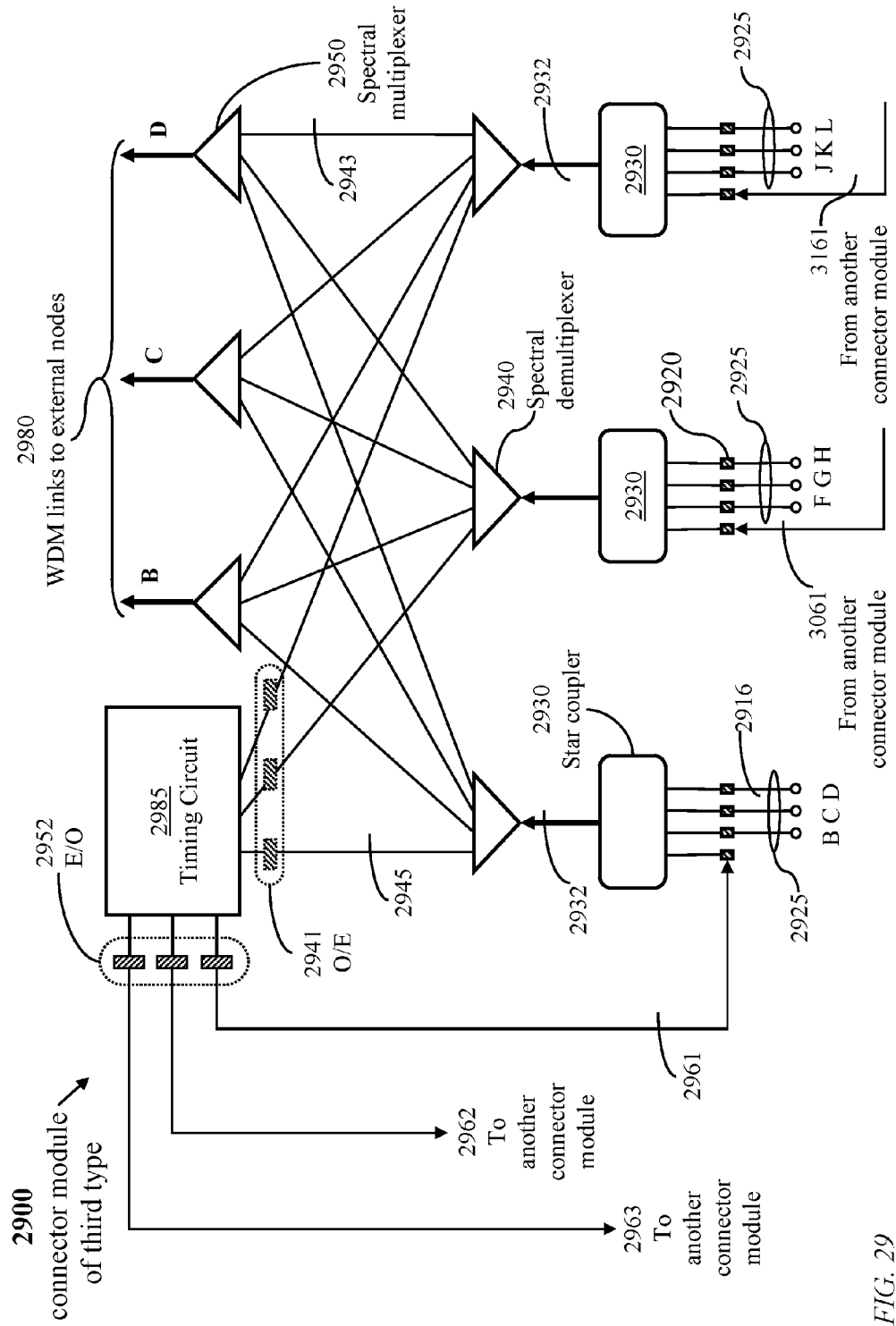
FIG. 29 illustrates an implementation of a connector module of the third type adapted to receive timing data from other connector modules, in accordance with an embodiment of the present invention.

FIG. 29 illustrates a connector module 2900 of the third type. Each input channel 2916 of a connector module 2900 belongs to a respective WDM input link 2810. Thus, the input channels 2916 are divided into a number of groups 2925 and the input channels 2916 of each group are connected to a group of spectral translators 2920. The input channels 2916 of a first group are individually identified as 2916-B, 2916-C, and 2916-D. The input channels 2916 of a second group are individually identified as 2916-F, 2916-G, and 2916-H. The input channels 2916 of a third group are individually identified as 2916-J, 2916-K, and 2916-L.

Channels 2961, 2962, and 2963 carry timing data from a timing circuit 2985 through electrical-optical converters 2952 to spectral translators preceding inputs of star couplers of different connector modules. Thus, each star coupler 2930 receives optical signals from a group 2925 of input channels 2916 and a control channel from a timing circuit of one of the connector modules. At any instant of time, the output optical signals of the spectral translators 2920 associated with a same star coupler 2930 occupy non-overlapping spectral bands. A star coupler 2930 has an outlet receiving all the output signal of the spectral translators associated with the star coupler. A first WDM link 2932 carries signals received from control channel 2961 and input channels 2916-B, 2916-C, and 2916-D. A second WDM link 2932 carries signals received from a control channel 3061 originating from timing circuit 3085 of FIG. 30 and from input channels 2916-F, 2916-G, and 2916-H. A third WDM link 2932 carries signals received from a control channel 3161 originating from timing circuit 3185 of FIG. 31 and from input channels 2916-J, 2916-K, and 2916-L. Each WDM link 2932 has one channel carrying timing signals and (m−1) channels carrying payload signals from respective input channels 2916. Each WDM link 2932 connects to a respective inner spectral demultiplexer 2940 which separates channels of the WDM link. Each inner spectral demultiplexer 2940 has a channel 2945 carrying control data to an optical-electrical converter 2941 coupled to timing circuit 2985 and (m−1) channels 2943 each connecting to a respective spectral multiplexer 2950 and carrying payload signals. Each spectral multiplexer 2950 connects to a respective WDM output link 2980.

Figure 30:
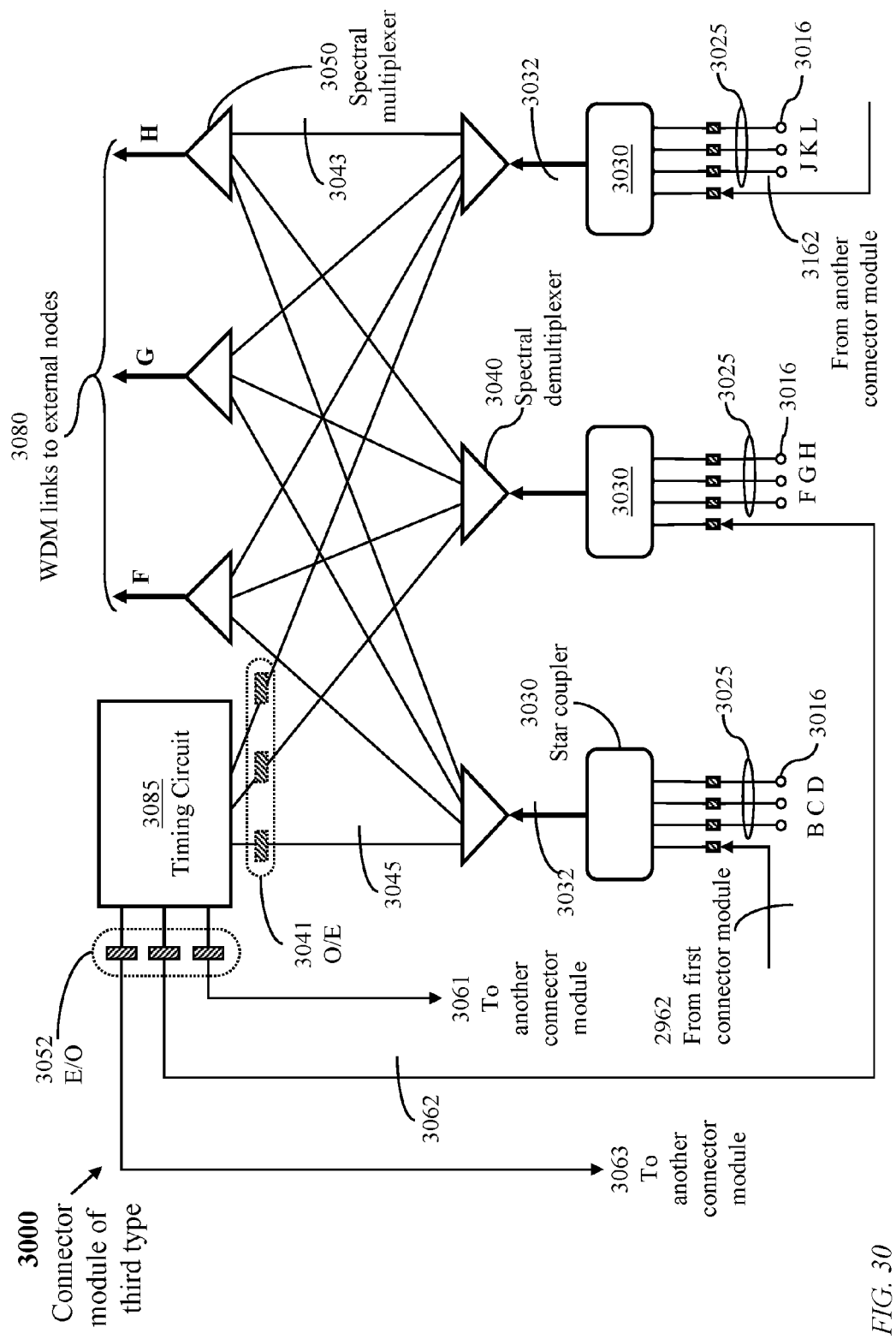
FIG. 30 illustrates the connector module of FIG. 29 with connectivity adapted for use as a second connector module of a spectral-temporal connector.

FIG. 30 illustrates a connector module 3000 of the third type with connectivity adapted for use as a second connector module of spectral-temporal connector 2800. Each input channel 3016 of connector module 3000 belongs to a respective WDM input link 2810. Thus, the input channels 3016 are divided into a number of groups 3025 and the input channels 3016 of each group are connected to a group of spectral translators 3020. The input channels 3016 of a first group are individually identified as 3016-B, 3016-C, and 3016-D. The input channels 3016 of a second group are individually identified as 3016-F, 3016-G, and 3016-H. The input channels 3016 of a third group are individually identified as 3016-J, 3016-K, and 3016-L.

Control channels 3061, 3062, and 3063 carry timing data from a timing circuit 3085 through electrical-optical converters 3052 to spectral translators preceding inputs of star couplers of different connector modules. Thus, each star coupler 3030 receives optical signals from a group 3025 of input channels 3016 and a control channel from a timing circuit of one of the connector modules.

At any instant of time, the output optical signals of the spectral translators 3020 associated with a same star coupler 3030 occupy non-overlapping spectral bands. A star coupler 3030 has an outlet collecting all the output signal of the spectral translators associated with the star coupler. A first WDM link 3032 carries signals received from control channel 2962 from timing circuit 2985 of FIG. 29 and input channels 3016-B, 3016-C, and 3016-D. A second WDM link 3032 carries signals received from control channel 3062 originating from timing circuit 3085 and from input channels 3016-F, 3016-G, and 3016-H. A third WDM link 3032 carries signals received from a control channel 3162 originating from timing circuit 3185 of FIG. 31 and from input channels 3016-J, 3016-K, and 3016-L. Each WDM link 3032 has one channel carrying timing signals and (m−1) channels carrying payload signals from respective input channels 3016. Each WDM link 3032 connects to a respective spectral demultiplexer 3040 which separates channels of the WDM links. Each spectral demultiplexer 3040 has a channel 3045 carrying control data to an optical-electrical converter 3041 coupled to timing circuit 3085 and (m−1) channels 3043 each connecting to a respective spectral multiplexer 3050 and carrying payload signals. Each spectral multiplexer 3050 connects to a respective WDM output link 3080.

Figure 31:
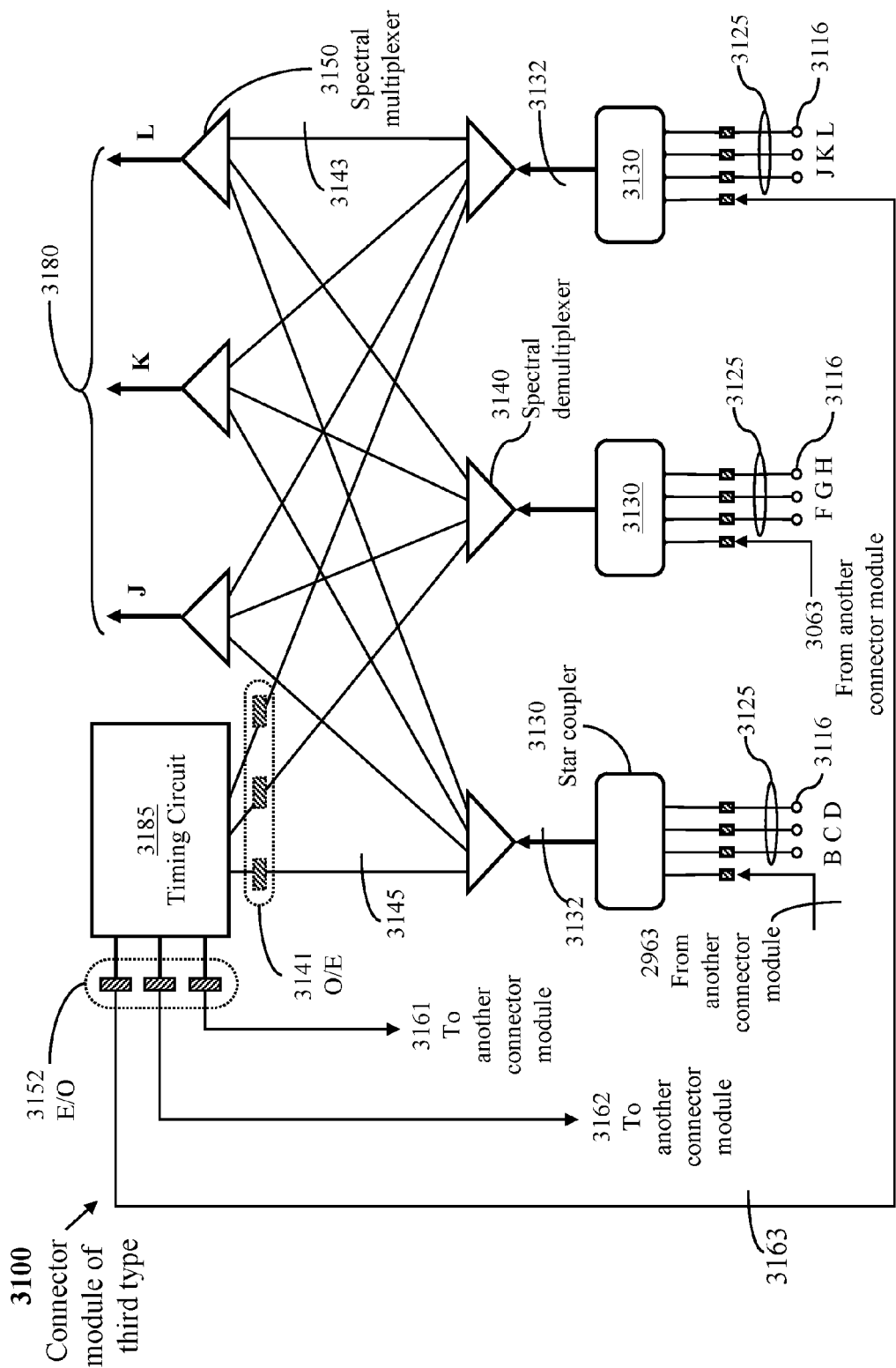
FIG. 31 illustrates the connector module of FIG. 29 with connectivity adapted for use as a third connector module of a spectral-temporal connector.

FIG. 31 illustrates a connector module 3100 of the third type with connectivity adapted for use as a third connector module of spectral-temporal connector 2800. Each input channel 3116 of connector module 3100 belongs to a respective WDM input link 2810. Thus, the input channels 3116 are divided into a number of groups 3125 and the input channels 3116 of each group are connected to a group of spectral translators 3120. The input channels 3116 of a first group are individually identified as 3116-B, 3116-C, and 3116-D. The input channels 3116 of a second group are individually identified as 3116-F, 3116-G, and 3116-H. The input channels 3116 of a third group are individually identified as 3116-J, 3116-K, and 3116-L.

Control channels 3161, 3162, and 3163 carry timing data from a timing circuit 3185 through electrical-optical converters 3152 to spectral translators preceding inputs of star couplers of different connector modules. Thus, each star coupler 3130 receives optical signals from a group 3125 of input channels 3116 and a control channel from a timing circuit of one of the connector modules.

At any instant of time, the output optical signals of the spectral translators 3120 associated with a same star coupler 3130 occupy non-overlapping spectral bands. A star coupler 3130 has an outlet collecting all the output signal of the spectral translators associated with the star coupler. A first WDM link 3132 carries signals received from control channel 2963 from timing circuit 2985 of FIG. 29 and input channels 3116-B, 3116-C, and 3116-D. A second WDM link 3132 carries signals received from control channel 3063 originating from timing circuit 3085 and from input channels 3116-F, 3116-G, and 3116-H. A third WDM link 3132 carries signals received from a control channel 3163 originating from timing circuit 3185 of FIG. 31 and from input channels 3116-J, 3116-K, and 3116-L. Each WDM link 3132 has one channel carrying timing signals and (m−1) channels carrying payload signals from respective input channels 3116. Each WDM link 3132 connects to a respective spectral demultiplexer 3140 which separates channels of the WDM links. Each spectral demultiplexer 3140 has a channel 3145 carrying control data to an optical-electrical converter 3141 coupled to timing circuit 3185 and (m−1) channels 3143 each connecting to a respective spectral multiplexer 3150 and carrying payload signals. Each spectral multiplexer 3150 connects to a respective WDM output link 3180.

As described above with reference to FIG. 5, a spectral-temporal connector distributes signal segments from WDM input links, each WDM input link comprising Λ input wavelength channels, to WDM output links, each WDM output link comprising Λ output wavelength channels, Λ>1. The spectral-temporal connector employs Λ connector modules with each connector modules having Λ temporal rotators. Each temporal rotator connects m input wavelength channels to m output wavelength channels, m>2, thus the number of input wavelength channels per connector module is Λ×m and the number of output wavelength channels per connector module is Λ×m. A spectral multiplexer combines an output wavelength channel from each of the Λ rotators of a connector module onto a WDM output link. Thus, the number of WDM input links of the spectral-temporal connector is Λ×m, the number of WDM output links per connector module is m, and the number of WDM output links of the spectral-temporal connector is Λ×m. As illustrated in FIG. 6, each temporal rotator has a control inlet 641 and a control outlet 642 connecting to a respective timing circuit. Thus, each temporal rotator has (m+1) inlets and (m+1) outlets.

Figure 32:
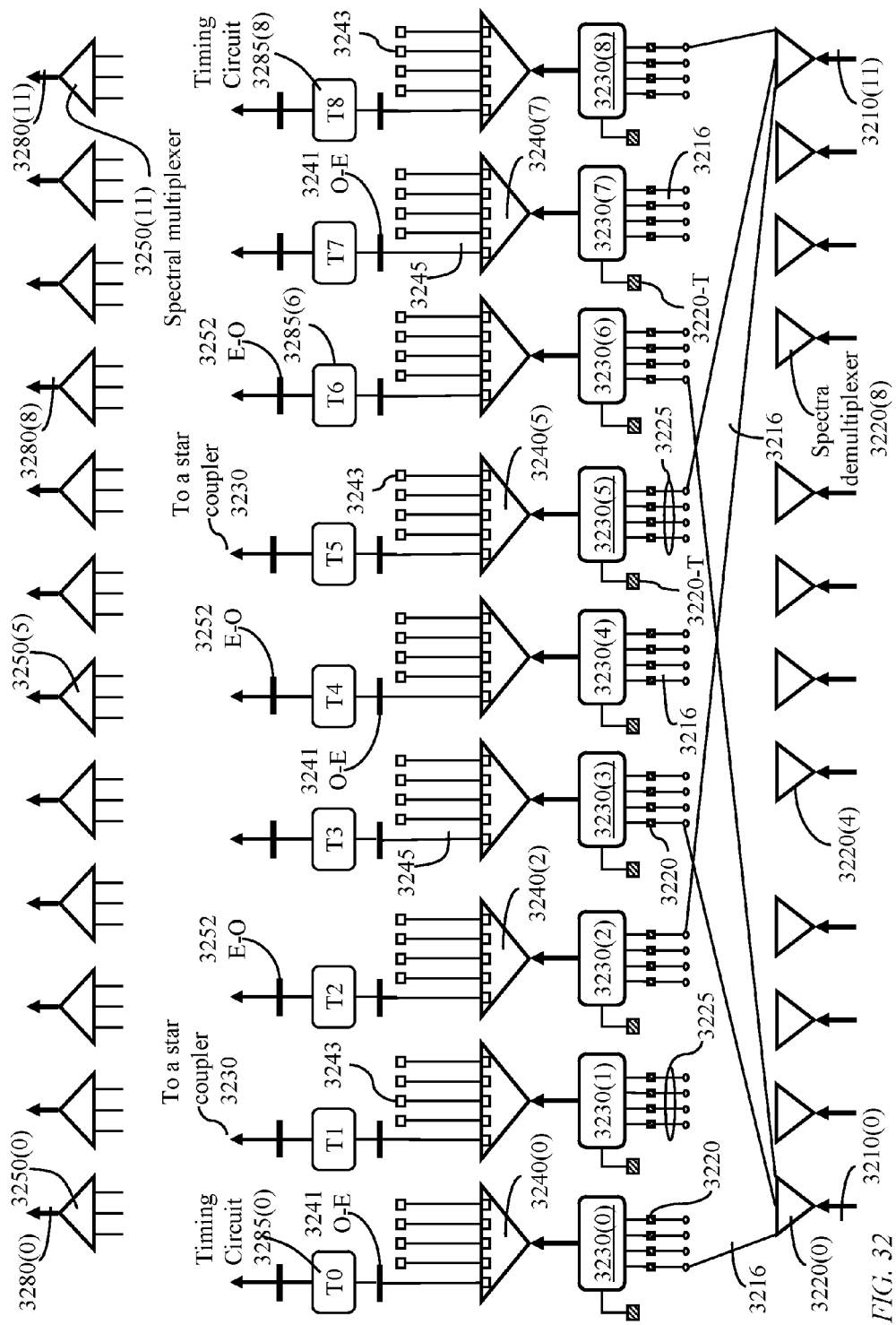
FIG. 32 illustrates timing circuits of a spectral-temporal connector employing connector modules of a fourth type, in accordance with an embodiment of the present invention.

FIG. 32 illustrates components of a spectral-temporal connector coupled to WDM input links 3210 and WDM output links 3280. Each WDM input link 3210 is coupled to a respective input spectral demultiplexer 3218. The spectral-temporal connector comprises $\Lambda^2$ temporal optical rotators, Λ=3, each temporal optical rotator configured as a star coupler 3230 and an inner spectral demultiplexer 3240 having (m+1) outputs. The temporal optical rotators are arranged in groups, forming connector modules 3300, 3400, and 3500 as described below. Output channels 3216 of each spectral demultiplexer 3218 connect to star couplers 3230 of different connector modules.

Each star coupler 3230 is associated with a respective group 3225 of input channels 3216. Each star coupler 3230 has one outlet connecting to a respective inner spectral demultiplexer 3240 and (m+1) inlets each coupled to a respective spectral translator 3220. One inlet connects to a timing circuit 3285 and m inlets connect to input channels

3216. A spectral translator 3220 connecting to an output of a timing circuit 3285 is further identified as 3220-T. The timing circuits 3285 are further identified as T0 to T8 in FIG. 32. Each inner spectral demultiplexer 3240 has m channels 3243 connecting to respective spectral multiplexers 3250 and one channel 3245 connecting to a respective timing circuit 3285 through an optical-electrical converter 3241. Each timing circuit 3285 connects to an inlet of a respective start coupler 3230 through an electrical-optical converter 3252 and a spectral translator 3220. Each spectral multiplexer 3250 combines Λ signals occupying different spectral bands onto a respective WDM output link 3280.

With Λ=3 and m=4, a spectral-temporal connector may interconnect 12 switching nodes 220 (FIG. 2). The switching nodes (not illustrated in FIG. 32) may be individually identified as 220(0) to 220(11). Without loss of generality, WDM output links 3280(0) to 3280(11) may connect to switching nodes 220(0) to 220(11), respectively. Each WDM link 3280 comprises Λ downstream channels carrying downstream data to a respective switching node 220. Each switching node 220 has a WDM link, comprising Λ upstream channels, to a spectral demultiplexer (not illustrated in FIG. 32) which directs the Λ upstream channels to different star couplers 3230. In an exemplary configuration: switching nodes 220(0) to 220(3) connect to inlets of star couplers 3230(0), 3230(3), and 3230(6); switching nodes 220(4) to 220(7) connect to inlets of star couplers 3230(1), 3230(4), and 3230(7); and switching nodes 220(8) to 220(11) connect to inlets of star couplers 3230(2), 3230(5), and 3230(8).

Each of timing circuits 685, 785, 1185, 1485, 2585, 2885, 2985, 3085, 3185, and 3285 is a hardware entity comprising processing circuitry and data buffers holding incoming timing data extracted from upstream signals received from nodes 220 to be compared with contemporaneous readings of a master time indicator. A timing circuit may have a memory device storing processor executable instructions which cause the processing circuitry to formulate control messages to nodes 220 indicating discrepancies between the incoming timing data and the corresponding readings of the master time indicator.

Each timing circuit is preceded by an optical-to-electrical converter and succeeded by an electrical-to-optical converter. While the payload data distributed through a spectral-temporal connector remains in the optical domain, the control data is processed electronically.

FIG. 33 illustrates a connector module 3300 of a fourth type with an arrangement of timing-circuits 3285, individually identified as 3285(T0), 3285(T1), and 3285(T2). Connector module 3300 comprises star couplers 3230(0), 3230(1), and 3230(2), connecting at output to inner spectral demultiplexers 3240(0), 3240(1), and 3240(2), respectively. Each inner spectral demultiplexer 3240 has one channel 3245 to a respective timing circuit 3285 and four channels 3243 each connecting to one of four spectral multiplexers 3250(0), 3250(1), 3250(2), and 3250(3). Each spectral multiplexer 3250 multiplexes signals occupying three spectral bands (Λ=3) onto a respective WDM output link 3280.

A spectral-translation controller 3325 coupled to a master time indicator 3390 periodically prompts each spectral translator 3220 of connector module 3300 to shift a current spectral band in order to connect to a different channel 3243 leading to a respective output link 3280 or to connect to channel 3245 leading to a timing circuit 3285. Timing coordination is needed in order to enable aligning time-slotted signals received at a star coupler 3230 from input channels 3216 originating from geographically distributed external network elements, such as nodes 220 (FIG. 2), and experiencing different propagation delays.

Timing circuit 3285(TO) receives sending-time information from nodes 220(0) to 220(3) connecting to input ports of star coupler 3230(0), through spectral translators 3220, and sends corresponding time information of master time indicator 3390 to an inlet of star coupler 3230(0). Inner spectral demultiplexer 3240(0) distributes the timing information to spectral multiplexers 3250(0) to 3250(3) to be communicated through output links 3280 to switching nodes 220(0) to 220(3).

Timing circuit 3285(T1) receives sending-time information from nodes 220(4) to 220(7) connecting to input ports of star coupler 3230(1), through spectral translators 3220, and sends corresponding time information of master time indicator 3390 to an inlet of star coupler 3230(3) of FIG. 34. Inner spectral demultiplexer 3240(3) distributes the timing information to spectral multiplexers {3250(4), 3250(5), 3250(6), 3250(7)} to be communicated through output links 3480 to switching nodes 220(4) to 220(7).

Timing circuit 3285(T2) receives sending-time information from nodes 220(8) to 220(11) connecting to input ports of star coupler 3230(2), through spectral translators 3220, and sends corresponding time information of master time indicator 3390 to an inlet of star coupler 3230(6) of FIG. 35. Inner spectral demultiplexer 3240(6) distributes the timing information to spectral multiplexers {3250(8), 3250(9), 3250(10), 3250(11)} to be communicated through output links 3280 to switching nodes 220(8) to 220(11).

FIG. 34 illustrates a connector module 3400 of the fourth type with an arrangement of timing-circuits 3285, individually identified as 3285(T3), 3285(T4), and 3285(T5). Connector module 3400 comprises star couplers 3230(3), 3230(4), and 3230(5), connecting at output to inner spectral demultiplexers 3240(3), 3240(4), and 3240(5), respectively. Each inner spectral demultiplexer 3240 has one channel 3245 to a respective timing circuit and four channels 3243 each connecting to one of four spectral multiplexers 3250(4), 3250(5), 3250(6), and 3250(7). Each spectral multiplexer 3250 multiplexes signals occupying three spectral bands onto a respective WDM output link 3280.

A spectral-translation controller 3425 coupled to master time indicator 3390 periodically prompts each spectral translator 3220 of connector module 3400 to shift a current spectral band in order to connect to a different channel 3243 leading to a respective output link 3280 or to connect to channel 3245 to a timing circuit 3285.

Timing circuit 3285(T3) receives sending-time information from nodes 220(0) to 220(3) connecting to input ports of star coupler 3230(3), through spectral translators 3220, and sends corresponding time information of master time indicator 3390 to an inlet of star coupler 3230(1) of connector module 3300. Inner spectral demultiplexer 3240(1) distributes the timing information to spectral multiplexers 3250(0) to 3250(3) to be communicated through output links 3280 to switching nodes 220(0) to 220(3).

Timing circuit 3285(T4) receives sending-time information from nodes 220(4) to 220(7) connecting to input ports of star coupler 3230(4), through spectral translators 3220, and sends corresponding time information of master time indicator 3390 to an inlet of star coupler 3230(4). Inner spectral demultiplexer 3240(4) distributes the timing information to spectral multiplexers {3250(4), 3250(5), 3250(6), 3250(7)} to be communicated through output links 3280 to switching nodes 220(4) to 220(7).

Timing circuit 3285(T5) receives sending-time information from nodes 220(8) to 220(11) connecting to input ports of star coupler 3230(5), through spectral translators 3220, and sends corresponding time information of master time indicator 3390 to an inlet of star coupler 3230(7) of connector module 3500 (FIG. 35). Inner spectral demultiplexer 3240(7) distributes the timing information to spectral multiplexers {3250(8), 3250(9), 3250(10), 3250(11)} to be communicated through output links 3280(0) to 3280(11) directed to switching nodes 220(8) to 220(11), respectively.

FIG. 35 illustrates a connector module 3500 of the fourth type with an arrangement of timing-circuits 3285, individually identified as 3285(T6), 3285(T7), and 3285(T8). Connector module 3500 comprises star couplers 3230(6), 3230(7), and 3230(8), connecting at output to inner spectral demultiplexers 3240(6), 3240(7), and 3240(8), respectively. Each inner spectral demultiplexer 3240 has four channels each connecting to one of four spectral multiplexers 3250(8), 3250(9), 3250(10), and 3250(11). Each spectral multiplexer 3250 multiplexes signals occupying three spectral bands onto a respective WDM output link 3280.

A spectral-translation controller 3525 coupled to master time indicator 3390 periodically prompts each spectral translator 3220 of connector module 3500 to shift a current spectral band in order to connect to a different channel 3243 leading to a respective output link 3280 or to connect to channel 3245 to a timing circuit 3285.

Timing circuit 3285(T6) receives sending-time information from switching nodes 220(0) to 220(3) connecting to input ports of star coupler 3230(6), through spectral translators 3220, and sends corresponding time information of master time indicator 3390 to an inlet of star coupler 3230(2) of connector module 3300. Inner spectral demultiplexer 3240(2) distributes the timing information to spectral multiplexers 3250(0) to 3250(3) to be communicated through output links 3280 to switching nodes 220(0) to 220(3).

Timing circuit 3285(T7) receives sending-time information from switching nodes 220(4) to 220(7) connecting to input ports of star coupler 3230(7), through spectral translators 3220, and sends corresponding time information of master time indicator 3390 to an inlet of star coupler 3230(5) of connector module 3400. Inner spectral demultiplexer 3240(5) distributes the timing information to spectral multiplexers {3250(4), 3250(5), 3250(6), 3250(7)} to be communicated through output links 3280 to switching nodes 220(4) to 220(7).

Timing circuit 3285(T8) receives sending-time information from nodes 220(8) to 220(11) connecting to input ports of star coupler 3230(8), through spectral translators 3220, and sends corresponding time information of master time indicator 3390 to an inlet of star coupler 3230(8). Inner spectral demultiplexer 3240(8) distributes the timing data to spectral multiplexers {3250(8), 3250(9), 3250(10), 3250(11)} to be communicated through output links 3280 to switching nodes 220(8) to 220(11).

Referring to FIG. 27, the $\Lambda$ channels (spectral bands) of an input link 2710 are routed to $\Lambda$ different connector modules 2750. FIG. 32 illustrates components of a spectral-temporal connector corresponding to spectral-temporal connector 2700 of FIG. 27, with connector modules 3300, 3400, and 3500 (FIG. 33, FIG. 34, and FIG. 35) of the spectral-temporal connector corresponding to connector modules 2750. Each of the connector modules 3300, 3400, and 3500 has $\Lambda$ star couplers. The star couplers of the entire spectral-temporal connector are indexed sequentially between 0 to $(\Lambda^2-1)$. Each star coupler 3230 has m inlets for receiving signals from input channels 3216 and at least one inlet for receiving timing data.

In one implementation, the $\Lambda$ channels of a WDM input link of index j, $0 \le j < N$, connect to $\Lambda$ star couplers of indices:

$\lfloor j/m \rfloor + Q \times \Lambda$, $0 \le Q < \Lambda$.

The WDM input links are indexed sequentially between 0 and (N−1), $1 < N < (m \times \Lambda)$, where $\lfloor x \rfloor$ denotes an integer part of a number (generally a real number) x.

Inner channels 3243 connect outlets of an inner spectral demultiplexer 3240 of index k, $0 \le k < \Lambda^2$, to spectral multiplexers 3250 connecting to output links 3280 of indices:

$m \times \lfloor k/\Lambda \rfloor + q$, $0 \le q < m$.

The inner spectral demultiplexers 3240 are indexed sequentially between 0 and $(\Lambda^2-1)$ and the output WDM links 3280 are indexed sequentially between 0 and (N−1).

Figure 36:
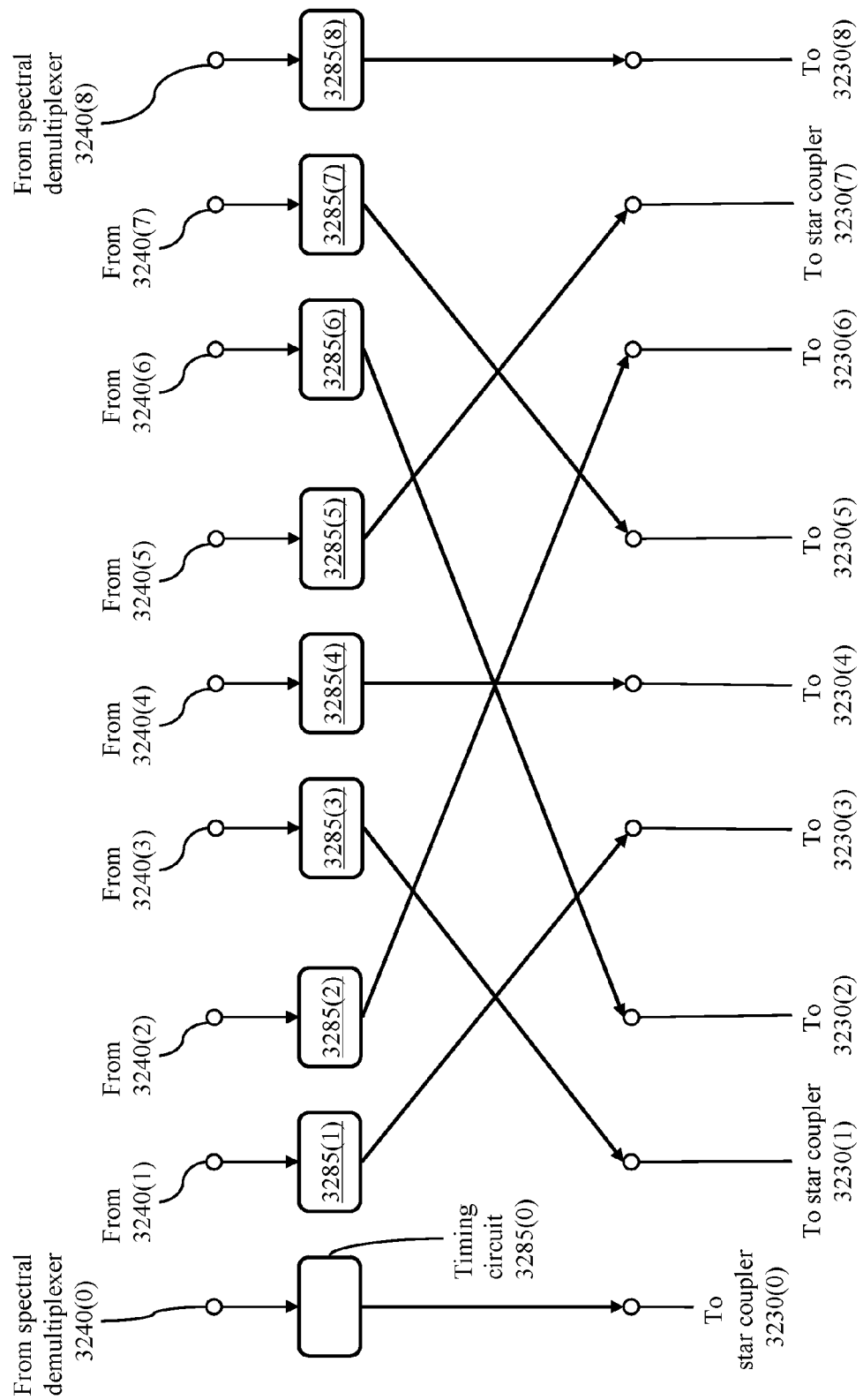
FIG. 36 illustrates interconnection of elements of connector modules of FIGS. 33, 34, and 35, in accordance with an embodiment of the present invention.

FIG. 36 illustrates interconnection of elements of connector modules of FIGS. 33, 34, and 35.

The input and output of timing circuit 3285(T0) respectively connect to an output of inner spectral demultiplexer 3240(0) and a spectral translator of an input to star coupler 3230(0).

The input and output of timing circuit 3285(T1) respectively connect to an output of inner spectral demultiplexer 3240(1) and a spectral translator of an input to star coupler 3230(3).

The input and output of timing circuit 3285(T2) respectively connect to an output of inner spectral demultiplexer 3240(2) and a spectral translator of an input to star coupler 3230(6).

The input and output of timing circuit 3285(T3) respectively connect to an output of inner spectral demultiplexer 3240(3) and a spectral translator of an input to star coupler 3230(1).

The input and output of timing circuit 3285(T4) respectively connect to an output of inner spectral demultiplexer 3240(4) and a spectral translator of an input to star coupler 3230(4).

The input and output of timing circuit 3285(T5) respectively connect to an output of inner spectral demultiplexer 3240(5) and a spectral translator of an input to star coupler 3230(7).

The input and output of timing circuit 3285(T6) respectively connect to an output of inner spectral demultiplexer 3240(6) and a spectral translator of an input to star coupler 3230(2).

The input and output of timing circuit 3285(T7) respectively connect to an output of inner spectral demultiplexer 3240(7) and a spectral translator of an input to star coupler 3230(5).

The input and output of timing circuit 3285(T8) respectively connect to an output of inner spectral demultiplexer 3240(8) and a spectral translator of an input to star coupler 3230(8).

FIG. 36 illustrates connectivity of timing circuits 3285 to inner spectral demultiplexers 3240 and star couplers 3230 where each WDM input link carries three spectral bands ($\Lambda=3$). Each star coupler 3230 has (m+1) inlets where one inlet receives control signals from a timing circuit 3285 and m inlets receive signals from input channels 3216. Each inner spectral demultiplexer 3240 has m channels 3243 connecting to respective spectral multiplexers 3250 and one channel 3245 connecting to a respective timing circuit 3285.

For an arbitrary value of $\Lambda$, $\Lambda > 1$, according to an embodiment, a timing circuit 3285 of index k, $0 \le k < \Lambda^2$, connects to a channel 3245 from an inner spectral demultiplexer 3240 of index k and to an inlet of a star coupler of index:

$\lfloor k/\Lambda \rfloor + \Lambda \times (k)_{modulo\ \Lambda}$.

The star couplers are indexed sequentially between 0 and $(\Lambda^2-1)$, inner spectral demultiplexers 3240 are indexed sequentially between 0 and $(\Lambda^2-1)$, and the timing circuits are indexed sequentially between 0 and $(\Lambda^2-1)$.

As mentioned above, the index $\{\lfloor k/\Lambda \rfloor + \Lambda \times (k)_{modulo\ \Lambda}\}$ may also be written as:

$\{k \times \Lambda + \lfloor k/\Lambda \rfloor\} modulo\ \Lambda^2\}$.

Figure 37:
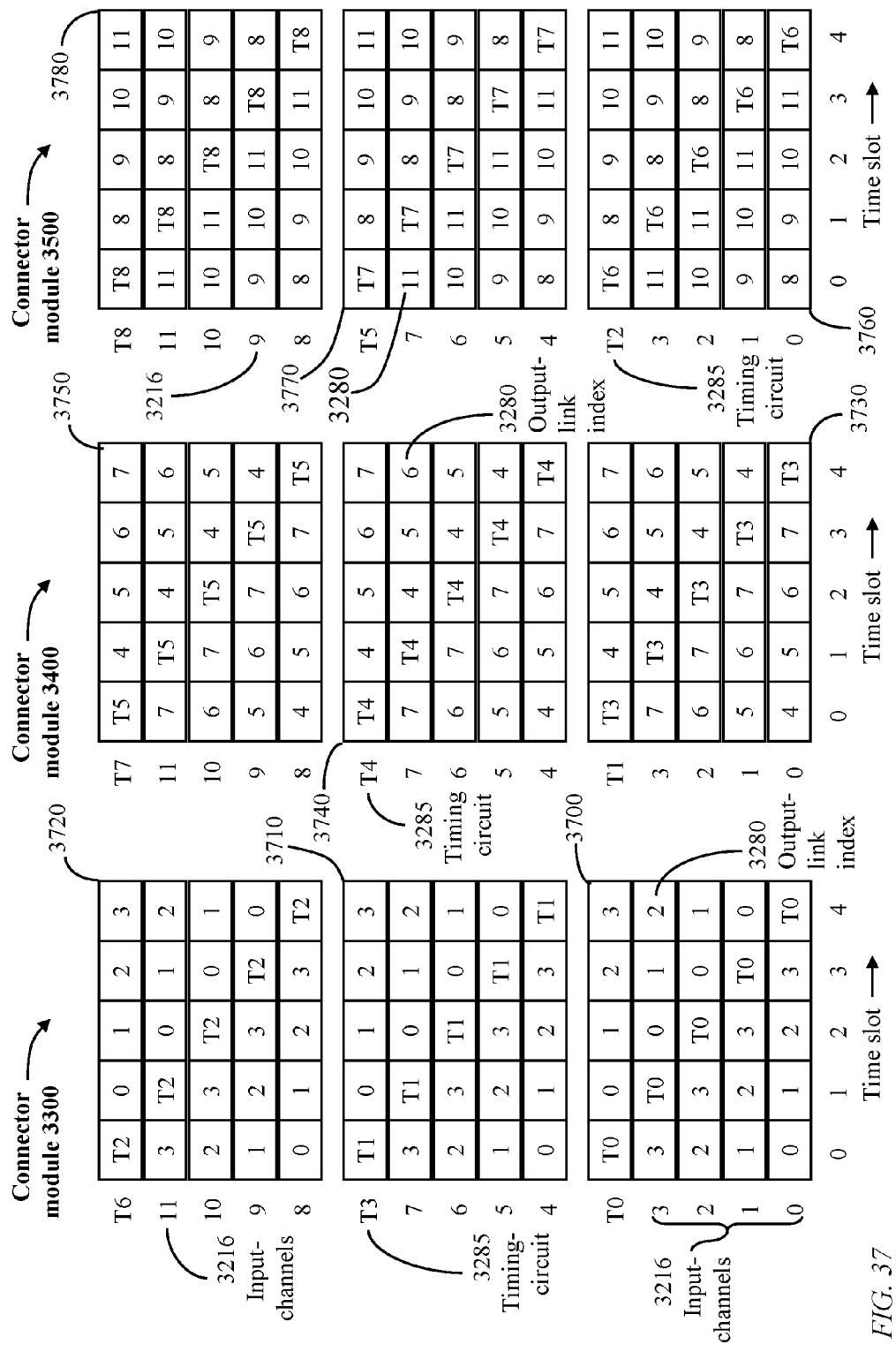
FIG. 37 illustrates a cyclic connectivity pattern of a spectral-temporal connector based on connector modules of the fourth type of FIGS. 33, 34, and 35 in accordance with an embodiment of the present invention.

FIG. 37 illustrates a cyclic connectivity pattern of a spectral-temporal connector based on connector modules of the fourth type of FIG. 33, FIG. 34, and FIG. 35. Each connector module has 12 input channels and four output links 3280. The output links 3280 of connector module 3300 are indexed as 0 to 3. The output links 3280 of connector module 3400 are indexed as 4 to 7. The output links 3280 of connector module 3500 are indexed as 8 to 11.

Tables 3700, 3710, 3720, 3730, 3740, 3750, 3760, 3770, and 3780 indicate cyclic connectivity of the 9 optical rotators formed of star couplers 3230(0) to 3230(8) and inner spectral demultiplexers 3240(0) to 3240(8). Each entry in the tables identifies an output link or a timing circuit to which an input channel or a timing circuit connects during a time slot of a rotation cycle. A rotation cycle of each of the optical rotators has (m+1) time slots (m=4) indexed as time slots 0 to 4. The input channels 3216 of each connector module 3300, 3400, or 3500 are indexed as 0 to 11.

Tables 3700, 3710, and 3720 illustrate connectivity of optical rotators formed of star couplers 3230 and inner spectral demultiplexers 3240 of connector module 3300. Each input channel 3216 cyclically connects to WDM output links 3280 of indices {0, 1, 2, 3} and a respective timing circuit 3285(T0), 3285(T1), or 3285(T2).

Tables 3730, 3740, and 3750 illustrate connectivity of optical rotators formed of star couplers 3230 and inner spectral demultiplexers 3240 of connector module 3400. Each input channel 3216 cyclically connects to WDM output links 3280 of indices {4, 5, 6, 7} and a respective timing circuit 3285(T3), 3285(T4), or 3285(T5).

Tables 3760, 3770, and 3780 illustrate connectivity of optical rotators formed of star couplers 3230 and inner spectral demultiplexers 3240 of connector module 3500. Each input channel 3216 cyclically connects to WDM output links 3280 of indices {8, 9, 10, 11} and a respective timing circuit 3285(T6), 3285(T7), or 3285(T8).

Each input link 2710 comprises $\Lambda$ channels 3216 occupying $\Lambda$ non-overlapping spectral bands. The constituent channels 3216 of a link 2710(j), $0 \leq j < (m \times \Lambda)$, are directed to $\Lambda$ different connector modules. Without loss of generality, each of the channels 3216 of an input link of index j is also identified by the index j.

Referring to Table 3700, timing circuit 3285 labelled T0 receives upstream timing data from input channels 3216 of indices 0, 1, 2, and 3 connecting to connector modules 3300 and distributes corresponding downstream timing data to output links 3280 of indices 0, 1, 2, and 3, respectively.

Referring to Table 3730 and Table 3710, timing circuit 3285 labelled T3 receives upstream timing data from input channels 3216 of indices 0, 1, 2, 3 connecting to connector modules 3400 and distributes corresponding downstream timing data to output links 3280 of indices 0, 1, 2, and 3, respectively, of connector module 3300.

Referring to Table 3760 and Table 3720, timing circuit 3285 labelled T6 receives upstream timing data from input channels 3216 of indices 1, 2, 3, 4 connecting to connector modules 3500 and distributes corresponding downstream timing data to output links 3280 of indices 0, 1, 2, and 3, respectively, of connector module 3300.

Likewise, timing circuits T1, T4, and T7 collect upstream timing data from channels 3216 of indices 4, 5, 6, and 7, of connector modules 3300, 3400, and 3500, and distribute corresponding downstream timing data to output links 3280 of indices 4, 5, 6, and 7, respectively of connector module 3400. Timing circuits T2, T5, and T8 collect upstream timing data from channels 3216 of indices 8, 9, 10, and 11, of connector modules 3300, 3400, and 3500, and distribute corresponding downstream timing data to output links 3280 of indices 8, 9, 10, and 11, respectively, of connector module 3400.

Figure 38:
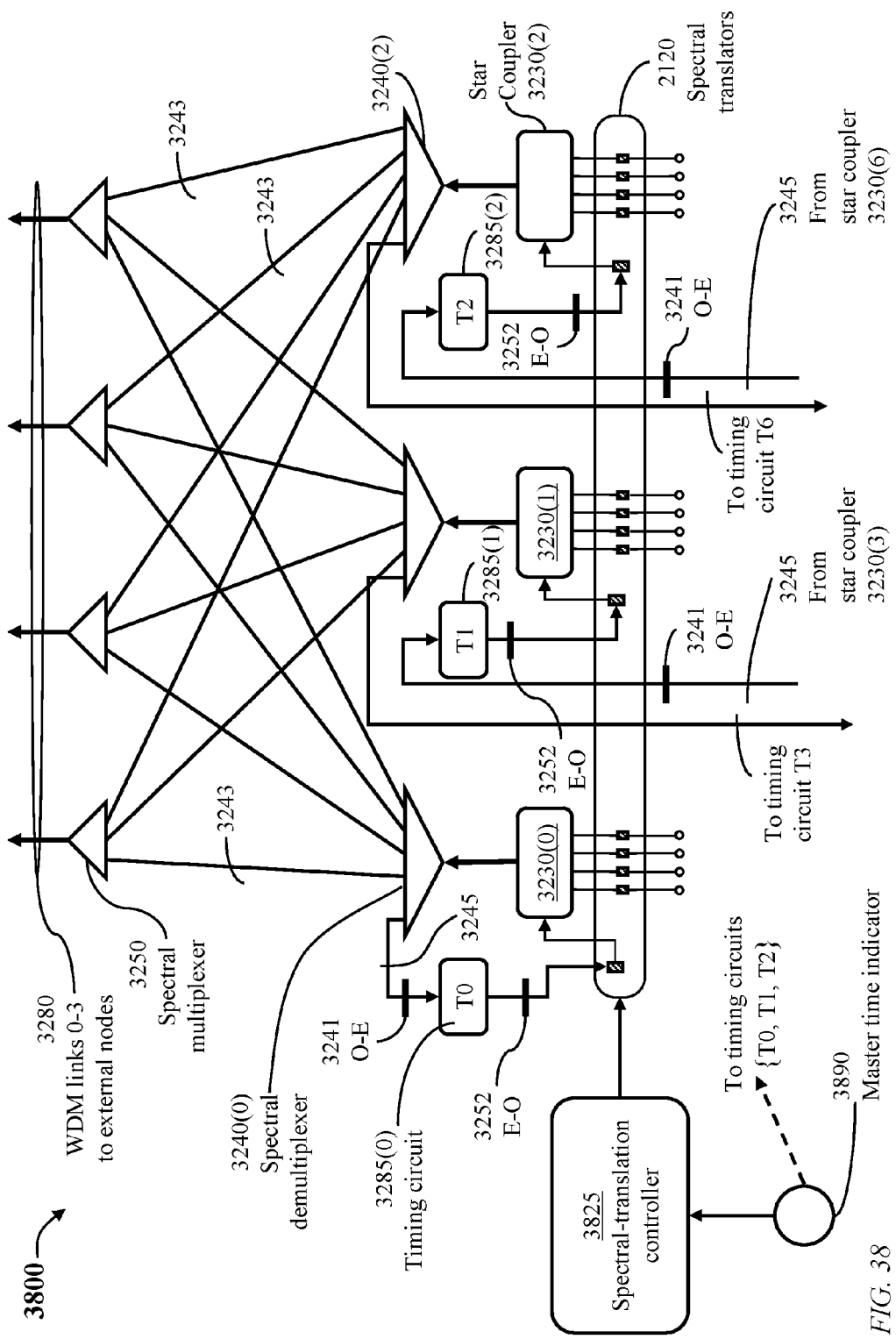
FIG. 38 illustrates a configuration of a connector module similar to the configuration of FIG. 33 with an alternate arrangement for distribution of timing data, in accordance with an embodiment of the present invention.

FIG. 38 illustrates a connector module 3800 similar to the configuration of FIG. 33 with an alternate arrangement for distribution of timing data. Upstream control channels carry timing data from star couplers 3230(0), 3230(1) and 3230(2), through respective inner spectral demultiplexers 3240, to timing circuits 3285(0), 3285(3), and 3285(6), respectively (further identified as T0, T3, and T6). Downstream control channels carry timing data from timing circuits 3285(0), 3230(1), and 3230(2) to star couplers 3230(0), 3230(1), and 3230(2) to be distributed through inner spectral demultiplexers 3240(0), 3240(1), and 3240(2) to spectral multiplexers 3250 and, hence, to WDM output links 3280 leading to external nodes 220.

A spectral-translation controller 3825 coupled to master time indicator 3890 periodically prompts each spectral translator 3220 to shift a current spectral band in order to connect to a different channel 3243 leading to a respective output link 3280 or to connect to channel 3245 to a timing circuit 3285.

The timing circuits of connector module 3300 receive upstream timing data through inner spectral demultiplexers 3240 of the same connector module 3300 and distribute downstream timing data to a respective star coupler 3230 in each of connector modules 3300, 3400 and 3500. The timing circuits of connector module 3400 receive upstream timing data through inner spectral demultiplexers 3240 of the same connector module 3400 and distribute downstream timing data to a respective star coupler 3230 in each of connector modules 3300, 3400 and 3500. Likewise, the timing circuits of connector module 3500 receive upstream timing data through inner spectral demultiplexers 3240 of the same connector module 3500 and distribute downstream timing data to a respective star coupler 3230 in each of connector modules 3300, 3400 and 3500.

Connector module 3800 is one of $\Lambda$ connector modules forming a spectral-temporal connector ($\Lambda$=3). The timing circuits of connector module 3800 receive upstream timing data through inner spectral demultiplexers 3240 of different connector modules and distribute downstream timing data to star couplers of the same connector module 3800.

Figure 39:
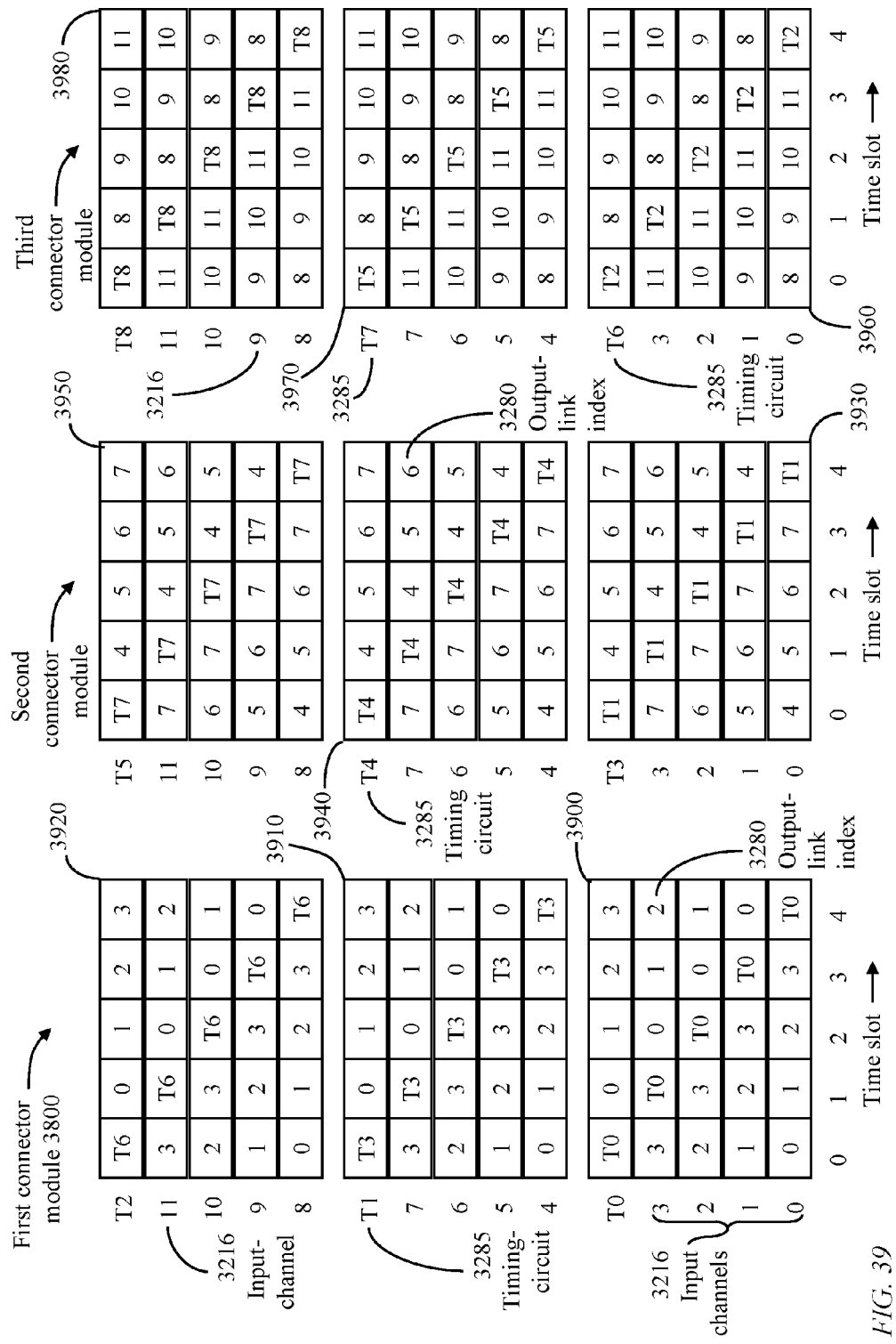
FIG. 39 illustrates a cyclic connectivity pattern of a spectral-temporal connector based on connector modules of the type of FIG. 38, in accordance with an embodiment of the present invention.

FIG. 39 illustrates a cyclic connectivity pattern of a spectral-temporal connector based on connector modules of the type of FIG. 38. Each connector module has 12 input channels and four output links 3280. The output links 3280 of connector module 3800 are indexed as 0 to 3.

The output links 3280 of a second connector module (not illustrated) are indexed as 4 to 7. The output links 3280 of a third connector module (not illustrated) are indexed as 8 to 11.

Tables 3900, 3910, 3920, 3930, 3940, 3950, 3960, 3970, and 3980 identify WDM output links 3280 to which input channels 3216 and timing circuits 3285 (T0 to T8) connect during each time slot of a rotation cycle. Each connector module has 12 input channels, indexed as 0 to 11, and four output links 3280. The output links 3280 of connector module 3800 are indexed as 0 to 3. The output links 3280 of a second connector module (not illustrated) are indexed as 4 to 7. The output links 3280 of a third connector module (not illustrated) are indexed as 8 to 11. The tables indicate cyclic connectivity of 9 temporal rotators formed of 9 star couplers 3230 and corresponding inner spectral demultiplexers 3240. Each entry in the tables identifies an output link or a timing circuit to which an input channel or a timing circuit connects during a time slot of the rotation cycle. A rotation cycle of each of the optical rotators has (m+1) time slots (m=4) indexed as time slots 0 to 4. The input channels 3216 of each connector module are indexed as 0 to 11.

Thus, the present invention provides a spectral-temporal connector 2700 comprising a plurality of connector modules 2750 and a plurality of input spectral demultiplexers 2720. Each connector module 2750 comprises a set of star couplers 3230, a plurality of input ports, and a spectral router. FIG. 33, FIG. 34, and FIG. 35 illustrate exemplary implementations of connector modules 2750.

Each star coupler 3230 has a set of inlets, each inlet equipped with a respective spectral translator 3220 to form an input port of the connector module. Each spectral translator 3220 cyclically shifts a respective spectral band so that, at any instant of time, spectral bands of signals at inlets of each star coupler 3230 are non-overlapping.

The spectral router connects outlets of the set of star couplers to a set of output links 3280. The spectral router comprises a set of inner spectral demultiplexers 3240 and a set of spectral multiplexers 3250. Each inner spectral demultiplexer 3240 receives signals occupying different spectral bands collected at an outlet of a respective star coupler 3230 and directs each constituent signal occupying a single spectral band to a respective spectral multiplexer 3250.

Each input spectral demultiplexer 2720 directs channels 2716 (corresponding to channels 3216 of FIG. 32) of a respective multichannel input link 2710 of a plurality of multichannel input links 2710 to respective input ports of different connector modules 2750.

Each of spectral-translation controllers 3325, 3425, and 3525 of connector modules 3300, 3400, and 3500 is coupled to a master time indicator 3390 and is configured to prompt spectral translators 3220 of a respective connector module to shift spectral bands of signal received from input channels 3216.

The plurality of timing circuits 3285 is provided to enable time alignment at all input ports of each connector module. Each timing circuit 3285 is coupled to the master time indicator 3390 and connects to a channel from a respective inner spectral demultiplexer 3240 and a channel directed to a spectral translator 3220 so that a set of timing circuits 3285 connecting to inner spectral demultiplexers 3240 of a same connector module connects to spectral translators 3220 of different connector modules.

Alternatively, each timing circuit 3285 is coupled to the master time indicator 3390 and connects to a channel from a respective inner spectral demultiplexer 3240 and a channel directed to a spectral translator 3220 so that a set of timing circuits 3285 within a same connector module connects to spectral translators 3220 of different star couplers 3230 of the same connector module 3800 but connects to inner spectral demultiplexers 3240 of different connector modules.

With each input link 2710 having Λ channels, the plurality of connector modules comprises Λ connector modules, the set of star couplers per connector module comprises Λ star couplers, the set of inner spectral demultiplexers per connector module comprises Λ inner spectral demultiplexers.

Each input link 2710 of said plurality of input links comprises Λ channels. Each of Λ channels of an input link 2710 is directed to a respective connector module 2750 (3300, 3400, 3500). Each star coupler 3230 has (m+1) inlets, and each inner spectral demultiplexer 3240 has m output channels 3243 directed to m spectral multiplexers 3250 and one control channel 3245 directed to a timing circuit, Λ>1, m>2. The total number of input links 2710 or output links 2780 is Λ×m.

Each of spectral-translation controllers 1025, 1125, 2325, 2525, 3325, 3425, 3525, and 3825 is a hardware entity which may include a memory device storing indications of a requisite spectral-band sequence. A spectral-translation controller may also employ a hardware processor and a memory device storing processor executable instructions which cause the processor to determine a spectral-band rotation pattern.

Figure 40:
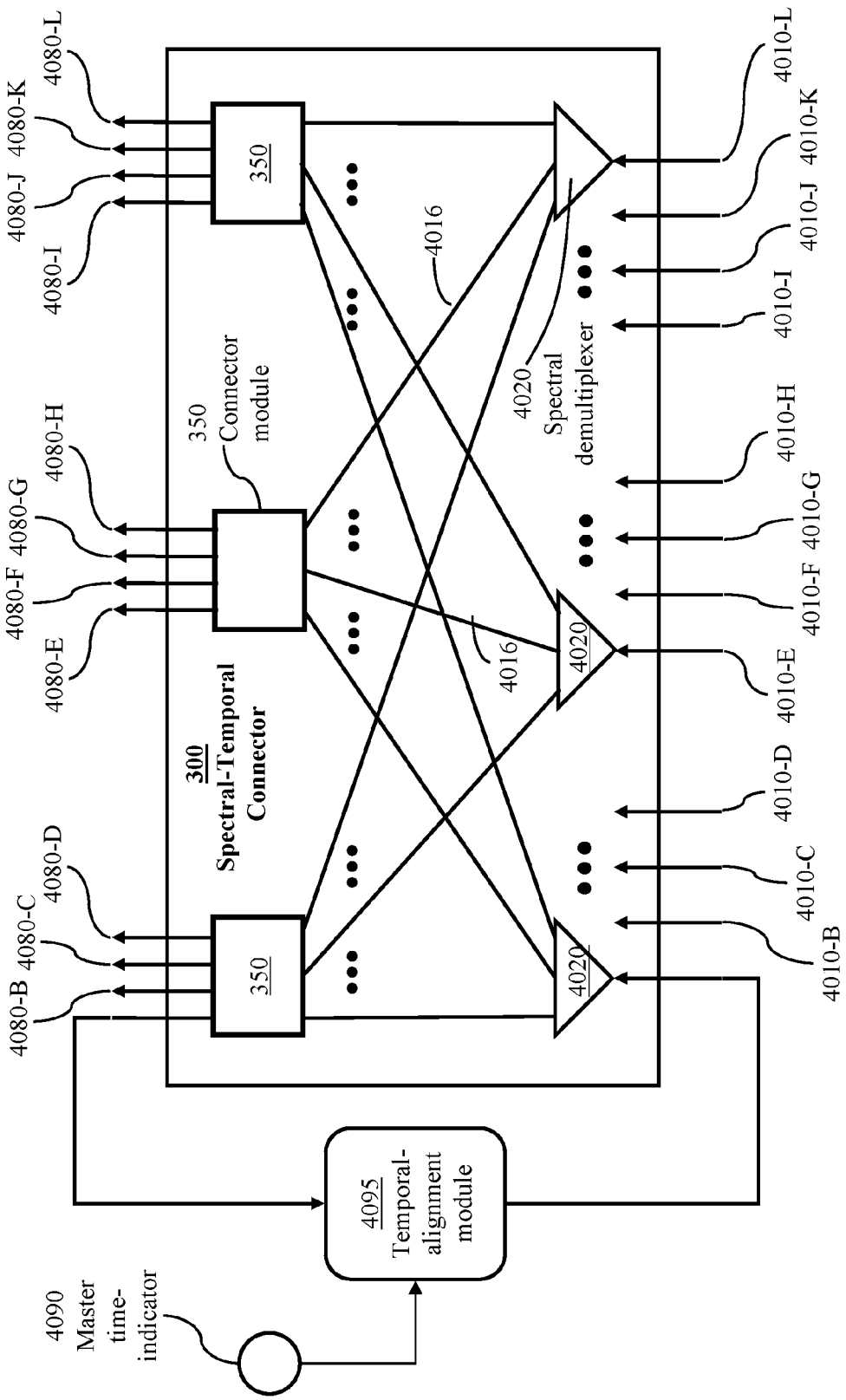
FIG. 40 illustrates a spectral-temporal connector with a temporal-alignment module, in accordance with an embodiment of the present invention.

FIG. 40 illustrates a configuration of a spectral-temporal connector 4000 configured to receive optical signals from input links 4010 and transmits optical signals over output links 4080.

Each of the input links 4010 (individually identified as 4010-A to 4010-L) is coupled to a respective spectral demultiplexer 4020. Each spectral demultiplexer 4020 has a channel 4016 to each connector module 350 and the output signals of each connector module 350 are transmitted over a WDM output link 4080 (individually identified as 4080-A to 4080-L).

Spectral-temporal connector 4000 is similar to the spectral-temporal connector 300 of FIG. 3 but equipped with a separate temporal-alignment module 4095 coupled to a master time indicator 4090, a selected output link 4080-A, and a selected input link 4010-A. The temporal-alignment module 4095 is provided to effect time alignment at inputs of the connector modules. The temporal-alignment module 4095 receives upstream timing data, originating at a plurality of nodes 220, from the selected output link 4080 and sends corresponding reference-time indications to the plurality of nodes. Temporal-alignment module 4095 comprises components (not illustrated) including optical-to-electrical converters, timing circuits, and electrical-to-optical converters. The temporal-alignment module 4095 may connect to more than one output link 4080 and more than one input link 4010.

The temporal-alignment module is configured to:
retrieve sending-time data embedded into signals received from data sources connected to input links 4010;
compare the timing data to corresponding reference-time indications of a master time indicator collocated with the spectral-temporal connector; and communicate discrepancies of the sending-time data and the corresponding reference-time indications to a respective source of the sending-time data (or communicate the sending-time data and the corresponding reference-time indications).

Figure 41:
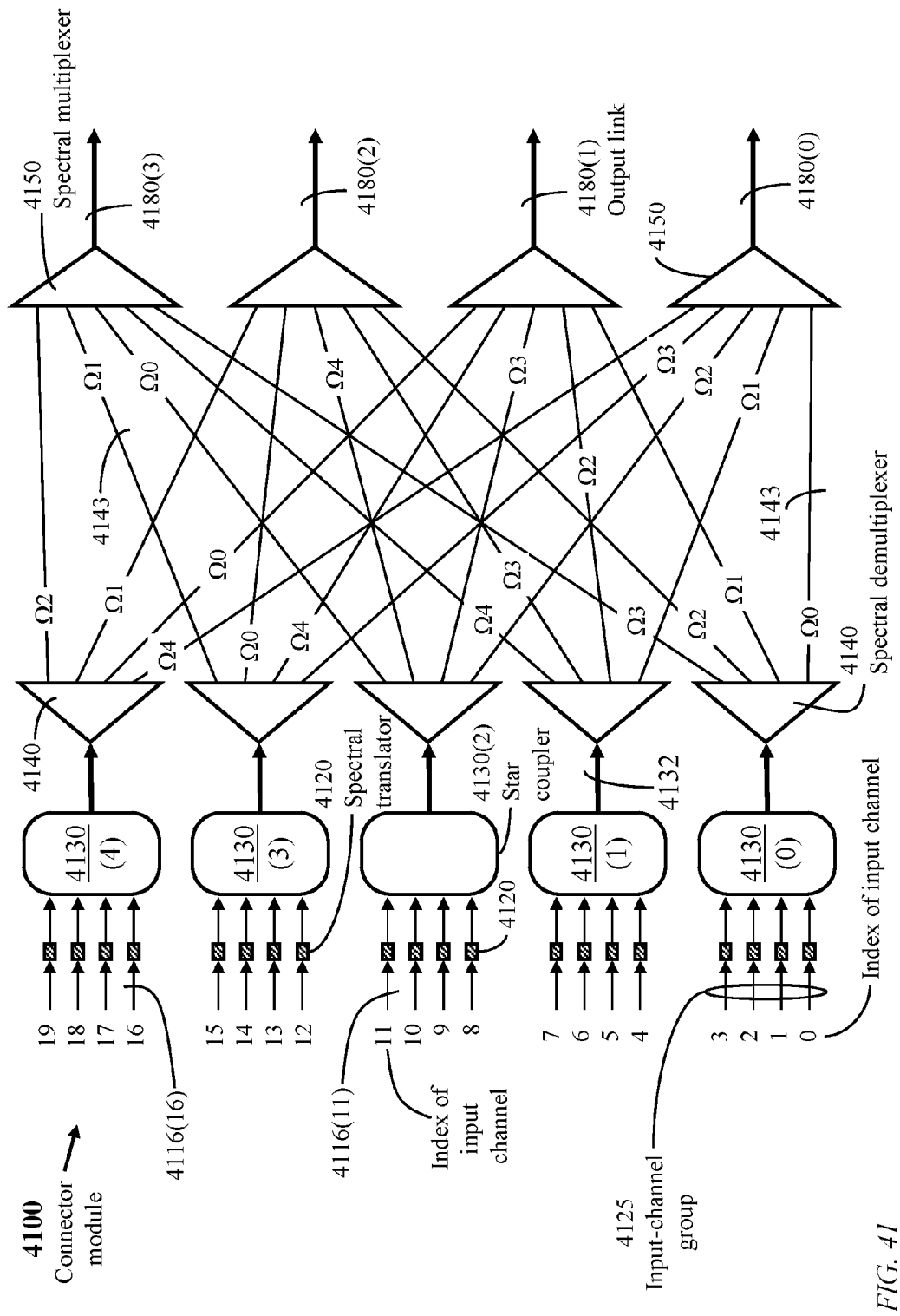
FIG. 41 illustrates a connector module of the second type of FIG. 20 where the number of spectral bands per WDM output link exceeds a number of inlets per star coupler, in accordance with an embodiment of the present invention.

FIG. 41 illustrates a connector module 4100 of the second type of FIG. 20 where a number Λ of spectral bands per WDM output link 4180 exceeds a number m of inlets per star coupler; Λ=5 and m=4 in the exemplary connector module of FIG. 41. A number Λ×m of input channels 4116 carries signals originating from external network elements, such as nodes 220 (FIG. 2). The input channels 4116 are divided into Λ input-channel groups 4125, each input-channel group having m input channels. Each input channel 4116 connects to a respective spectral translator 4120 preceding an inlet of a star coupler 4130. Each star coupler 4130 has four inlets and a single outlet coupled to a WDM link 4132 to a spectral demultiplexer 4140. Each spectral demultiplexer 4140 has four channels 4143 directed to different spectral multiplexers 4150. Each spectral multiplexer is coupled to a WDM link 4180 directed to an external network element such as a node 220 (FIG. 2). Each WDM output link 4180 carries signals occupying Λ spectral bands.

The input channels 4116 are individually identified as 4116(0) to 4116(19). Each input channel 4116 occupies a respective spectral band and a respective spectral translator 4120 translates the spectral band of the input channel to different spectral bands during successive time slots of a rotation cycle. The translated spectral bands are selected so that m input signals to a same star coupler 4130 occupy disjoint (non-overlapping) spectral bands and Λ input signals to a same spectral multiplexer 4150 occupy disjoint (non-overlapping) spectral bands.

Figure 42:
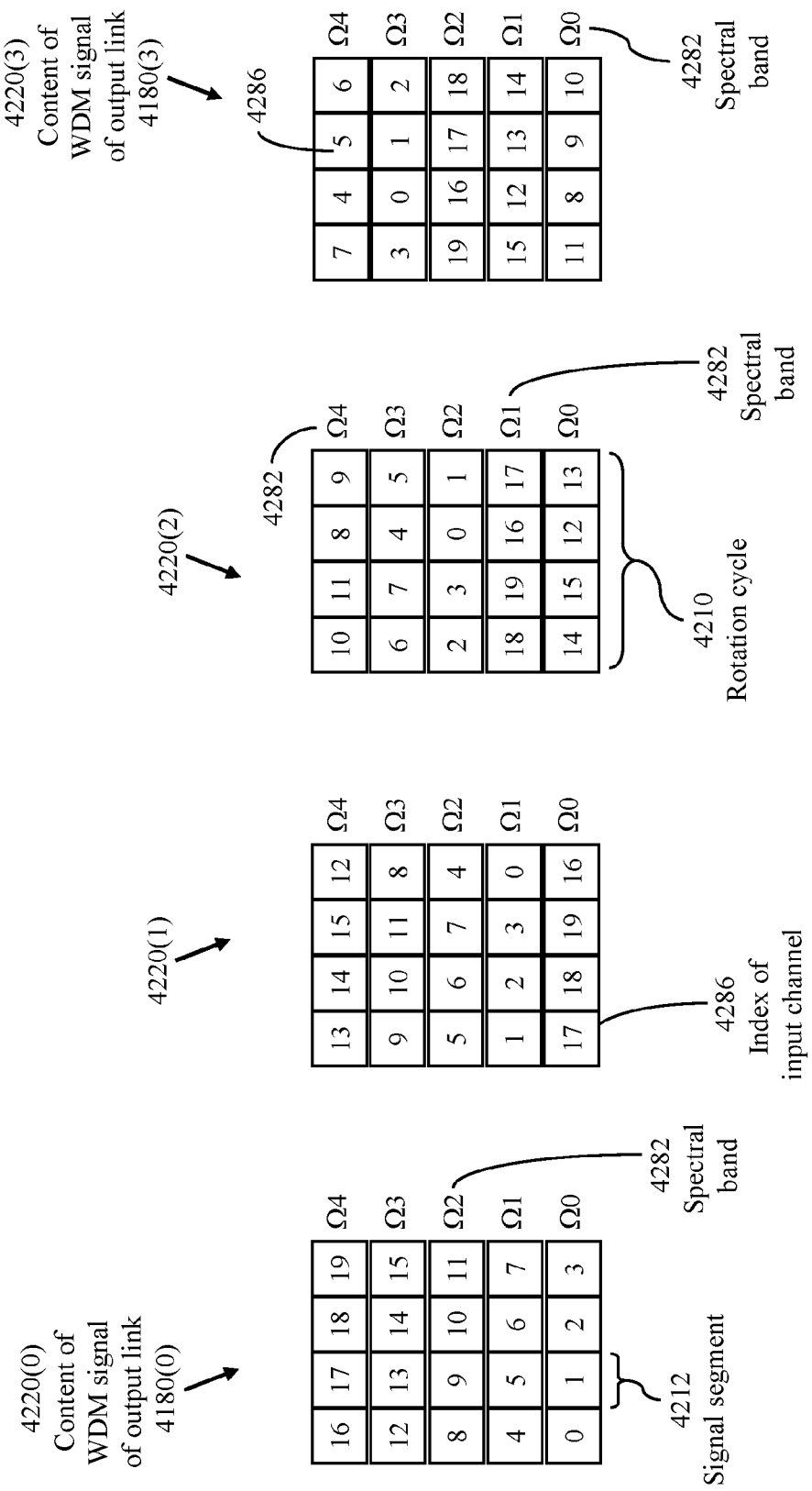
FIG. 42 illustrates signal contents at output of the connector module of FIG. 41.

FIG. 42 illustrates matrices 4220(0), 4220(1), 4220(2), and 4220(3) indicating signals carried on WDM output links 4180(0), 4180(1), 4180(2), and 4180(3). Each output link 4180 carries Λ signals occupying spectral bands 4282 individually identified as $\Omega_0$, $\Omega_1$, $\Omega_2$, $\Omega_3$, and $\Omega_4$. According to one embodiment, the output channels 4143 of the spectral demultiplexers 4140 carry signals occupying spectral bands $\{\Omega_0, \Omega_1, \Omega_2, \Omega_3\}$, $\{\Omega_1, \Omega_2, \Omega_3, \Omega_4\}$, $\{\Omega_2, \Omega_3, \Omega_4, \Omega_0\}$, $\{\Omega_3, \Omega_4, \Omega_0, \Omega_1\}$, and $\{\Omega_4, \Omega_0, \Omega_1, \Omega_2\}$, respectively, as illustrated in FIG. 41. During a rotation cycle 4210 of m time slots, each output signal occupying one spectral band comprises m signal segments 4212 belonging to m input channels 4116 so that each output link carries Λ×m signal segments, one from each input channel 4116. Each matrix 4220 corresponds to a respective WDM output link 4180 and includes indices 4286 of input channels 4116 contributing signal segments to each of the output spectral bands. For example, during a rotation cycle 4210, matrix 4220(1) indicates that WDM output link 4180(1) carries signal segments 4212 from input channels 4116 of indices:

14, 15, 12, and 13 occupying spectral band $\Omega_0$;
18, 19, 16, and 17 occupying spectral band $\Omega_1$;
2, 3, 0, and 1 occupying spectral band $\Omega_2$;
6, 7, 4, and 5 occupying spectral band $\Omega_3$; and
10, 11, 8, and 9 occupying spectral band $\Omega_4$.

Figure 43:
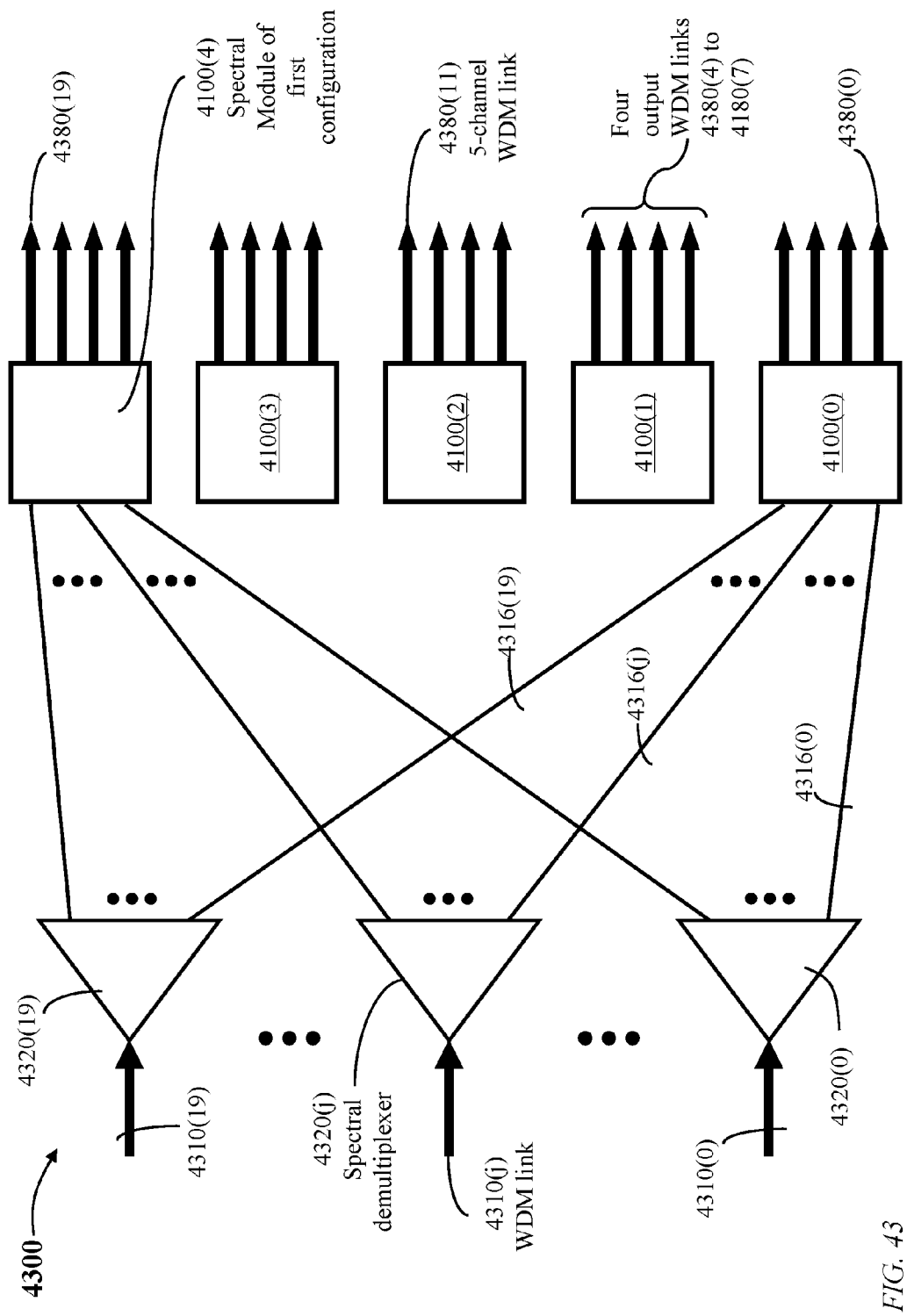
FIG. 43 illustrates a spectral-temporal connector based on the connector module of FIG. 41.

FIG. 43 illustrates a spectral-temporal connector 4300 based on connector module 4100 of FIG. 41. The spectral-temporal connector 4300 supports Λ×m WDM input links 4310 and Λ×m WDM output links 4380. Each WDM input link 4310 connects to a spectral demultiplexer 4320 which separates Λ signals occupying different spectral bands and directs the separated signals to different connector modules 4100(0) to 4100(4) through channels 4316. Each of the WDM output links 4380 carries a signal segment from each WDM input link 4310 during each rotation cycle.

Figure 44:
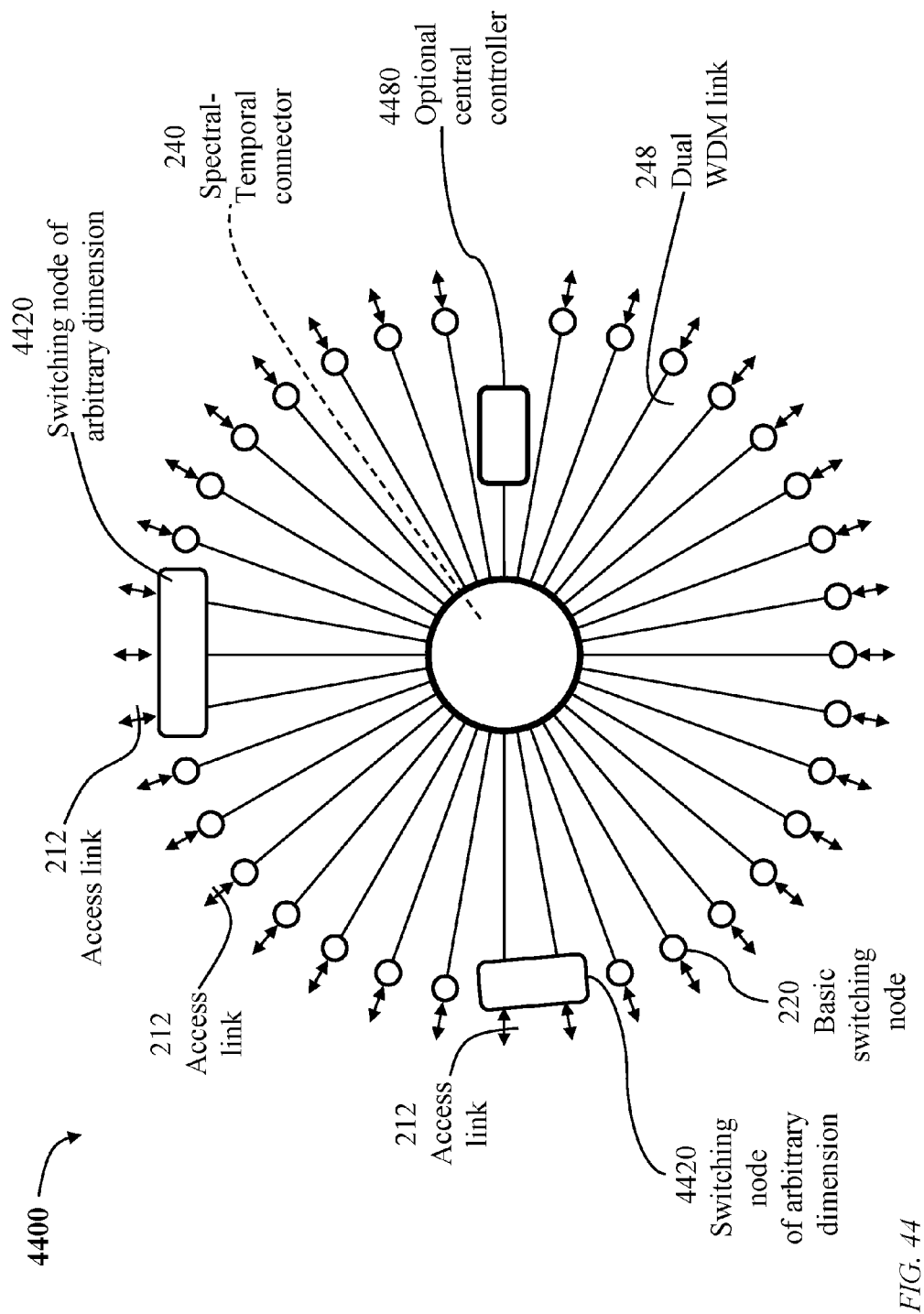
FIG. 44 illustrates a spectral-temporal connector interconnecting switching nodes of different dimensions and an optional central controller, in accordance with an embodiment of the present invention.

The full-mesh network 200 (FIG. 2) interconnects nodes 220 each having one dual link 248, comprising Λ channels (spectral bands), to the spectral-temporal connector 240. A node 220 having a WDM dual link 248 connecting to the spectral-temporal connector 240 may be viewed as a "basic node". Each node 220 has a path of capacity R/m to each other node, where R is the capacity (in bits per second) of a channel; all channels being of the same capacity—for example 40 Gigabits per second. FIG. 44 illustrates a spectral-temporal connector 240 interconnecting nodes 220 and 4420 of different capacities and, optionally, a central controller 4480 to form a full-mesh network 4400. The central controller 4480 has at least one dual link 248 to the spectral-temporal connector 240. A node 4420 of a higher capacity, connecting to a number of access links 212 and two or more WDM links 248 to the spectral-temporal connector 240, may be viewed as two or more basic nodes 220. With Λ=64 and m=128, for example, network 4400 may support 8192 basic nodes 220 if no higher-capacity nodes are present and a central controller 4480 is not provided or any combination of basic nodes, higher-capacity nodes, and/or a central controller 4480 provided the total number of dual links does not exceed Λ×m; for example, a network 4400 may comprise:

4096 basic nodes 220;
1000 nodes 4420 each having to two dual links 248 to spectral-temporal connector 240;
500 nodes 4420 each having three dual links 248 to spectral-temporal connector 240;
100 nodes 4420 each having four dual links 248 to spectral-temporal connector 240;
24 links each having eight dual links 248 to spectral-temporal connector 240; and
a central controller 4480 having four dual links to the spectral-temporal connector 240.

Figure 45:
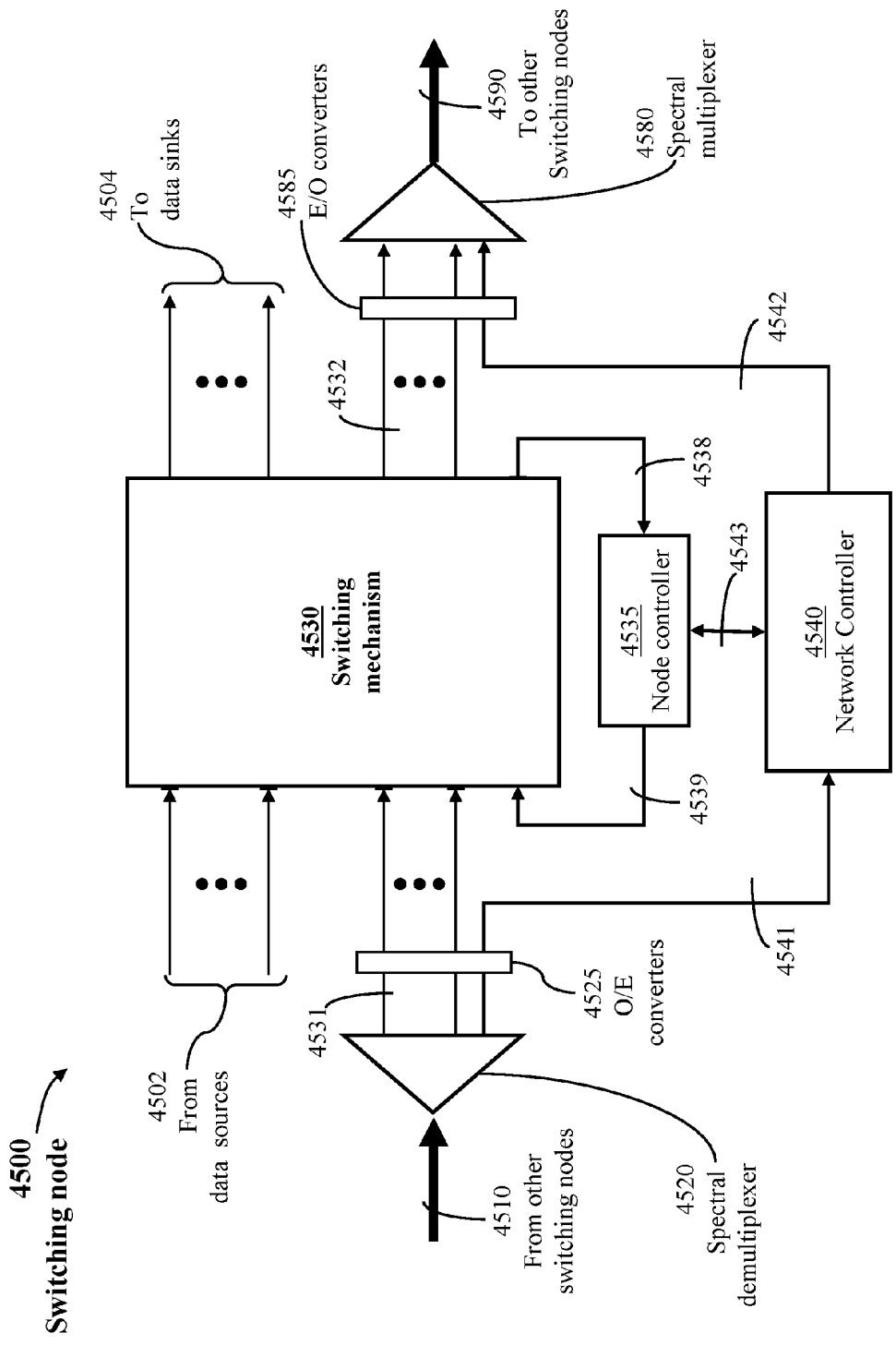
FIG. 45 illustrates a switching node having a node controller and hosting a network controller for use in an embodiment of the present invention.

FIG. 45 illustrates an exemplary node 4500, which may serve as node 220 in network 200 or 4400. Node 4500 comprises a switching mechanism (switch fabric) 4530 coupled to a node controller 4535 and a network controller 4540.

The switching mechanism receives data from respective data sources through ingress channels 4502 and transmits data to respective data sinks through egress channels 4504.

An input (downstream) WDM link 4510 from spectral-temporal connector 240 connects to a spectral demultiplexer 4520 which separates constituent spectral bands of a WDM input link 4510 to occupy separate channels 4531. Each channel 4531 connects to a respective input port of the switching mechanism 4530 through a respective O/E converter 4525. WDM link 4510 carries data from other nodes 220 connecting to the spectral-temporal connector 240.

Data Channels 4532 carry data from switching mechanism 4530 to spectral multiplexer 4580 through E/O converters 4585. Spectral bands from the E/O converters are multiplexed onto a WDM output link 4590 directed to spectral-temporal connector 240.

A control channel 4538 from switching mechanism 4530 to node controller 4535 carries control signals from each input port transferred through the switching mechanism 4530. A control channel 4539 carries control data from node controller 4535 to each output port through the switching mechanism 4530.

A control channel 4541 from spectral demultiplexer 4520 to network controller 4540 carries network control data to network controller 4540. A control channel 4542 from network controller 4540 to spectral multiplexer 4580 carries network control data to other nodes 220. An optional dual channel 4543 interconnects node controller 4535 and network controller 4540.

A spectral-temporal connector 240 may interconnect nodes 220 belonging to different network domains (not illustrated) of a global network where a node 220 may be a "gate node" of a respective network domain. The nodes 220 may exchange both payload data and control data relevant to their respective network domains through the spectral-temporal connector. The control data may include domain-topology defining data, domain state data, and/or other data relevant to inter-domain routing. Node controller 4535 performs functions related to internal routing within a switching node 220 while network controller 4540 may perform functions related to a global network to which nodes 220 belong. The node controller 4535 and the network controller 4540 may be integrated in a single controller.

Node controller 4535 is a hardware entity having at least one hardware processor and at least one memory device storing processor-readable instructions which cause the at least one hardware processor to implement processes relevant to establishing paths within the switching mechanism 4530. Likewise, network controller 4540 is a hardware entity having at least one hardware processor and at least one memory device storing processor-readable instructions which cause the at least one hardware processor to implement processes relevant to routing and control of a global network employing a spectral-temporal connector.

Central controller 4480 is a hardware entity comprising at least one processing device and at least one memory device storing software instructions which cause the at least one processing device to implement requisite network-related functions.

Switching node 4500 may support more than one WDM input link 4510, each accessing the switching mechanism 4530 and the network controller 4540 through a spectral demultiplexer 4520. Switching node 4500 may also support more than one WDM output link 4590, each receiving data from switching mechanism 4530 and the network controller 4540 through a spectral multiplexer 4520. Thus, the switching node may serve as a node 4420 of network 4400.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A network comprising:
a master time indicator;
a plurality of temporal rotators arranged into a plurality of temporal-rotator groups, each temporal rotator comprising a respective timing circuit coupled to said master time indicator;
a plurality of spectral demultiplexers each spectral demultiplexer configured to direct each spectral band of a respective input link of a plurality of input links, each input link carrying multiple spectral bands, to a respective temporal rotator in each temporal-rotator group;
a plurality of spectral multiplexers, each spectral multiplexer configured to combine output spectral bands from temporal rotators of a respective temporal-rotator group into a respective output link of a plurality of output links;
and
a plurality of nodes, each node coupled to:
at least one input link of said plurality of input links and at least one output link of said plurality of output links;
respective data sources; and
respective data sinks.

2. The network of claim 1 further comprising a central controller coupled to at least one input link of said plurality of input links and at least one output link of said plurality of output links, said central controller comprising at least one processing device and at least one memory device storing software instructions which cause the at least one processing device to implement network-related functions.

3. The network of claim 1 wherein said each input link carries $\Lambda$ spectral bands, $\Lambda > 1$, and said each temporal rotator further comprises:
m input ports, m>2;
m output ports;
a control inlet;
and
a control outlet.

4. The network of claim 3 wherein said each temporal rotator is configured to cyclically connect said control inlet and each of said m input ports to said control outlet and each of said m output ports during a rotation cycle.

5. The network of claim 3 wherein each input port of said each temporal rotator is configured to:
receive from a respective input link of said plurality of input links a signal occupying a respective spectral band;
direct m successive segments of said signal to said m output ports; and
direct control data embedded within said signal to said timing circuit through said control outlet.

6. The network of claim 3 wherein said control inlet is configured to:
receive timing data from said timing circuit; and
direct said timing data to said m output ports.

7. The network of claim 3 wherein said respective timing circuit is configured to:
receive sending-time indications from specific m nodes coupled to said each temporal rotator; and
return to said specific m nodes corresponding readings of said master time indicator thereby enabling time alignment of signals arriving at said each temporal rotator.

8. The network of claim 1 wherein said each node comprises a switching mechanism configured to switch data from a plurality of input channels to a plurality of output channels, wherein:
said plurality of input channels comprises ingress channels carrying data from said respective data sources and inner incoming channels carrying data from each other node of said plurality of nodes;
and
said plurality of output channels comprises egress channels carrying data to said respective data sinks and inner outgoing channels carrying data to each other node of said plurality of nodes.

9. The network of claim 1 wherein said each node comprises a respective node controller comprising at least one memory device storing software instructions which cause at least one hardware processor to establish paths within a switching mechanism of said each node.

10. The network of claim 1 wherein said each temporal rotator comprises:
a set of (m+1) spectral translators comprising:
m spectral translators each configured to process a signal received from one of said spectral demultiplexers to occupy a respective shifted spectral band; and
a spectral translator configured to process a signal from said respective timing circuit to occupy a specific spectral band;
a spectral-translation controller coupled to each said spectral translator;
a star coupler for combining output signals of said (m+1) spectral translators onto a wavelength-division-multiplexed link connecting to an arrayed waveguide gratings device to direct an output signal occupying said specific spectral band to said respective timing circuit and an output signal occupying said shifted spectral band to a respective spectral multiplexer of said plurality of spectral multiplexers.

11. A network comprising:
a set of $\Lambda$ connector modules, $\Lambda > 1$, each connector module comprising:
a set of $\Lambda$ rotators, each rotator cyclically connecting each inlet of a respective set of m inlets, m>2, to each channel of a respective set of m channels during a cyclic time frame;

a set of (m−1) spectral multiplexers, each spectral multiplexer combining a channel from each rotator of said Λ rotators onto a respective output link of a plurality of multichannel output links; and a timing circuit coupled to a channel from each rotator of said Λ rotators and an inlet of a rotator of each of said Λ connector modules;

a set of Λ×(m−1) spectral demultiplexers, each spectral demultiplexer connecting each channel of a respective multichannel input link of a plurality of multichannel input links to an inlet of a respective rotator within each connector module;

and a plurality of nodes, each node coupled to:
- at least one input link of said plurality of multichannel input links and at least one output link of said plurality of multichannel output links;
- respective data sources; and
- respective data sinks.

12. The network of claim 11 wherein said each rotator comprises:

a set of m spectral translators comprising:
- (m−1) spectral translators each configured to process a signal received from one of said spectral demultiplexers to occupy a respective shifted spectral band; and
- a spectral translator configured to process a signal from said timing circuit to occupy a specific spectral band;

a spectral-translation controller coupled to each said spectral translator;

a star coupler for combining output signals of said m spectral translators onto a wavelength-division-multiplexed link connecting to an arrayed waveguide gratings device to direct an output signal occupying said specific spectral band to said timing circuit and an output signal occupying said shifted spectral band to a respective spectral multiplexer of said plurality of spectral multiplexers.

* * * * *